(12) United States Patent
Sujeeth et al.

(10) Patent No.: US 7,964,033 B2
(45) Date of Patent: Jun. 21, 2011

(54) SELF-DISPERSED PIGMENTS AND METHODS FOR MAKING AND USING THE SAME

(75) Inventors: Puthalath K. Sujeeth, Ballwin, MO (US); John P. Kane, Ellisville, MO (US); Daniel A. Ouellette, St. Peters, MO (US); Mark Ulrich, Florissant, MO (US); Vincent Shing, Arnold, MO (US); Michael Bogomolny, San Diego, CA (US)

(73) Assignee: Sensient Colors LLC, St. Louis, MO (US)

( * ) Notice: Subject to any disclaimer, the term of this patent is extended or adjusted under 35 U.S.C. 154(b) by 22 days.

(21) Appl. No.: 12/197,087

(22) Filed: Aug. 22, 2008

(65) Prior Publication Data

US 2009/0050014 A1 Feb. 26, 2009

Related U.S. Application Data

(60) Provisional application No. 60/957,596, filed on Aug. 23, 2007.

(51) Int. Cl.
*C09B 67/20* (2006.01)
*C08K 5/16* (2006.01)

(52) U.S. Cl. ........ 106/493; 106/410; 106/412; 106/413; 106/476; 106/494; 106/495; 106/496; 106/497; 106/498; 106/499

(58) Field of Classification Search .................. 106/410, 106/412, 413, 476, 493, 494, 495, 496, 497, 106/498, 499
See application file for complete search history.

(56) References Cited

U.S. PATENT DOCUMENTS

| | | |
|---|---|---|
| 630,868 A | 8/1899 | Dorman |
| 1,901,861 A | 3/1933 | Baker |
| 2,034,508 A | 3/1936 | Boer et al. |
| 2,178,383 A | 10/1939 | Wiegand |
| 2,281,261 A | 4/1942 | Bjorksten et al. |
| 2,439,442 A | 4/1948 | Amon et al. |
| 2,439,443 A | 4/1948 | Aske |
| 2,641,533 A | 6/1953 | Cines |
| 2,811,501 A | 10/1957 | Stedry |
| 2,816,046 A | 12/1957 | Damusis |
| 2,867,540 A | 1/1959 | Melvin |
| 2,993,903 A | 7/1961 | Kraus |
| 3,023,118 A | 2/1962 | Donnet |
| 3,025,259 A | 3/1962 | Watson et al. |
| 343,708 A | 7/1962 | Edwin et al. |
| 3,243,752 A | 3/1966 | Lawrence |
| 3,271,383 A | 9/1966 | Yamaya et al. |
| 3,291,788 A | 12/1966 | Yamaya et al. |
| 3,306,761 A | 2/1967 | Johnson |
| 3,323,932 A | 6/1967 | Aboytes et al. |
| 3,347,632 A | 10/1967 | Parker |
| 3,368,990 A | 2/1968 | Goulston |
| 3,412,054 A | 11/1968 | Milligan et al. |
| 3,442,679 A | 5/1969 | Rivin et al. |
| 3,519,452 A | 7/1970 | Rivin et al. |
| 3,528,840 A | 9/1970 | Aboytes |
| 3,565,657 A | 2/1971 | Dannenberg et al. |
| 3,623,899 A | 11/1971 | Lagally |
| 3,697,425 A | 10/1972 | Lagally |
| 3,755,287 A | 8/1973 | Hegar et al. |
| 3,895,004 A | 7/1975 | de Montmollin et al. |
| 3,901,818 A | 8/1975 | Durand et al. |
| 3,971,849 A | 7/1976 | Prasad et al. |
| 3,992,218 A | 11/1976 | Suetsugu et al. |
| 4,003,981 A | 1/1977 | Turk |
| 4,069,218 A | 1/1978 | Hegar |
| 4,156,616 A | 5/1979 | Dietz et al. |
| 4,197,221 A | 4/1980 | Eisenmenger et al. |
| 4,201,647 A | 5/1980 | Spaziante et al. |
| 4,243,772 A | 1/1981 | Paul et al. |
| 4,298,526 A | 11/1981 | Sappok et al. |
| 4,343,767 A | 8/1982 | Long et al. |
| 4,386,851 A | 6/1983 | Eidorff |
| 4,388,115 A | 6/1983 | Sugiyama et al. |
| 4,406,662 A | 9/1983 | Beran et al. |
| 4,425,162 A | 1/1984 | Sugiyama et al. |

(Continued)

FOREIGN PATENT DOCUMENTS

AU 768805 1/2004

(Continued)

OTHER PUBLICATIONS

United States Patent Office Action for U.S. Appl. No. 11/933,116 dated Jun. 18, 2010 (5 pages). United States Patent Office Action for U.S. Appl. No. 11/933,192 dated Feb. 22, 2010 (13 pages).
"Pentaethylenehexamine 4067-16-7" prepared for NCI to support chemical nomination by Technical Resources International, Inc. under contract No. N02-CB-07007 (Oct. 2005; Mar. 2006) 1-23.
Air Products and Chemicals, Inc., "Surfynol Surfactants for Pigment Grinding" (1999) 4 pages.
Air Products and Chemicals, Inc., Material Safety Data Sheet No. 300000004701 for SURFYNOL® CT-131 Grind Aid (2006) 1-7.
Allinger, N.L. et al., "Organische Chemie," Kapitel 8. Verbindungen mit Carbonyl-Gruppen, Walter deGruyter, Berlin (1980) p. 292.
American Ink Maker (1923-2001) (1996) vol. 44(2):30-2, 34-6, 66.
BASF Corporation, Joncryl® 1163, data sheet (Dec. 5, 2008) 2 pages.
BASF Corporation, Joncryl® 142, data sheet (Dec. 5, 2008) 3 pages.
BASF Corporation, Joncryl® 1536, data sheet (Dec. 5, 2008) 2 pages.

(Continued)

*Primary Examiner* — Anthony J Green
(74) *Attorney, Agent, or Firm* — Michael Best & Friedrich LLP

(57) ABSTRACT

A method of modifying a pigment that includes reacting a reactive compound having an X-[Y]$_n$ reactive group with a secondary compound N-S-ZM to form a substituted reactive intermediate [Y]$_a$-X-(N-S-ZM)$_b$. A pigment is reacted with the substituted reactive intermediate [Y]$_a$-X-(N-S-ZM)$_b$ to attach the substituted reactive intermediate to the surface of the pigment to form a surface modified pigment. X may be a sulfonyl, phosphoryl, or 1,3,5-triazinyl group, Y may be a halogen leaving group, N may be a basic nucleophilic group, S may be an organic group, and ZM may be an ionizable end group. Also, n is an integer between 1 and 3, b is an integer between 1 and 3, and a=n−b. When n is equal to or greater than b, and if b is 2 or 3, each N-S-ZM can be the same or different.

34 Claims, 14 Drawing Sheets

U.S. PATENT DOCUMENTS

| | | | |
|---|---|---|---|
| 4,435,717 A | 3/1984 | Eida et al. | |
| 4,477,621 A | 10/1984 | Sato et al. | |
| 4,485,041 A | 11/1984 | Hoyer et al. | |
| 4,500,672 A | 2/1985 | Suzuki et al. | |
| 4,507,236 A | 3/1985 | Seiler et al. | |
| 4,508,570 A | 4/1985 | Fujii et al. | |
| 4,530,961 A | 7/1985 | Nguyen et al. | |
| 4,532,296 A | 7/1985 | Gardner | |
| 4,533,776 A | 8/1985 | Baasner et al. | |
| 4,581,445 A | 4/1986 | Ramanathan | |
| 4,597,794 A | 7/1986 | Ohta et al. | |
| 4,609,404 A | 9/1986 | Marraccini et al. | |
| 4,624,709 A | 11/1986 | Otsuka | |
| 4,624,773 A | 11/1986 | Hettinger | |
| 4,627,875 A | 12/1986 | Kobayashi et al. | |
| 4,631,085 A | 12/1986 | Kawanishi et al. | |
| 4,647,310 A | 3/1987 | Shimada et al. | |
| 4,666,519 A | 5/1987 | Akiyama et al. | |
| 4,666,993 A | 5/1987 | Urano et al. | |
| 4,670,059 A | 6/1987 | Hackleman et al. | |
| 4,680,332 A | 7/1987 | Hair et al. | |
| 4,683,002 A | 7/1987 | Mirua et al. | |
| 4,685,968 A | 8/1987 | Palmer | |
| 4,689,078 A | 8/1987 | Koike | |
| 4,694,302 A | 9/1987 | Hackleman | |
| 4,695,824 A | 9/1987 | Tazaki | |
| 4,711,668 A | 12/1987 | Shimada et al. | |
| 4,713,081 A | 12/1987 | Becker | |
| 4,713,113 A | 12/1987 | Shimada et al. | |
| 4,732,613 A | 3/1988 | Shioya et al. | |
| 4,737,190 A | 4/1988 | Shimada et al. | |
| 4,761,180 A | 8/1988 | Askeland et al. | |
| 4,765,838 A | 8/1988 | Ohata et al. | |
| 4,786,327 A | 11/1988 | Wenzel et al. | |
| 4,790,880 A | 12/1988 | Miller | |
| 4,793,860 A | 12/1988 | Murakami et al. | |
| 4,798,856 A | 1/1989 | Ayala et al. | |
| 4,810,292 A | 3/1989 | Palmer | |
| 4,836,851 A | 6/1989 | Pawlowski et al. | |
| 4,836,852 A | 6/1989 | Knirsch et al. | |
| 4,838,938 A | 6/1989 | Tomida | |
| 4,844,569 A | 7/1989 | Wada et al. | |
| 4,846,851 A | 7/1989 | Guro et al. | |
| 4,853,036 A | 8/1989 | Koike et al. | |
| 4,853,037 A | 8/1989 | Johnson et al. | |
| 4,855,762 A | 8/1989 | Suzuki | |
| 4,914,562 A | 4/1990 | Abe et al. | |
| 4,931,950 A | 6/1990 | Isle et al. | |
| 4,952,551 A | 8/1990 | Buehler | |
| 4,952,617 A | 8/1990 | Ayala et al. | |
| 4,957,553 A | 9/1990 | Koike | |
| 4,959,661 A | 9/1990 | Buxton | |
| 4,973,499 A | 11/1990 | Iwata et al. | |
| 4,978,969 A | 12/1990 | Chieng | |
| 4,994,110 A | 2/1991 | Stoffel et al. | |
| 5,013,361 A | 5/1991 | Case et al. | |
| 5,017,224 A | 5/1991 | Tomita | |
| 5,017,227 A | 5/1991 | Koike et al. | |
| 5,017,644 A | 5/1991 | Fuller et al. | |
| 5,026,425 A | 6/1991 | Hindagolla et al. | |
| 5,026,426 A | 6/1991 | Russell | |
| 5,026,427 A | 6/1991 | Mitchell et al. | |
| 5,053,078 A | 10/1991 | Koike | |
| 5,059,248 A | 10/1991 | Signorino et al. | |
| 5,061,316 A | 10/1991 | Moffatt | |
| 5,062,892 A | 11/1991 | Halko | |
| 5,067,980 A | 11/1991 | Koike | |
| 5,075,699 A | 12/1991 | Koike | |
| 5,082,496 A | 1/1992 | Yamamoto et al. | |
| 5,085,698 A | 2/1992 | Ma et al. | |
| 5,102,459 A | 4/1992 | Ritter et al. | |
| 5,103,361 A | 4/1992 | Nagatsuka | |
| 5,106,417 A | 4/1992 | Hauser | |
| 5,108,501 A | 4/1992 | Moffatt | |
| 5,108,503 A | 4/1992 | Hindagolla et al. | |
| 5,108,504 A | 4/1992 | Johnson | |
| 5,110,355 A | 5/1992 | Pendleton | |
| 5,114,479 A | 5/1992 | Keaveney | |
| 5,116,409 A | 5/1992 | Moffatt | |
| 5,118,351 A | 6/1992 | Shirota et al. | |
| 5,124,201 A | 6/1992 | Kurabayashi et al. | |
| 5,125,969 A | 6/1992 | Nishiwaki et al. | |
| 5,133,803 A | 7/1992 | Moffatt | |
| 5,142,393 A | 8/1992 | Okumura et al. | |
| 5,145,518 A | 9/1992 | Winnik et al. | |
| 5,156,470 A | 10/1992 | Suzuki et al. | |
| 5,156,472 A | 10/1992 | Suzuki et al. | |
| 5,156,473 A | 10/1992 | Suzuki et al. | |
| 5,156,675 A | 10/1992 | Breton et al. | |
| 5,158,377 A | 10/1992 | Suzuki et al. | |
| 5,159,009 A | 10/1992 | Wolff | |
| 5,160,372 A | 11/1992 | Matrick | |
| 5,165,968 A | 11/1992 | Johnson et al. | |
| 5,172,133 A | 12/1992 | Suga et al. | |
| 5,176,745 A | 1/1993 | Moore et al. | |
| 5,181,045 A | 1/1993 | Shields | |
| 5,183,502 A | 2/1993 | Meichsner | |
| 5,184,148 A | 2/1993 | Suga | |
| 5,190,582 A | 3/1993 | Shinozuka et al. | |
| 5,196,057 A | 3/1993 | Escano et al. | |
| 5,207,824 A | 5/1993 | Moffatt | |
| 5,211,747 A | 5/1993 | Breton et al. | |
| 5,212,819 A | 5/1993 | Wada | |
| 5,215,577 A | 6/1993 | Eida et al. | |
| 5,220,346 A | 6/1993 | Carreira et al. | |
| 5,221,148 A | 6/1993 | Suzuki et al. | |
| 5,221,332 A | 6/1993 | Kohlmeier | |
| 5,221,334 A | 6/1993 | Ma et al. | |
| 5,246,518 A | 9/1993 | Hale | |
| 5,248,363 A | 9/1993 | Hale | |
| 5,258,066 A | 11/1993 | Kobayashi et al. | |
| 5,258,505 A | 11/1993 | Eida et al. | |
| 5,262,268 A | 11/1993 | Bertrand | |
| 5,272,201 A | 12/1993 | Ma et al. | |
| 5,281,261 A | 1/1994 | Lin | |
| 5,281,569 A | 1/1994 | Amon et al. | |
| 5,296,022 A | 3/1994 | Kobayashi et al. | |
| 5,300,148 A | 4/1994 | Domingo et al. | |
| 5,302,223 A | 4/1994 | Hale | |
| 5,310,778 A | 5/1994 | Shor et al. | |
| 5,318,617 A | 6/1994 | Nagasawa et al. | |
| 5,320,668 A | 6/1994 | Shields | |
| 5,334,435 A | 8/1994 | Rossi | |
| 5,342,439 A | 8/1994 | Lauw | |
| 5,344,483 A | 9/1994 | Hinton | |
| 5,352,484 A | 10/1994 | Bernard et al. | |
| 5,364,461 A | 11/1994 | Beach et al. | |
| 5,364,462 A | 11/1994 | Crystal | |
| 5,364,702 A | 11/1994 | Idei | |
| 5,372,697 A | 12/1994 | Akutsu et al. | |
| 5,377,024 A | 12/1994 | Dillinger | |
| 5,378,269 A | 1/1995 | Rossi | |
| 5,389,134 A | 2/1995 | Breton et al. | |
| 5,393,461 A | 2/1995 | Fillipova | |
| 5,393,821 A | 2/1995 | Shieh et al. | |
| 5,395,435 A | 3/1995 | Mizobuchi | |
| 5,407,725 A | 4/1995 | Ryoke et al. | |
| 5,421,658 A | 6/1995 | Suzuki et al. | |
| 5,421,871 A | 6/1995 | Onishi et al. | |
| 5,424,780 A | 6/1995 | Cooper | |
| 5,428,383 A | 6/1995 | Shields | |
| 5,431,501 A | 7/1995 | Hale | |
| 5,437,716 A | 8/1995 | Sano et al. | |
| 5,441,564 A | 8/1995 | Vogt | |
| 5,484,475 A | 1/1996 | Breton | |
| 5,484,899 A | 1/1996 | Deitz et al. | |
| 5,485,188 A | 1/1996 | Tochihara et al. | |
| 5,487,614 A | 1/1996 | Hale | |
| 5,488,401 A | 1/1996 | Mochizuki et al. | |
| 5,488,402 A | 1/1996 | Shields | |
| 5,488,907 A | 2/1996 | Xu | |
| 5,503,664 A | 4/1996 | Sano et al. | |
| 5,509,140 A | 4/1996 | Koitabashi et al. | |
| 5,522,317 A | 6/1996 | Hale | |
| 5,522,922 A | 6/1996 | Furusawa | |
| 5,529,616 A | 6/1996 | Prasad | |
| 5,529,767 A | 6/1996 | Brox et al. | |

| | | | | | |
|---|---|---|---|---|---|
| 5,531,816 A | 7/1996 | Wickramanayake | 5,747,562 A | 5/1998 | Mahmud et al. |
| 5,531,818 A | 7/1996 | Lin | 5,749,950 A | 5/1998 | Mahmud et al. |
| 5,534,051 A | 7/1996 | Lauw | 5,749,951 A | 5/1998 | Yoshiike et al. |
| 5,536,306 A | 7/1996 | Johnson et al. | 5,749,952 A | 5/1998 | Tsang |
| 5,538,548 A | 7/1996 | Yamazaki et al. | 5,750,592 A | 5/1998 | Shinozuka et al. |
| 5,550,082 A | 8/1996 | Wolfe et al. | 5,751,320 A | 5/1998 | Scheffelin et al. |
| 5,552,182 A | 9/1996 | Scarpetti | 5,766,327 A | 6/1998 | Maze |
| 5,554,739 A | 9/1996 | Belmont | 5,769,930 A | 6/1998 | Sano |
| 5,555,813 A | 9/1996 | Hale | 5,772,742 A | 6/1998 | Wang |
| 5,559,169 A | 9/1996 | Belmont | 5,777,648 A | 7/1998 | Scheffelin et al. |
| 5,560,720 A | 10/1996 | Suzuki et al. | 5,785,743 A | 7/1998 | Adamic et al. |
| 5,562,762 A | 10/1996 | Mrvos et al. | 5,786,436 A | 7/1998 | Fischer et al. |
| 5,570,118 A | 10/1996 | Rezanka et al. | 5,788,754 A | 8/1998 | Deardurff et al. |
| 5,571,311 A | 11/1996 | Belmont et al. | 5,795,375 A | 8/1998 | Yamazaki et al. |
| 5,575,845 A | 11/1996 | Belmont et al. | 5,803,958 A | 9/1998 | Katsen et al. |
| 5,575,877 A | 11/1996 | Hale | 5,803,959 A | 9/1998 | Johnson |
| 5,580,372 A | 12/1996 | Gino et al. | 5,814,138 A | 9/1998 | Fague |
| 5,585,189 A | 12/1996 | Inoue et al. | 5,814,683 A | 9/1998 | Branham |
| 5,589,522 A | 12/1996 | Beach et al. | 5,814,685 A | 9/1998 | Satake et al. |
| 5,590,600 A | 1/1997 | Hale | 5,821,283 A | 10/1998 | Hesler |
| 5,591,455 A | 1/1997 | Signorino et al. | 5,825,387 A | 10/1998 | Cowger et al. |
| 5,593,459 A | 1/1997 | Gamblin | 5,830,263 A | 11/1998 | Hale |
| 5,595,592 A | 1/1997 | Signorino et al. | 5,830,264 A | 11/1998 | Fujioka et al. |
| 5,601,023 A | 2/1997 | Hale | 5,830,265 A | 11/1998 | Tsang et al. |
| 5,604,276 A | 2/1997 | Suga | 5,830,930 A | 11/1998 | Mahmud et al. |
| 5,609,671 A | 3/1997 | Nagasawa | 5,837,043 A | 11/1998 | Wong et al. |
| 5,611,847 A | 3/1997 | Guistina et al. | 5,837,045 A | 11/1998 | Johnson |
| 5,615,957 A | 4/1997 | Suzuki et al. | 5,837,374 A | 11/1998 | Hirayama et al. |
| 5,621,027 A | 4/1997 | Roschger et al. | 5,846,306 A | 12/1998 | Kubota |
| 5,622,439 A | 4/1997 | Suzuki et al. | 5,846,307 A | 12/1998 | Nagasawa et al. |
| 5,622,557 A | 4/1997 | Mahmud et al. | 5,849,067 A | 12/1998 | Tsuchiya et al. |
| 5,624,485 A | 4/1997 | Calhoun | 5,851,274 A | 12/1998 | Lin |
| 5,626,655 A | 5/1997 | Pawlowski et al. | 5,851,280 A | 12/1998 | Belmont et al. |
| 5,630,868 A | 5/1997 | Belmont et al. | 5,853,465 A | 12/1998 | Tsang |
| 5,631,309 A | 5/1997 | Yanagi et al. | 5,854,307 A | 12/1998 | Kimura |
| 5,640,180 A | 6/1997 | Hale | 5,854,331 A | 12/1998 | Ma |
| 5,642,141 A | 6/1997 | Hale | 5,858,075 A | 1/1999 | Deardurff et al. |
| 5,644,988 A | 7/1997 | Xu | 5,858,078 A | 1/1999 | Andes et al. |
| 5,647,896 A | 7/1997 | Nishimura et al. | 5,861,447 A | 1/1999 | Nagasawa et al. |
| 5,647,897 A | 7/1997 | Ouki et al. | 5,863,323 A | 1/1999 | Mahmud et al. |
| 5,648,405 A | 7/1997 | Ma | 5,868,823 A | 2/1999 | Yamazaki et al. |
| 5,656,071 A | 8/1997 | Kappele | 5,869,550 A | 2/1999 | Mahmud |
| 5,658,376 A | 8/1997 | Noguchi et al. | 5,871,572 A | 2/1999 | Marritt |
| 5,665,150 A | 9/1997 | Schwarz | 5,874,974 A | 2/1999 | Courian et al. |
| 5,667,569 A | 9/1997 | Fujioka | 5,876,491 A | 3/1999 | Gunn et al. |
| 5,667,571 A | 9/1997 | Ono et al. | 5,877,100 A | 3/1999 | Smith et al. |
| 5,667,572 A | 9/1997 | Taniguchi | 5,877,238 A | 3/1999 | Mahmud et al. |
| 5,672,198 A | 9/1997 | Belmont | 5,877,253 A | 3/1999 | Matta et al. |
| 5,679,143 A | 10/1997 | Looman | 5,885,335 A | 3/1999 | Adams |
| 5,686,508 A | 11/1997 | Shimomura | 5,885,336 A | 3/1999 | Kitahara et al. |
| 5,686,633 A | 11/1997 | Vieira | 5,886,065 A | 3/1999 | Tsang et al. |
| 5,688,311 A | 11/1997 | Adamic | 5,891,232 A | 4/1999 | Moffatt |
| 5,690,721 A | 11/1997 | Itoh | 5,891,934 A | 4/1999 | Moffatt et al. |
| 5,690,722 A | 11/1997 | Pawlowski | 5,895,522 A | 4/1999 | Belmont et al. |
| 5,690,723 A | 11/1997 | Sano et al. | 5,897,694 A | 4/1999 | Woolf |
| 5,693,126 A | 12/1997 | Ito | 5,897,961 A | 4/1999 | Malhotra |
| 5,698,016 A | 12/1997 | Adams et al. | 5,898,445 A | 4/1999 | Becker et al. |
| 5,700,317 A | 12/1997 | Adamic | 5,900,029 A | 5/1999 | Belmont et al. |
| 5,704,969 A | 1/1998 | Kanaya | 5,904,762 A | 5/1999 | Mahmud |
| 5,707,432 A | 1/1998 | Adams et al. | 5,911,816 A | 6/1999 | Gore |
| 5,709,976 A | 1/1998 | Malhotra | 5,916,934 A | 6/1999 | Mahmud et al. |
| 5,713,988 A | 2/1998 | Belmont | 5,916,956 A | 6/1999 | Wang et al. |
| 5,713,989 A | 2/1998 | Wickramanayake | 5,919,293 A | 7/1999 | Moffatt et al. |
| 5,713,992 A | 2/1998 | Satoh et al. | 5,919,841 A | 7/1999 | Mahmud et al. |
| 5,714,538 A | 2/1998 | Beach et al. | 5,919,855 A | 7/1999 | Reed |
| 5,718,746 A | 2/1998 | Nagasawa et al. | 5,922,118 A | 7/1999 | Johnson |
| 5,719,204 A | 2/1998 | Beach et al. | 5,925,176 A | 7/1999 | Rehman |
| 5,721,344 A | 2/1998 | Baettig | 5,928,419 A | 7/1999 | Uemura et al. |
| 5,725,641 A | 3/1998 | MacLeod | 5,932,631 A | 8/1999 | Marritt |
| 5,725,643 A | 3/1998 | Higashiyama | 5,935,309 A | 8/1999 | Moffatt et al. |
| 5,725,644 A | 3/1998 | Sano et al. | 5,938,829 A | 8/1999 | Higashiyama et al. |
| 5,730,790 A | 3/1998 | Rehman | 5,946,012 A | 8/1999 | Courian et al. |
| 5,734,396 A | 3/1998 | Hale | 5,948,150 A | 9/1999 | Lin |
| 5,734,403 A | 3/1998 | Suga et al. | 5,948,835 A | 9/1999 | Mahmud et al. |
| 5,735,941 A | 4/1998 | Feeman et al. | 5,951,749 A | 9/1999 | Krepski et al. |
| 5,745,140 A | 4/1998 | Stoffel et al. | 5,952,481 A | 9/1999 | Markham |
| 5,746,816 A | 5/1998 | Xu | 5,955,232 A | 9/1999 | Little |
| 5,746,817 A | 5/1998 | Katsen et al. | 5,955,515 A | 9/1999 | Kimura et al. |
| 5,746,818 A | 5/1998 | Yatake | 5,958,999 A | 9/1999 | Bates et al. |

| | | | | | | |
|---|---|---|---|---|---|---|
| 5,961,703 | A | 10/1999 | Fraas | 6,214,100 | B1 | 4/2001 | Parazak et al. |
| 5,963,238 | A | 10/1999 | Scheffelin et al. | 6,218,067 | B1 | 4/2001 | Belmont |
| 5,965,196 | A | 10/1999 | Sawada | 6,221,141 | B1 | 4/2001 | Takada et al. |
| 5,966,156 | A | 10/1999 | Scheffelin et al. | 6,221,142 | B1 | 4/2001 | Wang et al. |
| 5,968,243 | A | 10/1999 | Belmont | 6,221,143 | B1 | 4/2001 | Palumbo |
| 5,968,244 | A | 10/1999 | Ueda et al. | 6,221,932 | B1 | 4/2001 | Moffatt et al. |
| 5,969,003 | A | 10/1999 | Foucher et al. | 6,224,202 | B1 | 5/2001 | Romano, Jr. |
| 5,972,083 | A | 10/1999 | Iijima | 6,231,655 | B1 | 5/2001 | Marritt |
| 5,976,232 | A | 11/1999 | Gore | 6,239,193 | B1 | 5/2001 | Cheng |
| 5,976,233 | A | 11/1999 | Osumi et al. | H1967 | H | 6/2001 | Woolf |
| 5,977,213 | A | 11/1999 | Mahmud | 6,241,811 | B1 | 6/2001 | Sano |
| 5,981,623 | A | 11/1999 | McCain et al. | 6,242,529 | B1 | 6/2001 | Marritt |
| 5,985,015 | A | 11/1999 | Kanaya | 6,244,687 | B1 | 6/2001 | Gast et al. |
| 5,985,016 | A | 11/1999 | Tsang | 6,247,808 | B1 | 6/2001 | Ma |
| 5,990,202 | A | 11/1999 | Nguyen | 6,258,864 | B1 | 7/2001 | Dalton et al. |
| 6,004,389 | A | 12/1999 | Yatake | 6,264,301 | B1 | 7/2001 | Helterline |
| 6,007,611 | A | 12/1999 | Mheidle et al. | 6,271,285 | B1 | 8/2001 | Miyabayashi et al. |
| 6,008,272 | A | 12/1999 | Mahmud et al. | 6,276,791 | B1 | 8/2001 | Kovacs et al. |
| 6,013,123 | A | 1/2000 | Scarpetti | 6,277,183 | B1 | 8/2001 | Johnson et al. |
| 6,015,454 | A | 1/2000 | Lacroix et al. | 6,277,184 | B1 | 8/2001 | Kato |
| 6,017,980 | A | 1/2000 | Wang | 6,280,512 | B1 | 8/2001 | Botros |
| 6,019,828 | A | 2/2000 | Rehman | 6,280,513 | B1 | 8/2001 | Osumi et al. |
| 6,020,397 | A | 2/2000 | Matzinger | 6,280,516 | B1 | 8/2001 | Lucchi et al. |
| 6,022,908 | A | 2/2000 | Ma | 6,280,871 | B1 | 8/2001 | Tosco et al. |
| 6,024,786 | A | 2/2000 | Gore | 6,281,267 | B2 | 8/2001 | Parazak |
| 6,028,137 | A | 2/2000 | Mahmud et al. | 6,281,917 | B1 | 8/2001 | Katsuragi et al. |
| 6,034,153 | A | 3/2000 | Tsang et al. | 6,284,029 | B1 | 9/2001 | Sano |
| 6,036,759 | A | 3/2000 | Wickramanayake | 6,291,572 | B1 | 9/2001 | Brown et al. |
| 6,039,796 | A | 3/2000 | Kubota | 6,299,675 | B1 | 10/2001 | Ono |
| 6,042,643 | A | 3/2000 | Belmont et al. | 6,300,391 | B2 | 10/2001 | Parazak |
| 6,050,671 | A | 4/2000 | Rotering | 6,306,204 | B1 | 10/2001 | Lin |
| 6,054,238 | A | 4/2000 | Little | 6,312,103 | B1 | 11/2001 | Haluzak |
| 6,056,812 | A | 5/2000 | Lin | 6,314,574 | B1 | 11/2001 | Chan et al. |
| 6,057,387 | A | 5/2000 | Mahmud | 6,323,257 | B1 | 11/2001 | Moffatt et al. |
| 6,068,688 | A | 5/2000 | Whitehouse et al. | 6,323,258 | B1 | 11/2001 | Lin |
| 6,069,190 | A | 5/2000 | Bates | 6,323,273 | B1 | 11/2001 | Mahmud et al. |
| 6,074,042 | A | 6/2000 | Gasvoda et al. | 6,328,894 | B1 | 12/2001 | Chan et al. |
| 6,083,315 | A | 7/2000 | Nakamura et al. | 6,332,919 | B2 | 12/2001 | Osumi et al. |
| 6,086,197 | A | 7/2000 | Kubota et al. | 6,336,965 | B1 | 1/2002 | Johnson et al. |
| 6,086,198 | A | 7/2000 | Shields | 6,337,358 | B1 | 1/2002 | Whitehouse et al. |
| 6,089,687 | A | 7/2000 | Helterline | 6,341,856 | B1 | 1/2002 | Thompson et al. |
| 6,099,632 | A | 8/2000 | Nagasawa et al. | 6,342,094 | B1 | 1/2002 | Kabalnov |
| 6,100,315 | A | 8/2000 | Kitamura et al. | 6,342,095 | B1 | 1/2002 | Takizawa et al. |
| 6,102,996 | A | 8/2000 | Parazak | 6,348,939 | B1 | 2/2002 | Xu |
| 6,103,041 | A | 8/2000 | Wagner et al. | 6,350,519 | B1 | 2/2002 | Devonport |
| 6,103,380 | A | 8/2000 | Devonport | 6,352,341 | B2 | 3/2002 | Kovacs et al. |
| 6,103,782 | A | 8/2000 | Mizobuchi | 6,354,693 | B1 | 3/2002 | Looman et al. |
| 6,105,502 | A | 8/2000 | Wagner et al. | 6,361,156 | B1 | 3/2002 | Romano, Jr. et al. |
| 6,107,350 | A | 8/2000 | Boes et al. | 6,364,472 | B1 | 4/2002 | Barinaga et al. |
| 6,110,266 | A | 8/2000 | Gonzalez-Blanco et al. | 6,364,944 | B1 | 4/2002 | Mahmud et al. |
| 6,110,994 | A | 8/2000 | Cooke et al. | 6,367,922 | B2 | 4/2002 | Romano, Jr. |
| 6,116,409 | A | 9/2000 | Yokajty | 6,368,239 | B1 | 4/2002 | Devonport et al. |
| 6,120,594 | A | 9/2000 | Curtis et al. | 6,372,329 | B1 | 4/2002 | Graczyk et al. |
| 6,124,376 | A | 9/2000 | Nichols et al. | 6,372,818 | B1 | 4/2002 | Kimura et al. |
| 6,126,731 | A | 10/2000 | Kemeny | 6,372,820 | B1 | 4/2002 | Devonport |
| 6,132,021 | A | 10/2000 | Smith | 6,375,317 | B1 | 4/2002 | Osumi et al. |
| 6,132,502 | A | 10/2000 | Yatake | 6,379,443 | B1 | 4/2002 | Komatsu et al. |
| 6,136,286 | A | 10/2000 | Okuyama et al. | 6,383,274 | B1 | 5/2002 | Lin |
| 6,137,502 | A | 10/2000 | Anderson et al. | 6,383,275 | B1 | 5/2002 | Lin |
| 6,139,139 | A | 10/2000 | Stoffel et al. | 6,386,695 | B1 | 5/2002 | Kowalski |
| 6,142,621 | A | 11/2000 | Romano | 6,387,168 | B1 | 5/2002 | Koitabashi et al. |
| 6,149,327 | A | 11/2000 | Ward et al. | 6,387,500 | B1 | 5/2002 | Behl |
| 6,150,433 | A | 11/2000 | Tsang et al. | 6,391,947 | B1 | 5/2002 | Noguchi et al. |
| 6,150,453 | A | 11/2000 | Mahmud et al. | 6,398,858 | B1 | 6/2002 | Yu et al. |
| 6,152,038 | A | 11/2000 | Wagner et al. | 6,399,029 | B1 | 6/2002 | Porteous |
| 6,169,129 | B1 | 1/2001 | Mahmud et al. | 6,399,202 | B1 | 6/2002 | Yu |
| 6,172,154 | B1 | 1/2001 | Brown | 6,399,674 | B1 | 6/2002 | Kashiwazaki et al. |
| 6,174,354 | B1 | 1/2001 | Takizawa et al. | 6,402,313 | B1 | 6/2002 | Xu et al. |
| 6,176,629 | B1 | 1/2001 | Suzuki et al. | 6,402,825 | B1 | 6/2002 | Sun |
| 6,177,498 | B1 | 1/2001 | Rehman | 6,406,143 | B1 | 6/2002 | Chen et al. |
| 6,180,691 | B1 | 1/2001 | Cheng et al. | 6,406,528 | B1 | 6/2002 | Macholdt et al. |
| 6,184,268 | B1 | 2/2001 | Nichols et al. | 6,412,935 | B1 | 7/2002 | Doumaux |
| 6,187,086 | B1 | 2/2001 | Rehman | 6,417,249 | B1 | 7/2002 | Nguyen |
| 6,193,364 | B1 | 2/2001 | Iida | 6,419,733 | B1 | 7/2002 | Sano et al. |
| 6,197,274 | B1 | 3/2001 | Mahmud et al. | 6,423,375 | B1 | 7/2002 | Bi et al. |
| 6,206,517 | B1 | 3/2001 | Kovacs et al. | 6,425,331 | B1 | 7/2002 | Xu |
| 6,207,719 | B1 | 3/2001 | Pardikes | 6,425,662 | B1 | 7/2002 | Teraoka et al. |
| 6,209,998 | B1 | 4/2001 | Yue | 6,431,677 | B1 | 8/2002 | Anderson et al. |
| 6,211,279 | B1 | 4/2001 | Mahmud | 6,432,194 | B2 | 8/2002 | Johnson et al. |

| Patent | Date | Inventor |
|---|---|---|
| 6,432,523 B1 | 8/2002 | Ma et al. |
| 6,435,240 B1 | 8/2002 | Fagebaume et al. |
| 6,435,659 B1 | 8/2002 | Bruinsma |
| 6,436,178 B1 | 8/2002 | Hosmer |
| 6,439,710 B1 | 8/2002 | Hale |
| 6,444,017 B1 | 9/2002 | Yue |
| 6,444,294 B1 | 9/2002 | Malhotra et al. |
| 6,447,629 B1 | 9/2002 | Thompson et al. |
| 6,448,309 B2 | 9/2002 | Mahmud et al. |
| 6,450,098 B1 | 9/2002 | Hale |
| 6,450,632 B1 | 9/2002 | Tsang |
| 6,451,098 B1 | 9/2002 | Lye et al. |
| 6,451,103 B1 | 9/2002 | Uemura et al. |
| 6,451,379 B1 | 9/2002 | Tsao |
| 6,454,403 B1 | 9/2002 | Takada et al. |
| 6,454,846 B2 | 9/2002 | Yatake |
| 6,458,195 B1 | 10/2002 | Stoffel et al. |
| 6,458,458 B1 | 10/2002 | Cooke et al. |
| 6,460,987 B1 | 10/2002 | Katsuragi et al. |
| 6,460,989 B1 | 10/2002 | Yano et al. |
| 6,461,418 B1 | 10/2002 | Yue et al. |
| 6,464,334 B2 | 10/2002 | Lopez et al. |
| 6,467,896 B2 | 10/2002 | Meyer |
| 6,468,340 B1 | 10/2002 | Moffatt |
| 6,468,342 B1 | 10/2002 | Itoh et al. |
| 6,471,757 B1 | 10/2002 | Koitabashi et al. |
| 6,471,763 B1 | 10/2002 | Karl |
| 6,472,471 B2 | 10/2002 | Cooke et al. |
| 6,475,271 B2 | 11/2002 | Lin |
| 6,475,612 B1 | 11/2002 | Knight et al. |
| 6,478,863 B2 | 11/2002 | Johnson et al. |
| 6,478,963 B1 | 11/2002 | Rossmanith |
| 6,479,571 B1 | 11/2002 | Cooke et al. |
| 6,485,138 B1 | 11/2002 | Kubota et al. |
| 6,486,903 B1 | 11/2002 | Wagner et al. |
| 6,488,370 B2 | 12/2002 | Hale |
| 6,488,753 B1 | 12/2002 | Ito et al. |
| 6,491,976 B2 | 12/2002 | Horiuchi et al. |
| 6,494,943 B1 | 12/2002 | Yu et al. |
| 6,494,946 B1 | 12/2002 | Belmont et al. |
| 6,497,479 B1 | 12/2002 | Stoffel et al. |
| 6,498,222 B1 | 12/2002 | Kitamura et al. |
| 6,500,248 B1 | 12/2002 | Hayashi |
| 6,500,880 B1 | 12/2002 | Parazak |
| 6,502,917 B1 | 1/2003 | Shinada et al. |
| 6,502,920 B1 | 1/2003 | Anderson et al. |
| 6,503,307 B1 | 1/2003 | Noguchi |
| 6,503,308 B2 | 1/2003 | Stramel |
| 6,503,311 B1 | 1/2003 | Karl et al. |
| 6,503,317 B1 | 1/2003 | Ortalano |
| 6,503,978 B1 | 1/2003 | Tsao |
| 6,505,910 B1 | 1/2003 | Doval |
| 6,505,929 B1 | 1/2003 | Chow |
| 6,506,239 B1 | 1/2003 | Osumi |
| 6,506,240 B2 | 1/2003 | Takemoto |
| 6,506,245 B1 | 1/2003 | Kinney et al. |
| 6,508,871 B1 | 1/2003 | Kato |
| 6,508,872 B2 | 1/2003 | Nguyen |
| 6,511,534 B1 | 1/2003 | Mishina et al. |
| 6,514,330 B1 | 2/2003 | Kanaya et al. |
| 6,514,920 B1 | 2/2003 | Katsuragi et al. |
| 6,517,199 B1 | 2/2003 | Tomioka et al. |
| 6,521,034 B1 | 2/2003 | Osumi et al. |
| 6,522,522 B2 | 2/2003 | Yu |
| 6,524,383 B2 | 2/2003 | Komatsu et al. |
| 6,528,148 B2 | 3/2003 | Niu |
| 6,530,656 B1 | 3/2003 | Teraoka et al. |
| 6,533,406 B2 | 3/2003 | Katsuragi |
| 6,533,407 B2 | 3/2003 | Mouri et al. |
| 6,533,853 B1 | 3/2003 | Mishina |
| 6,534,569 B2 | 3/2003 | Mahmud et al. |
| 6,536,878 B2 | 3/2003 | Kasperchik et al. |
| 6,536,890 B1 | 3/2003 | Kato et al. |
| 6,537,364 B2 | 3/2003 | Dietz et al. |
| 6,538,047 B1 | 3/2003 | Miyabayashi |
| 6,538,049 B1 | 3/2003 | Kappele |
| 6,540,329 B1 | 4/2003 | Kaneko et al. |
| 6,540,334 B1 | 4/2003 | Mrvos et al. |
| 6,540,345 B1 | 4/2003 | Wagner et al. |
| 6,541,538 B1 | 4/2003 | Matzinger |
| 6,543,889 B1 | 4/2003 | Murcia et al. |
| 6,547,381 B2 | 4/2003 | Watanabe et al. |
| 6,548,572 B1 | 4/2003 | Breck |
| 6,550,901 B2 | 4/2003 | Iida |
| 6,550,902 B2 | 4/2003 | Shinada et al. |
| 6,550,903 B2 | 4/2003 | Katsuragi |
| 6,551,393 B2 | 4/2003 | Devonport et al. |
| 6,554,891 B1 | 4/2003 | Momose |
| 6,562,121 B2 | 5/2003 | Nickel et al. |
| 6,565,202 B2 | 5/2003 | Rose et al. |
| 6,572,226 B2 | 6/2003 | Tyvoll |
| 6,572,690 B2 | 6/2003 | Rehman et al. |
| 6,572,692 B1 | 6/2003 | Osumi |
| 6,578,943 B2 | 6/2003 | Arquilevich et al. |
| 6,582,508 B2 | 6/2003 | Dietz et al. |
| 6,585,815 B2 | 7/2003 | Koitabashi et al. |
| 6,585,817 B2 | 7/2003 | Lee |
| 6,585,818 B2 | 7/2003 | Thakkar et al. |
| 6,586,501 B1 | 7/2003 | Dalton et al. |
| 6,588,880 B1 | 7/2003 | Gasvoda et al. |
| 6,592,657 B2 | 7/2003 | Lee et al. |
| 6,596,065 B2 | 7/2003 | Ito |
| 6,596,068 B1 | 7/2003 | Ito et al. |
| 6,596,378 B2 | 7/2003 | Hanmura et al. |
| 6,602,333 B2 | 8/2003 | Miyabayashi |
| 6,602,335 B2 | 8/2003 | Moffatt et al. |
| 6,604,809 B2 | 8/2003 | Katsuragi |
| 6,605,420 B2 | 8/2003 | Nakai et al. |
| 6,607,266 B2 | 8/2003 | Katsuragi et al. |
| 6,607,268 B2 | 8/2003 | Bruinsma |
| 6,607,565 B1 | 8/2003 | Herrmann et al. |
| 6,607,589 B2 | 8/2003 | Adamic et al. |
| 6,610,129 B1 | 8/2003 | Sader et al. |
| 6,616,273 B1 | 9/2003 | Bruinsma |
| 6,618,066 B2 | 9/2003 | Hale |
| 6,620,229 B2 | 9/2003 | Doi et al. |
| 6,630,268 B2 | 10/2003 | Tosco et al. |
| 6,631,984 B2 | 10/2003 | Thompson et al. |
| 6,632,275 B1 | 10/2003 | Schoen et al. |
| 6,632,485 B1 | 10/2003 | Tang et al. |
| 6,632,594 B2 | 10/2003 | Nakai et al. |
| 6,637,876 B2 | 10/2003 | Hori |
| 6,638,350 B2 | 10/2003 | Butler et al. |
| 6,641,259 B1 | 11/2003 | Kopolow et al. |
| 6,641,651 B2 | 11/2003 | Suzuki |
| 6,641,653 B2 | 11/2003 | Yu |
| 6,641,656 B2 | 11/2003 | Yu |
| 6,643,220 B2 | 11/2003 | Anderson |
| 6,644,778 B2 | 11/2003 | Rotering |
| 6,648,950 B2 | 11/2003 | Lee |
| 6,648,953 B2 | 11/2003 | Yamazaki et al. |
| 6,648,954 B2 | 11/2003 | Uemura et al. |
| 6,649,317 B2 | 11/2003 | Wagner et al. |
| 6,652,084 B1 | 11/2003 | Teraoka |
| 6,659,582 B2 | 12/2003 | Underwood |
| 6,660,075 B2 | 12/2003 | Bergemann et al. |
| 6,664,312 B2 | 12/2003 | Devonport |
| 6,673,503 B2 | 1/2004 | Wagner et al. |
| 6,679,576 B2 | 1/2004 | Crivelli |
| 6,679,598 B2 | 1/2004 | Kato et al. |
| 6,685,769 B2 | 2/2004 | Karl et al. |
| 6,686,314 B2 | 2/2004 | Xu et al. |
| 6,686,409 B2 | 2/2004 | Mahmud et al. |
| 6,688,737 B2 | 2/2004 | Nagai et al. |
| 6,689,433 B2 | 2/2004 | Niu et al. |
| 6,699,319 B2 | 3/2004 | Adams |
| 6,706,104 B2 | 3/2004 | Takuhara et al. |
| 6,706,105 B2 | 3/2004 | Watanabe et al. |
| 6,709,506 B2 | 3/2004 | Mahmud et al. |
| 6,715,866 B2 | 4/2004 | Kasperchik |
| 6,716,278 B2 | 4/2004 | Prasad et al. |
| 6,719,420 B2 | 4/2004 | Tomioka et al. |
| 6,720,367 B2 | 4/2004 | Taniguchi et al. |
| 6,722,765 B2 | 4/2004 | Rolly et al. |
| 6,723,161 B2 | 4/2004 | Langenmayr et al. |
| 6,723,783 B2 | 4/2004 | Palumbo et al. |
| 6,730,152 B2 | 5/2004 | Rehman |
| 6,733,120 B2 | 5/2004 | Ogasawara et al. |

| Patent | Kind | Date | Inventor |
|---|---|---|---|
| 6,737,449 | B1 | 5/2004 | Yatake |
| 6,740,151 | B2 | 5/2004 | Belmont et al. |
| 6,740,689 | B1 | 5/2004 | Lee et al. |
| 6,749,773 | B2 | 6/2004 | Emanuel |
| 6,753,425 | B2 | 6/2004 | Nakai et al. |
| 6,759,459 | B2 | 7/2004 | Lin |
| 6,761,759 | B2 | 7/2004 | Oki et al. |
| 6,767,640 | B2 | 7/2004 | Moffatt |
| 6,776,830 | B2 | 8/2004 | Marritt |
| 6,777,462 | B2 | 8/2004 | Smith et al. |
| 6,779,864 | B2 | 8/2004 | Underwood |
| 6,779,884 | B1 | 8/2004 | Ma |
| 6,780,389 | B2 | 8/2004 | Karl et al. |
| 6,780,901 | B1 | 8/2004 | Endo et al. |
| 6,786,957 | B2 | 9/2004 | Choy et al. |
| 6,790,268 | B2 | 9/2004 | Lee et al. |
| 6,790,878 | B2 | 9/2004 | Kurabayashi |
| 6,793,308 | B2 | 9/2004 | Sugimoto et al. |
| 6,793,329 | B2 | 9/2004 | Batley et al. |
| 6,793,722 | B2 | 9/2004 | Chien et al. |
| 6,793,723 | B2 | 9/2004 | Auslander et al. |
| 6,794,427 | B2 | 9/2004 | Kurabayashi et al. |
| 6,797,347 | B2 | 9/2004 | Chow |
| 6,805,736 | B2 | 10/2004 | Wickramanayake |
| 6,806,300 | B2 | 10/2004 | Waki et al. |
| 6,806,925 | B2 | 10/2004 | Ishii et al. |
| 6,808,555 | B2 | 10/2004 | Wang |
| 6,808,583 | B2 | 10/2004 | Kwasny et al. |
| 6,811,597 | B2 | 11/2004 | Oki et al. |
| 6,814,790 | B2 | 11/2004 | Sir et al. |
| 6,814,791 | B2 | 11/2004 | Moore |
| 6,814,792 | B2 | 11/2004 | Taniguchi |
| 6,814,793 | B2 | 11/2004 | Akers et al. |
| 6,818,048 | B2 | 11/2004 | Prasad et al. |
| 6,820,972 | B2 | 11/2004 | Kinalski |
| 6,821,328 | B2 | 11/2004 | Tomioka et al. |
| 6,821,330 | B1 | 11/2004 | Sano |
| 6,822,781 | B1 | 11/2004 | Amici et al. |
| 6,824,263 | B2 | 11/2004 | Taniguchi et al. |
| 6,827,403 | B2 | 12/2004 | Paasche et al. |
| 6,827,434 | B1 | 12/2004 | Katsuragi et al. |
| 6,827,768 | B2 | 12/2004 | Andrievsky et al. |
| 6,830,326 | B2 | 12/2004 | Tsao |
| 6,830,327 | B2 | 12/2004 | Asakawa |
| 6,830,927 | B2 | 12/2004 | Rao |
| 6,832,830 | B2 | 12/2004 | Seino |
| 6,833,026 | B2 | 12/2004 | Palumbo |
| 6,834,945 | B2 | 12/2004 | Ishizawa et al. |
| H2113 | H | 1/2005 | Nicholas et al. |
| 6,840,614 | B2 | 1/2005 | Wagner et al. |
| 6,843,838 | B2 | 1/2005 | Zimmer et al. |
| 6,844,035 | B2 | 1/2005 | Niu et al. |
| 6,848,779 | B2 | 2/2005 | Lo et al. |
| 6,848,781 | B2 | 2/2005 | Ogino et al. |
| 6,849,111 | B2 | 2/2005 | Suzuki |
| 6,851,787 | B2 | 2/2005 | Johnson |
| 6,852,153 | B2 | 2/2005 | Uhlir-Tsang |
| 6,852,156 | B2 | 2/2005 | Yeh et al. |
| 6,855,193 | B2 | 2/2005 | Andrievsky et al. |
| 6,858,301 | B2 | 2/2005 | Ganapathiappan |
| 6,860,593 | B2 | 3/2005 | Kashiwazaki et al. |
| 6,863,719 | B2 | 3/2005 | Butler et al. |
| 6,866,378 | B2 | 3/2005 | Wotton et al. |
| 6,866,381 | B2 | 3/2005 | Kelly-Rowley et al. |
| 6,866,707 | B2 | 3/2005 | Kato |
| 6,867,286 | B1 | 3/2005 | Holloway |
| 6,869,470 | B2 | 3/2005 | Kato |
| 6,869,647 | B2 | 3/2005 | Page |
| 6,871,929 | B2 | 3/2005 | Crivelli et al. |
| 6,872,430 | B2 | 3/2005 | Burch et al. |
| 6,887,640 | B2 | 5/2005 | Zhang et al. |
| 6,896,647 | B1 | 5/2005 | Karger |
| 6,899,754 | B2 | 5/2005 | Yeh |
| 6,908,185 | B2 | 6/2005 | Chen |
| 6,911,073 | B2 | 6/2005 | Adams et al. |
| 6,916,088 | B2 | 7/2005 | Smith et al. |
| 6,916,089 | B2 | 7/2005 | Iida |
| 6,921,429 | B2 | 7/2005 | Sago et al. |
| 6,921,433 | B2 | 7/2005 | Kuribayashi et al. |
| 6,935,717 | B2 | 8/2005 | Su et al. |
| 6,945,644 | B2 | 9/2005 | Kabalnov |
| 6,948,021 | B2 | 9/2005 | Derrico |
| 6,948,804 | B2 | 9/2005 | Iida |
| 6,953,239 | B2 | 10/2005 | Gondek et al. |
| 6,955,422 | B2 | 10/2005 | Miyazawa et al. |
| 6,961,076 | B2 | 11/2005 | Wagner |
| 6,964,702 | B2 | 11/2005 | Shen et al. |
| 6,966,643 | B2 | 11/2005 | Hale |
| 6,969,159 | B2 | 11/2005 | Su et al. |
| RE38,952 | E | 1/2006 | Hale et al. |
| 6,988,796 | B2 | 1/2006 | Rolly et al. |
| 6,991,329 | B2 | 1/2006 | Gore |
| 6,991,676 | B2 | 1/2006 | Kabalnov et al. |
| 6,997,979 | B2 | 2/2006 | Bauer |
| 7,001,649 | B2 | 2/2006 | Wagner et al. |
| 7,001,660 | B2 | 2/2006 | Garitano |
| 7,001,936 | B2 | 2/2006 | Akers, Jr. et al. |
| 7,005,003 | B2 | 2/2006 | Mott |
| 7,005,461 | B2 | 2/2006 | Sanada et al. |
| 7,008,053 | B2 | 3/2006 | Hashii et al. |
| 7,008,977 | B2 | 3/2006 | Sakai et al. |
| 7,011,397 | B2 | 3/2006 | Miyazawa et al. |
| 7,018,030 | B2 | 3/2006 | Seino et al. |
| 7,018,953 | B2 | 3/2006 | Gore et al. |
| 7,025,813 | B2 | 4/2006 | Vanmaele et al. |
| 7,025,820 | B2 | 4/2006 | Champlin et al. |
| 7,027,185 | B2 | 4/2006 | Subirada et al. |
| 7,030,174 | B2 | 4/2006 | Yatake |
| 7,030,175 | B2 | 4/2006 | Vincent |
| 7,033,423 | B2 | 4/2006 | Rolly |
| 7,034,149 | B2 | 4/2006 | Hirokazu et al. |
| 7,034,273 | B1 | 4/2006 | O |
| 7,037,398 | B2 | 5/2006 | Kwasny et al. |
| 7,041,424 | B2 | 5/2006 | Xu |
| 7,045,002 | B2 | 5/2006 | Bauer et al. |
| 7,046,389 | B2 | 5/2006 | Lopez et al. |
| 7,049,039 | B2 | 5/2006 | Tazawa et al. |
| 7,052,535 | B2 | 5/2006 | Uhlir-Tsang et al. |
| 7,056,962 | B2 | 6/2006 | Johnson et al. |
| 7,058,339 | B2 | 6/2006 | Wilcox |
| 7,066,590 | B2 | 6/2006 | Lee et al. |
| 7,074,843 | B2 | 7/2006 | Nakamura et al. |
| 7,086,732 | B2 | 8/2006 | Kasperchik |
| 7,090,719 | B2 | 8/2006 | Ishikawa et al. |
| 7,097,275 | B2 | 8/2006 | Murcia |
| 7,112,629 | B2 | 9/2006 | Niu et al. |
| 7,115,675 | B2 | 10/2006 | Schut |
| 7,119,133 | B2 | 10/2006 | Vincent |
| 7,125,100 | B2 | 10/2006 | Ishizawa et al. |
| 7,129,284 | B2 | 10/2006 | Ma |
| 7,148,182 | B2 | 12/2006 | Field et al. |
| 7,150,522 | B2 | 12/2006 | Sen |
| 7,152,965 | B2 | 12/2006 | Ishizawa et al. |
| 7,157,504 | B2 | 1/2007 | Ma et al. |
| 7,159,975 | B2 | 1/2007 | Yue |
| 7,163,577 | B2 | 1/2007 | Tyrell |
| 7,165,836 | B2 | 1/2007 | Ahlvin et al. |
| 7,173,078 | B2 | 2/2007 | Lamprey et al. |
| 7,204,872 | B2 | 4/2007 | Uhlir-Tsang |
| 7,204,873 | B2 | 4/2007 | Bauer |
| 7,214,260 | B2 | 5/2007 | Doi et al. |
| 7,217,315 | B2 | 5/2007 | Bauer |
| 7,220,303 | B2 | 5/2007 | Tyvoll |
| 7,220,304 | B2 | 5/2007 | Momose et al. |
| 7,220,528 | B2 | 5/2007 | Ganapathiappan |
| 7,221,878 | B2 | 5/2007 | Chen |
| 7,241,334 | B2 | 7/2007 | Srinivas |
| 7,247,195 | B2 | 7/2007 | Dodge et al. |
| 7,253,216 | B2 | 8/2007 | Miyabayashi |
| 7,264,662 | B2 | 9/2007 | Dodge et al. |
| 7,294,183 | B2 | 11/2007 | Tyvoll |
| 7,294,185 | B2 | 11/2007 | Belmont et al. |
| 7,297,202 | B2 | 11/2007 | Ichinose et al. |
| 7,314,273 | B2 | 1/2008 | Robertson et al. |
| 7,355,044 | B2 | 4/2008 | Vanmaele et al. |
| 7,390,441 | B2 | 6/2008 | Bollepalli |
| 7,393,403 | B2 | 7/2008 | Lee et al. |
| 7,413,683 | B2 | 8/2008 | Bollepalli |

| | | | | | | |
|---|---|---|---|---|---|---|
| 7,416,587 | B2 | 8/2008 | Kondo | EP | 0960911 | 12/1999 |
| 7,416,594 | B2 | 8/2008 | Moffatt | EP | 1045014 | 10/2000 |
| 7,416,597 | B2 | 8/2008 | Rehman | EP | 1061107 | 12/2000 |
| 7,497,563 | B2 | 3/2009 | Rehman | EP | 1132439 | 9/2001 |
| 2001/0018472 | A1 | 8/2001 | Parazak et al. | EP | 1243625 | 9/2002 |
| 2001/0031422 | A1 | 10/2001 | Iwasaki | EP | 1418209 | 5/2004 |
| 2002/0005146 | A1 | 1/2002 | Palumbo et al. | EP | 1469042 | 10/2004 |
| 2002/0088375 | A1 | 7/2002 | Komatsu et al. | EP | 1533347 | 5/2005 |
| 2002/0130938 | A1 | 9/2002 | Kowalski | EP | 1616913 | 1/2006 |
| 2002/0144626 | A1 | 10/2002 | Schut | EP | 1616915 | 1/2006 |
| 2002/0158952 | A1 | 10/2002 | Adachi et al. | EP | 1681320 | 7/2006 |
| 2002/0195022 | A1 | 12/2002 | Moffatt et al. | FR | 2672307 | 8/1992 |
| 2003/0019398 | A1 | 1/2003 | Komatsu et al. | GB | 668724 | 3/1948 |
| 2003/0019529 | A1 | 1/2003 | Reinelt | GB | 688776 | 3/1953 |
| 2003/0024434 | A1 | 2/2003 | Butler et al. | GB | 788195 | 12/1957 |
| 2003/0038869 | A1 | 2/2003 | Kaneko et al. | GB | 916132 | 1/1963 |
| 2003/0164114 | A1 | 9/2003 | Kitayama et al. | GB | 1348850 | 3/1974 |
| 2003/0205171 | A1 | 11/2003 | Adams et al. | GB | 1386543 | 3/1975 |
| 2003/0209166 | A1 | 11/2003 | Vanmaele et al. | GB | 1527396 | 10/1978 |
| 2004/0006157 | A1 | 1/2004 | Gloster et al. | GB | 1537379 | 12/1978 |
| 2004/0020407 | A1 | 2/2004 | Kato et al. | JP | 59122555 | 7/1984 |
| 2004/0035323 | A1 | 2/2004 | Suzuki et al. | JP | 59184161 | 10/1984 |
| 2004/0074018 | A1 | 4/2004 | Wuzik et al. | JP | 60115665 | 6/1985 |
| 2004/0092647 | A1 | 5/2004 | Chauvin | JP | 3279369 | 12/1991 |
| 2004/0103822 | A1 | 6/2004 | Champlin | JP | 5255607 | 10/1993 |
| 2004/0169165 | A1 | 9/2004 | Srinivas | JP | 6128517 | 5/1994 |
| 2004/0201658 | A1 | 10/2004 | Jackson et al. | JP | 7258578 | 10/1995 |
| 2004/0229974 | A1 | 11/2004 | Miyabayashi | JP | 8003498 | 1/1996 |
| 2004/0252162 | A1 | 12/2004 | Gondek et al. | JP | 8283596 | 10/1996 |
| 2005/0020728 | A1 | 1/2005 | Nagaswa et al. | JP | 10036726 | 2/1998 |
| 2005/0129015 | A1 | 6/2005 | Jamieson et al. | JP | 10036727 | 2/1998 |
| 2005/0171238 | A1 | 8/2005 | Bauer et al. | JP | 10067957 | 3/1998 |
| 2005/0171239 | A1 | 8/2005 | Bauer et al. | JP | 10110110 | 4/1998 |
| 2005/0171240 | A1 | 8/2005 | Bauer et al. | JP | 10110111 | 4/1998 |
| 2005/0183629 | A1 | 8/2005 | McCain | JP | 10110112 | 4/1998 |
| 2005/0187312 | A1 | 8/2005 | Akers, Jr. et al. | JP | 10110114 | 4/1998 |
| 2005/0190244 | A1 | 9/2005 | Tyrell | JP | 10120958 | 5/1998 |
| 2005/0199152 | A1 | 9/2005 | Hale et al. | JP | 10195331 | 7/1998 |
| 2005/0199155 | A1 | 9/2005 | Lauw et al. | JP | 10195360 | 7/1998 |
| 2005/0204957 | A1 | 9/2005 | Momose et al. | JP | 10237349 | 9/1998 |
| 2005/0223938 | A1 | 10/2005 | Tyvoll | JP | 10330665 | 12/1998 |
| 2006/0004790 | A1 | 1/2006 | Brown et al. | JP | 11246806 | 9/1999 |
| 2006/0070549 | A1 | 4/2006 | Jung et al. | JP | 11323175 | 11/1999 |
| 2006/0071992 | A1 | 4/2006 | Sarkisian et al. | JP | 11349312 | 12/1999 |
| 2006/0135361 | A1 | 6/2006 | Markel et al. | JP | 2000053902 | 2/2000 |
| 2006/0150345 | A1 | 7/2006 | Mazza | JP | 2000345085 | 12/2000 |
| 2006/0162612 | A1 | 7/2006 | Kabalnov et al. | JP | 2000345086 | 12/2000 |
| 2006/0176349 | A1 | 8/2006 | Nagai et al. | JP | 2000345094 | 12/2000 |
| 2006/0189717 | A1 | 8/2006 | Johnson et al. | JP | 2000345095 | 12/2000 |
| 2006/0201380 | A1 | 9/2006 | Kowalski | JP | 2002097236 | 4/2002 |
| 2006/0211790 | A1 | 9/2006 | Burns et al. | JP | 2002220557 | 8/2002 |
| 2006/0211791 | A1 | 9/2006 | Burns et al. | JP | 2003105235 | 4/2003 |
| 2007/0154821 | A1 | 7/2007 | Galloway et al. | JP | 2003117995 | 4/2003 |
| 2007/0277699 | A1 | 12/2007 | Bauer | JP | 2004010632 | 1/2004 |
| 2007/0289072 | A1 | 12/2007 | Mazza | JP | 2005048114 | 2/2005 |
| 2008/0047462 | A1 | 2/2008 | Klein et al. | JP | 2005097491 | 4/2005 |
| 2008/0115695 | A1 | 5/2008 | Sujeeth et al. | JP | 2005132985 | 5/2005 |
| 2008/0119613 | A1 | 5/2008 | Klein et al. | JP | 2005349827 | 12/2005 |
| 2008/0121138 | A1 | 5/2008 | Kennedy et al. | JP | 2006265379 | 10/2006 |
| 2008/0152808 | A1 | 6/2008 | Kabalnov et al. | WO | WO 92/13983 | 8/1992 |
| 2008/0308002 | A1 | 12/2008 | Moffatt | WO | WO 93/08237 | 4/1993 |
| 2010/0061951 | A1 | 3/2010 | Sujeeth et al. | WO | WO 93/12939 | 7/1993 |
| 2010/0251932 | A1 | 10/2010 | Sujeeth et al. | WO | WO 94/05732 | 3/1994 |
| | | | | WO | WO 96/06729 | 3/1996 |
| | FOREIGN PATENT DOCUMENTS | | | WO | WO 96/18688 | 6/1996 |
| CA | | 2198750 | 3/1996 | WO | WO 96/24636 | 8/1996 |
| CA | | 2207414 | 6/1996 | WO | WO 99/61529 | 12/1999 |
| CA | | 2258188 | 12/1997 | WO | WO 99/63007 | 12/1999 |
| DE | | 4215367 | 11/1993 | WO | WO 00/30609 | 1/2000 |
| DE | | 19618564 | 11/1997 | WO | WO 00/75246 | 12/2000 |
| DE | | 19823866 | 2/1999 | WO | WO 01/51566 | 7/2001 |
| DE | | 19831869 | 1/2000 | WO | WO 01/62862 | 8/2001 |
| DE | | 102005010468 | 9/2006 | WO | WO 02/090448 | 11/2002 |
| EP | | 0475075 | 3/1992 | WO | WO 02/092680 | 11/2002 |
| EP | | 0688836 | 12/1995 | WO | WO 03/100884 | 12/2003 |
| EP | | 0761783 | 3/1997 | WO | WO 2004/011558 | 2/2004 |
| EP | | 0778798 | 6/1997 | WO | WO 2004/012515 | 2/2004 |
| EP | | 0834537 | 4/1998 | WO | WO 2004/094537 | 11/2004 |
| EP | | 0894835 | 3/1999 | WO | WO 2005/028576 | 3/2005 |

| WO | WO 2005/113677 | 12/2005 |
| WO | WO 2006/039034 | 4/2006 |
| WO | WO 2006/066132 | 6/2006 |
| WO | WO 2006/069165 | 6/2006 |
| WO | WO 2006/081299 | 8/2006 |
| WO | WO 2006/086660 | 8/2006 |
| WO | 2007/021731 | 2/2007 |
| WO | WO 2007/057111 | 5/2007 |
| WO | 2007/136540 | 11/2007 |
| WO | WO 2008/018873 | 2/2008 |
| WO | WO 2008/049735 | 5/2008 |
| WO | WO 2008/055244 | 5/2008 |
| WO | WO 2008/055245 | 5/2008 |
| WO | WO 2009/026552 | 2/2009 |
| WO | 2009/075802 | 6/2009 |
| WO | 2010/022377 | 2/2010 |

OTHER PUBLICATIONS

BASF Corporation, Joncryl® 1655, data sheet (Dec. 5, 2008) 4 pages.
BASF Corporation, Joncryl® 1670, data sheet (Dec. 5, 2008) 2 pages.
BASF Corporation, Joncryl® 1680, data sheet (Dec. 5, 2008) 2 pages.
BASF Corporation, Joncryl® 1695, data sheet (Dec. 5, 2008) 2 pages.
BASF Corporation, Joncryl® 2153, data sheet (Dec. 5, 2008) 2 pages.
BASF Corporation, Joncryl® 2350, data sheet (Dec. 12, 2008) 2 pages.
BASF Corporation, Joncryl® 2640, data sheet (Dec. 5, 2008) 2 pages.
BASF Corporation, Joncryl® 2641, data sheet (Nov. 14, 2008) 2 pages.
BASF Corporation, Joncryl® 2646, data sheet (Dec. 5, 2008) 2 pages.
BASF Corporation, Joncryl® 2660, data sheet (Nov. 13, 2008) 3 pages.
BASF Corporation, Joncryl® 2664, data sheet (Dec. 5, 2008) 4 pages.
BASF Corporation, Joncryl® 50, data sheet (Dec. 10, 2008) 2 pages.
BASF Corporation, Joncryl® 537, data sheet (Dec. 10, 2008) 3 pages.
BASF Corporation, Joncryl® 538-A, data sheet (Nov. 14, 2008) 3 pages.
BASF Corporation, Joncryl® 58, data sheet (Dec. 10, 2008) 2 pages.
BASF Corporation, Joncryl® 585, data sheet (Dec. 10, 2008) 2 pages.
BASF Corporation, Joncryl® 60, data sheet (Dec. 11, 2008) 2 pages.
BASF Corporation, Joncryl® 61, data sheet (Dec. 11, 2008) 2 pages.
BASF Corporation, Joncryl® 611, data sheet (Dec. 11, 2008) 3 pages.
BASF Corporation, Joncryl® 617-A, data sheet (Nov. 13, 2008) 2 pages.
BASF Corporation, Joncryl® 62, data sheet (Dec. 11, 2008) 2 pages.
BASF Corporation, Joncryl® 624, data sheet (Nov. 13, 2008) 2 pages.
BASF Corporation, Joncryl® 63, data sheet (Dec. 11, 2008) 2 pages.
BASF Corporation, Joncryl® 631, data sheet (Dec. 11, 2008) 2 pages.
BASF Corporation, Joncryl® 636, data sheet (Dec. 5, 2008) 2 pages.
BASF Corporation, Joncryl® 646, data sheet (Dec. 11, 2008) 3 pages.
BASF Corporation, Joncryl® 655, data sheet (Dec. 11, 2008) 3 pages.
BASF Corporation, Joncryl® 660, data sheet (Dec. 11, 2008) 3 pages.
BASF Corporation, Joncryl® 67, data sheet (Dec. 11, 2008) 2 pages.
BASF Corporation, Joncryl® 678, data sheet (Dec. 11, 2008) 3 pages.
BASF Corporation, Joncryl® 680, data sheet (Dec. 11, 2008) 2 pages.
BASF Corporation, Joncryl® 682, data sheet (Dec. 11, 2008) 3 pages.
BASF Corporation, Joncryl® 690, data sheet (Dec. 11, 2008) 3 pages.
BASF Corporation, Joncryl® 693, data sheet (Dec. 11, 2008) 3 pages.
BASF Corporation, Joncryl® 74, data sheet.
BASF Corporation, Joncryl® 74-A, data sheet (Nov. 12, 2008) 2 pages.
BASF Corporation, Joncryl® 74-A, data sheet (Dec. 5, 2008) 2 pages.
BASF Corporation, Joncryl® 750, data sheet (Nov. 13, 2008) 3 pages.
BASF Corporation, Joncryl® 77, data sheet (Dec. 11, 2008) 2 pages.
BASF Corporation, Joncryl® 80, data sheet (Nov. 13, 2008) 2 pages.
BASF Corporation, Joncryl® 89, data sheet (Dec. 11, 2008) 2 pages.
BASF Corporation, Joncryl® 9010, preliminary data sheet (Jan. 22, 2009) 4 pages.
BASF Corporation, Joncryl® 99, data sheet (Dec. 11, 2008) 2 pages.
BASF Corporation, Joncryl® DFC 3025, data sheet (Nov. 12, 2008) 2 pages.
BASF Corporation, Joncryl® DFC 3030, data sheet (Nov. 12, 2008) 2 pages.
BASF Corporation, Joncryl® DFC 3040, data sheet (Nov. 13, 2008) 2 pages.
BASF Corporation, Joncryl® DFC 3050, data sheet (Nov. 12, 2008) 2 pages.
BASF Corporation, Joncryl® ECO 2124, data sheet (Nov. 14, 2008) 2 pages.
BASF Corporation, Joncryl® FLX 5000, data sheet (Nov. 14, 2008) 3 pages.
BASF Corporation, Joncryl® HPD 196, data sheet (Mar. 12, 2009) 3 pages.
BASF Corporation, Joncryl® HPD 296, data sheet (Dec. 11, 2008) 3 pages.
BASF Corporation, Joncryl® HPD 671, data sheet (Dec. 11, 2008) 4 pages.
BASF Corporation, Joncryl® HPD 696, data sheet (Nov. 26, 2008) 3 pages.
BASF Corporation, Joncryl® HPD 71, data sheet (Dec. 11, 2008) 2 pages.
BASF Corporation, Joncryl® HPD 96, data sheet (Dec. 11, 2008) 2 pages.
BASF Corporation, Joncryl® HRC 1645, data sheet (Nov. 13, 2008) 2 pages.
BASF Corporation, Joncryl® HRC 1661, data sheet (Nov. 13, 2008) 2 pages.
BASF Corporation, Joncryl® HRC 1663, data sheet (Nov. 13, 2008) 2 pages.
BASF Corporation, Joncryl® LMV 7000 Series User's Guide (2009) 3 pages.
BASF SE, "Faster, stronger and more efficient! Joncryl® HPD 296—water-based resin technology for high performance pigment dispersions" brochure (2009) 8 pages.
BASF, "BASF Resins," http://www2.basf.us/naftaresins/, Publication date unknown, last printed Mar. 10, 2009, 1 page.
Bristow, J.A., "Liquid absorption into paper during short time intervals," Svensk Papperstidning (1967) 70(19):623-629.
BYK-Chemie GmbH, Data Sheet W210 for DISPERBYK-190, DISPERBYK-191, DISPERBYK-192, DISPERBYK-194 (2008) 4 pages.
Cabot Corporation, "CAB-O-JET® 200" (Feb. 2009) 1 page.
Carbon Black Handbook, published by Carbon Black Society, issued by Tosho Shuppan Co. p. 440-441.
Cary Company, The, "Degussa Carbon Blacks," http://www.thecarycompany.com/products/Degussa-Blacks.html (Jun. 8, 2007) 3 pgs.
Casas-Ballester, R., Recharger Magazine (Jul. 1999).
Columbian Chemicals brochure, "Raven blacks: industrial applications require powerful solutions," Apr. 22, 2005, 5 pages.
Concise Encyclopedia of Polymers, Science & Engineering (1990) 160-171.
Cytec Surface Specialties, "Fiche de donnees de securite conforme a la Directive 2001/58/CE, Ebercryl 2003" (2005) 8 pages.

Degussa, "Purity of Pigment Black," Technical Information TI 1223 (Feb. 2001) 3 pages.
Degussa, What is Carbon Black? Brochure, 9 pages.
Donnet, J.B. et al., "No. 294—Etude de l'action chimique des oxydants sur le noir de carbone" or "No. 294—Study of he chemical action of oxidants on carbon black," (1962) 1727-1735 (with English translation).
Donnet, J.B. et al., "Radical reactions and surface chemistry of carbon black No. 252," Bull. Soc. Chim. Fr. (1960) 1609-1618.
Donnet, J.B. et al., "Surface chemistry and priviledged sites of fine charges," Extract from the revue General du Caoutchouc (1959) 3-12 (28 pages).
Ehrburger, D.F. et al., "Use of N2, Ar and CO2 adsorption for the determination of microporosity and surface fractal dimension of carbon blacks and silicas," Pure & Appl. Chem. (1993) 65(10):2223-2230.
Fujiu, T. et al., "Oxidation of hydrazino-1,3,5-triazine," Nippon Kagaku Kaishi (1989) 1652-1654.
Galgoci, E.C. et al., "Innovative molecular defoamer technology," Air Products and Chemicals, Inc., Pub. No. 120-05-017-GLB (2004) 1-19.
Hanke, M.T. et al., "Studies on proteinogenous amines. XIV. A microchemical colorimetric method for estimating tyrosine, tyramine and other phenols," J. Biol. Chem. (1922) 50:235-270.
Harris, J.M., "Laboratory synthesis of polytheylene glycol derivatives," JMS—Rev. Macromol. Chem. Phys. (1985) C25(3):325-373.
Hirtt, P., "Carbon black oil absorption, ASTM D2414 and D3493 recent evolution and changes," India Rub Tech Expo 2004, Feb. 13-14, 2004, Mysore, Karnataka, India.
http:inoxairproducts.com/chemicals/surfynoladditives.html Surfynol & Dynol Additives (Aug. 14, 2009—originally accessed Sep. 10, 2007).
http://www.answers.com/topic/sulfonation-and-sulfation, "Sulfonation and sulfation," (2009) 1 page.
http:www.nissin-chem.co.jp/english/products/new.html, "Surfynol/Olfine" (Aug. 14, 2009—originally accessed Sep. 10, 2007).
Huntsman Corporation, "JEFFSPERSE® X3102 Dispersant" Advanced Technical Bulletin (2008) 2 pages.
Huntsman Corporation, "SURFONAMINE® B-60 Amine" Technical Bulletin (2007) 2 pages.
Huntsman Corporation, "SURFONAMINE® L-100 Amine" Technical Bulletin (2007) 2 pages.
Huntsman Corporation, "SURFONAMINE® L-207 Amine" Technical Bulletin (2007, 2008) 2 pages.
Huntsman Corporation, "SURFONAMINE® L-300 Amine" Technical Bulletin (2007, 2008) 2 pages.
Huntsman Corporation, "The use of SURFONAMINE® amines in ink and pigment applications," Technical Bulletin (2006) 5 pages.
International Agency for Research on Cancer (IARC)—Summaries and Evaluations "Carbon Black" (1996) 65:149.
Johnson Polymer, Material Safety Data Sheet for JONCRYLφ HPD 296 (2005) 1-5.
Johnson Polymer, Material Safety Data Sheet for JONCRYLφ HPD 96 (2004) 1-5.
Johnson, J.E., "Surface modification of black pigments: a novel approach for advancing black pigment performance in imaging systems," Proceedings of IS&T Annual Conference XX, XX, No. 50th Conference (1997) 310-312.
Knapp, D.R., "Derivation of particular compound types," in Handbook of analytical derivatization reactions, 9th Edition, John Wiley & Sons (1979) p. 60.
Koessler, K.K. et al., "Studies on proteinogenous amines. II. A microchemical colorimetric method for estimating imidazole derivatives," J. Biol. Chem. (1919) 39:497-519.
Kunishima, M. et al., "Development of chlorotriazine polymer dehydrocondensing reagents (Poly-Trzs)," Tetrahedron (2007) 63:2604-2612.
Lahaye, J. et al., "Surface chemistry of carbon: an atomistic approach," Pure & Appl. Chem. (1989) 61(11):1853-1858.
Lessard, B. et al., "Styrene/acrylic acid random copolymers synthesized by nitroxide-mediated polymerization: effect of free nitroxide on kinetics and copolymer composition," Macromolecules (2008) 41(10):3446-3454.

Luthge, T. et al., "New methods of carbon black surface modification," IS&T's NIP 19:2003 International Conference on Digital Printing Technologies, p. 194-198.
Mackenzie, J.D. et al., "Physical properties of sol-gel coatings," J. Sol-Gel Science & Tech. (2000) 19:23-29.
Mellor, J.W., "Oxides and oxyacids of chlorine, etc.," from Modern Inorganic Chemistry, Longmans, Green and Co., New York (1925) p. 334-335.
National Industrial Chemicals Notification and Assessment Scheme (NICNAS), Full Public Report "Polymer in JONCRYL® HPD 96 MEA," (2006) 1-7.
Nippon Shokubai, "Polyethyleneimine: EPOMIN" taken from http://www.shokubai.co.jp/eng/products/epomin.html (2006) 10 pages.
PMB, Ltd., "What is masterbatch?" http://www.pmb.co.uk/masterbatch.htm (2007) 2 pages.
Powell Fabrication & Manufacturing Inc., "General Information about sodium hypochlorite," http://www.powellfab.com/technical_information/preview/general_info_about_sodium_hypo.asp, First date available unknown, Jun. 10, 2009.
Sartomer Company, Inc., Product Bulletin: SMA® 1440 H Solution (2002) 1 page.
Sartomer Company, Inc., Product Bulletin: SMA® 17352 H Solution (2002) 1 page.
Sax, N.I., Dangerous Properties of Industrial Materials, Reinhold Publishing Corporation, New York (1957) 778 and 1122.
Sensient Imaging Technologies, Inc., Material Safety Data Sheet for JONCRYL 678 Sol Exp. 8003-112-01 (2008) 1-4.
Subramanian, R.V., "Electrochemical polymemrization and deposition on carbon fibers," Pure & Appl. Chem. (1980) 52:1929-1937.
Suetsugu, A. et al., "Effects of amphiphilic amines on moisture characteristics of alluvial and volcanic soils," Soil. Sci. Soc. Am. J. (2001) 65:1129-1135.
Textile Printing, LCW Miles, 2nd Edition (1994) ch. 3.2.
Torres, L. et al., "Isolation and characterization of an Fe(III)-chelating compound produced by pseudomonas syringae," App. Environ. Microbiol. (1986) 52(1):157-160.
Tsubokawa, N. et al., "Grafting of polyesters onto carbon black. 2. Effect of temperature and solvent on the polymerization of beta-propiolactone initiated by COOK groups on the surface of carbon black," Polymer Bulletin (1982) 7:589-596.
Tsubokawa, N., "Carbon-black," Polymer Sci. Tech. (1991) 2(2):71-80.
Tsubokawa, N. et al., "Grafting onto carbon black having few functional group I. Introduction of carboxyl group by use of radical initiator and its application for grating of polyesters," Nihon Gomu Kyoukaishi (1989) 62:668-673 (Abstract only).
Tsubokawa, N. et al., "Reactive carbon black having isocyanate or acyl azide group. Preparation and reaction with polymers having hydroxyl group," Polymer Bulletin (1985) 13:215-222.
Tsubokawa, N. et al., "Grafting of functional polymers onto reactive carbon black having chlorotriazinyl groups," Polymer Journal (1988) 20(9):721-728.
Tsubokawa, N. et al., "Grafting onto carbon black by the reaction of reactive carbon black having acyl chloride group with several polymers," Polymer Bulletin (1987) 17:87-93.
Tsubokawa, N. et al., "Grafting onto carbon black by the reaction of reactive carbon black having epoxide groups with several polymers," J. Poly. Sci. Part A: Poly Chem. (1980) 27:1701-1718.
Tsubokawa, N., "Functionalization of carbon black by surface grafting of polymers," Prog. Polym. Sci. (1992) 17:417-470.
Vancha, A.R. et al., "Use of polyethyleneimine polymer in cell culture as attachment factor and lipofection enhancer," BMC Biotechnology (2004) 4:23, 12 pages.
Voorhies, J.D. et al., "Coulometry with the carbon black electrode," Anal. Chem. (1960) 32(13):1855-1857.
International Search Report and Written Opinion of Application No. PCT/US2007/083257 dated Apr. 14, 2008 (9 pages).
International Search Report and Written Opinion of Application No. PCT/US2007/083258 dated Apr. 14, 2008 (9 pages).
Partial International Search for Application No. PCT/US2008/074086 dated Apr. 6, 2009 (3 pages).
United States Patent Office Notice of Allowance for U.S. Appl. No. 11/933,116 dated Dec. 10, 2010 (4 pages).
United States Office Action for U.S. Appl. No. 11/933,116 dated Feb. 13, 2009 (8 pages).

United States Office Action for U.S. Appl. No. 11/933,192 dated Apr. 2, 2009 (11 pages).
International Search Report and Written Opinion for Application No. PCT/US2008/074086 dated Aug. 18, 2009 (13 pages).
Invitation to Pay Additional Fees and Partial International Search for Application No. PCT/US2009/054700 dated Jul. 8, 2010 (5 pages).
International Search Report and Written Opinion for Application No. PCT/US2009/054700 dated Sep. 28, 2010 (20 pages).
United States Patent Office Action for U.S. Appl. No. 11/933,192 dated Sep. 15, 2010 (10 pages).
Invitation to Pay Additional Fees and Partial International Search for Application No. PCT/US2010/030311 dated Dec. 7, 2010 (5 pages).
United States Patent Office Notice of Allowance for U.S. Appl. No. 11/933,116 dated Dec. 10, 2010 (4 pages).
United States Patent Office Notice of Allowance for U.S. Appl. No. 11/933,192 dated Mar. 2, 2011 (12 pages).

US 7,964,033 B2

SELF-DISPERSED PIGMENTS AND METHODS FOR MAKING AND USING THE SAME

CROSS-REFERENCE TO RELATED APPLICATIONS

This application claims priority under 35 U.S.C. §119(e) to U.S. Provisional Patent Application No. 60/957,596, filed Aug. 23, 2007. The entire contents of this application are hereby incorporated by reference in their entirety.

FIELD OF USE

The present invention relates to a method of making self-dispersing pigments. More particularly, the present invention relates to the surface modification of pigments. Pigments whose surfaces are modified through covalent bonding are known in the industry as self-dispersing pigments. The surface modifications may be carried out in an aqueous environment and may be eco friendly. The invention further relates to end use applications comprising surface-modified pigments, including, without limitation, coatings, paints, papers, adhesives, latexes, toners, textiles, fibers, plastics, and inks. Specific examples of end uses include, without limitation, printing ink for paper, textiles, fibers, metal deco and plastics, wood stains, writing instruments, and color filters. The invention also related to inks such as inkjet inks.

BACKGROUND

Pigments offer several advantages over water-soluble dyes when it comes to inks, coatings, paints, papers, adhesives, latexes, toners, textiles, fibers, wood stains, color filters, and plastics. Pigments may exhibit at least one of greater light-fastness, waterfastness, optical density and edge acuity than water-soluble dyes. Unfortunately, pigments also have a greater propensity to settle during storage, thus initially limiting their use in demanding applications such as inkjet inks. The advent of media mills to grind pigment particles to submicron level combined with chemical additives for colloidal stability has propelled the use of pigment dispersions in inkjet ink formulations. However, chemical additives can increase the viscosity of dispersions such that it becomes difficult to jet the ink from the small orifices in an inkjet printhead. Moreover, chemical additives can add significant cost to the preparation of the materials listed above and are therefore economically unfavorable as well. Chemical additives, or dispersants, may not be bonded to the surface of the pigment and therefore, stabilization may be compromised. A need remains for improved ink compositions, especially for use in inkjet printers, which overcome at least some of the problems typically associated with current dye-based systems and pigment systems employing chemical additives. A need also remains for improved materials that use pigments, which overcome at least some of the problems typically associated with current dye based systems and pigment systems employing chemical additives.

SUMMARY

In one aspect, the invention may provide a method of modifying a pigment that may include reacting cyanuric chloride with about three equivalents of a secondary compound or a mixture of secondary compounds to displace all reactive chlorines to form a substituted triazine. The substituted triazine may be reacted with a surface of a pigment to form a surface modified pigment.

In another aspect, the invention may provide a method of modifying a pigment that may include reacting a reactive compound having an X-$[Y]_n$ reactive group with a secondary compound N-S-ZM to form a substituted reactive intermediate $[Y]_a$-X-$(N-S-ZM)_b$. The method may also include reacting a pigment with the substituted reactive intermediate $[Y]_a$-X-$(N-S-ZM)_b$ to attach the substituted reactive intermediate to the surface of the pigment to form a surface modified pigment. X may be a sulfonyl, phosphoryl, or 1,3,5-triazinyl group. Y may be a halogen leaving group, N may be a nucleophilic group, S may be an organic group, and ZM may be an ionizable end group. Also, n may be an integer between 1 and 3, b may be an integer between 1 and 3, and $a=n-b$. When n is equal to or greater than b, and if b is 2 or 3, each N-S-ZM can be the same or different.

In yet another aspect, the invention may provide a method of modifying a pigment that may include attaching a reactive group to a surface of a pigment. Subsequently the reactive group may be displaced with an organic substrate having an ionizable end group. The pigment may be selected from the group consisting of pigment red 122, pigment violet 19, pigment violet 23, pigment red 202, pigment red 188, pigment yellow 155, pigment yellow 97, pigment green 7, pigment blue 15:3, pigment blue 15:4, and pigment yellow 74.

In a further aspect, the invention may provide a method of modifying a pigment that may include attaching a reactive group X-Y to a surface of a pigment. Subsequently Y may be displaced with an organic substrate N-S-ZM to form a surface-modified pigment having attached X-N-S-ZM. X may be a sulfonyl, phosphoryl, or 1,3,5-triazine group. Y may be fluorine, chlorine, bromine, or iodine. N may be an amine, an imine, a pyridine, or a thiol group. S may be substituted or unsubstituted alkyls, aryls, or polymer chains having a molecular weight range from about 300 to about 8000. Z may be a carboxyl, sulfonyl, phenolic, phosphoryl, ammonium, trimethylammonium, or tributylammonium group. M may be a halide, a negatively charged ion, a proton in salt form, or a cation in salt form.

Other aspects of the invention will become apparent by consideration of the detailed description and accompanying drawings.

DETAILED DESCRIPTION

Figure 1:
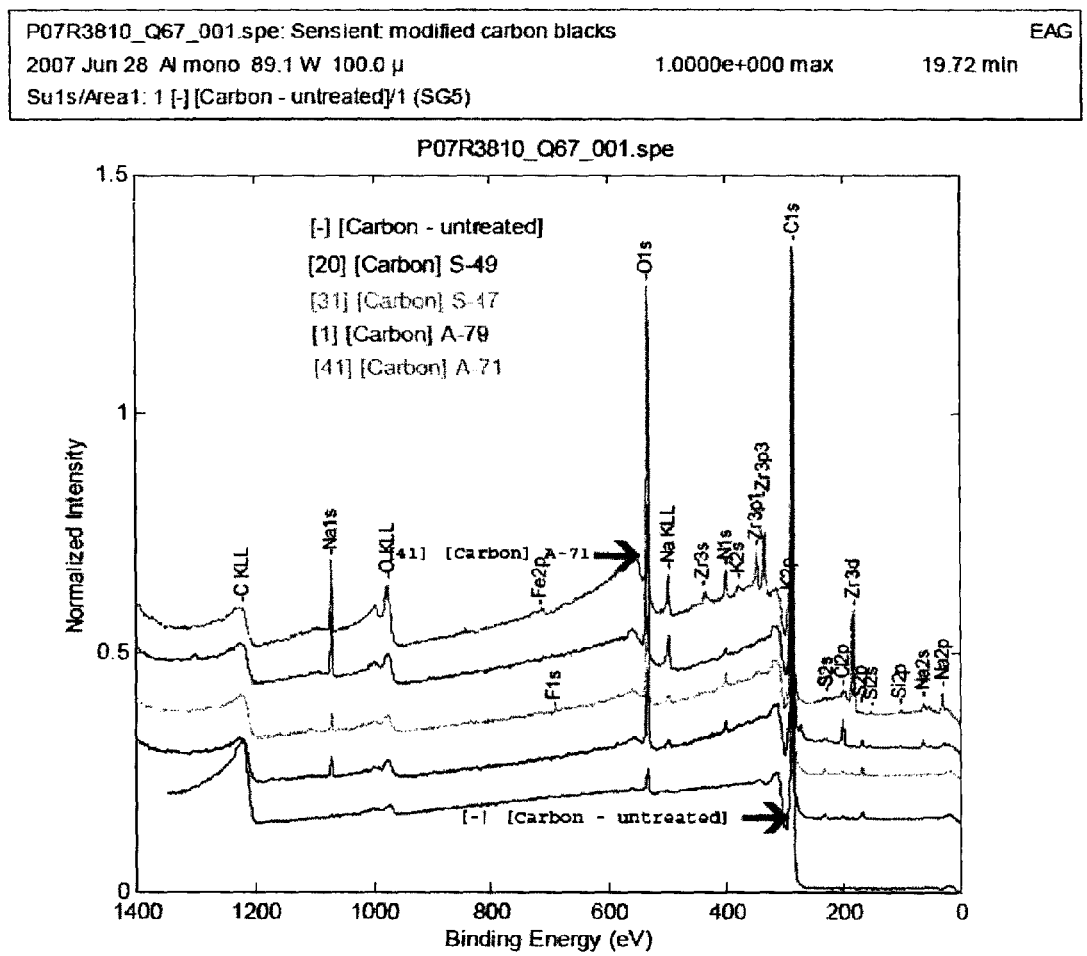
FIG. 1 displays low resolution X-Ray Photoelectron Spectroscopy (XPS) spectra for untreated carbon black samples and carbon black samples from Examples 1, 20, 31, and 41.

Before any embodiments of the invention are explained in detail, it is to be understood that the invention is not limited in its application to the details of construction and the arrangement of components set forth in the following description. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

It also is understood that any numerical range recited herein includes all values from the lower value to the upper value. For example, if a concentration range is stated as 1% to 50%, it is intended that values such as 2% to 40%, 10% to 30%, or 1% to 3%, etc., are expressly enumerated in this specification. These are only examples of what is specifically intended, and all possible combinations of numerical values between and including the lowest value and the highest value enumerated are to be considered to be expressly stated in this application.

In one embodiment, the invention provides a method of modifying a pigment. The method may include attaching an organic group with charged end groups (negative or positive) through the intermediacy of a reactive molecule to produce a surface stabilized modified pigment. Without being limited by theory, it is believed that the stabilization is achieved by an even distribution of similarly charged groups which are covalently attached on sub micron sized pigment particles by the forces of repulsion.

In another embodiment, the invention provides a method of modifying a pigment. The method may include a chlorosulfonation step to form a reactive sulfonyl chloride intermediate which is then reacted with a suitable organic molecule as described above. In one aspect, the degree of chlorosulfonation may be increased to yield a liquid gel or micelle-like composition, which, when milled with untreated pigment forms a stable dispersion.

In yet another embodiment, the invention provides a dispersion that includes a self-dispersing pigment that has been formed by a reaction of a pigment with a reactive intermediate that has been attached to suitable organic molecules as described above. The selection of reactive intermediates that are stable in an aqueous environment is another aspect of the present invention.

In another embodiment, the invention provides a method of modifying a pigment that may include attaching a reactive group to a surface of a pigment and subsequently displacing the reactive group with an organic substrate having an ionizable end group.

In a further embodiment, the invention provides a dispersion that includes a self-dispersing pigment comprising about 0.01 to about 1.0 mMoles of S and about 0.01 to about 2.0 mMoles of active hydrogen per gram of pigment, and water. In another embodiment, the invention provides a dispersion that includes a self-dispersing pigment comprising about 0.06 to about 0.7 mMoles of S and about 0.07 to about 1.6 mMoles of active hydrogen per gram of pigment, and water.

Method for Making Self-Dispersing Pigments

One aspect of the present invention relates to a method for making stable, self-dispersing pigments.

As used herein, the term "pigment" means a an insoluble in a solvent medium that is used to impart color to a substrate such as plain or coated paper, film and other types of receiving media. Pigments may be black as well as other colors.

As used herein, the term "self-dispersing" pigment means a pigment having stabilizing groups covalently attached to its surface such that the pigment forms a stable aqueous dispersion in the absence of any additional dispersing agents.

As used herein, the term "stable" means that on aging the dispersion will undergo minimal changes as demonstrated by less than 10% change in measured critical properties (such as at least one of mean particle size, viscosity, surface tension and pH) when stored at ambient temperature over a period of at least about three months to six months to two years. Accelerated test methods include a heat stability test at about 70° C. for at least about one week or a heat stability test at about 70° C. for at least about four weeks.

In a first embodiment, the method for making a self-dispersed pigment generally comprises (1) reacting a pigment (P) with a reactive compound having an X-Y reactive group and a halogen-containing reagent to attach the reactive group X-Y to the surface of the pigment (P), and thereby form a pigment reactive intermediate (P)X-Y; and (2) reacting the pigment reactive intermediate (P)X-Y with a secondary compound N-S-ZM to form a self-dispersed pigment (P) -X-S-ZM ("the substitution step"). One example of this embodiment may include, without limitation, a method of modifying a pigment that may comprise attaching a reactive group X-Y to a surface of a pigment; and subsequently displacing Y with an organic substrate N-S-ZM to form a surface modified pigment having attached X-N-S-ZM.

In a second embodiment, the method for making the self-dispersing pigment (P) -X-S-ZM may comprise (1) reacting a reactive compound having an X-Y reactive group with a secondary compound N-S-ZM to form a substituted reactive intermediate X-S-ZM ("the substitution step"); and (2) reacting a pigment (P) with the substituted reactive intermediate X-S-ZM to attach the substituted reactive intermediate X-S-ZM to the surface of the pigment using a secondary displacement reaction to form a self-dispersed pigment (P) -X-S-ZM. One example of this embodiment may include, without limitation, a method of modifying a pigment that may comprise reacting a reactive compound having an X-$[Y]_n$ reactive group with a secondary compound N-S-ZM to form a substituted reactive intermediate $[Y]_a$-X-$(N-S-ZM)_b$; and reacting a pigment with the substituted reactive intermediate $[Y]_a$-X-

(N-S-ZM)$_b$ to attach the substituted reactive intermediate to the surface of the pigment to form a surface modified pigment; wherein n is an integer between 1 and 3; b is an integer between 1 and 3; and a=n−b; wherein n is equal to or greater than b, and wherein if b is 2 or 3, each N-S-ZM may be the same or different. In one embodiment, if b is 2 or 3, each N-S-ZM may be different.

In a third embodiment, the method for making the self-dispersing pigment (P) -X-S-ZM may comprise (1) reacting a reactive compound having an X-Y reactive group with a secondary compound N-S-ZM to form a first substituted reactive intermediate X-S-ZM ("the substitution step"); (2) reacting a reactive compound having an X-Y reactive group with a different secondary compound N2-S2-Z2M2 from step (1) to form a second substituted reactive intermediate X-S2-Z2M2 ("the substitution step"); (3) reacting a pigment (P) with the substituted reactive intermediates X-S-ZM and X-S2-Z2M2 to attach the substituted reactive intermediates to form a self-dispersed pigment Z2M2-S2-X-(P) -X-S-ZM. Optionally S-ZM and S2-Z2M2 could be the same and all reactive groups will be substituted. The final attachment to the pigment surface could be one of radical assisted disproportionation reaction.

In a fourth embodiment, the method for making the self-dispersing pigment (P) -X-S-ZM may comprise (1) using a grind aid and milling and dispersing a pigment to form an aqueous pigment dispersion; (2) reacting a reactive compound having an X-Y reactive group with a secondary compound N-S-ZM to form a first substituted reactive intermediate X-S-ZM ("the substitution step"); (3) reacting a reactive compound having an X-Y reactive group with a different secondary compound N2-S2-Z2M2 from step (2) to form a second substituted reactive intermediate X-S2-Z2M2 ("the substitution step"); (4) reacting a pigment (P) pre-milled with a grind aid with the substituted reactive intermediates X-S-ZM and X-S2-Z2M2 to attach the substituted reactive intermediates X-S-ZM and X-S2-Z2M2 to the surface of the pigment using a radical initiated reaction to form a self-dispersed pigment Z2M2-S2-X-(P)(R) -X-S-ZM; and (5) purifying the self-dispersed pigment to remove impurities, including the grind aid. Optionally S-ZM and S2-Z2M2 could be the same.

In each of these embodiments, the reactive compound may have an X-Y reactive group, wherein X may include, without limitation, carbonyl, sulfonyl, phosphoryl, cyanuryl, and NH and Y may include, without limitation, acid halide leaving groups, including, without limitation, fluoride, chloride, bromide, and iodide. In one suitable embodiment, X may be sulfonyl, phosphoryl, or cyanuryl (1,3,5-triazinyl). The acid halide forming reagent contains a halogen. Examples of such reagents include, without limitation, chlorosulfonic acid, thionyl chloride, phosphoryl chloride, and combinations thereof. Other halogens may be substituted for the chlorine in these compounds. The reactive compound may be stable in an aqueous media for short durations at low temperatures.

During the substitution step, at least one leaving group Y of the X-Y reactive group is substituted with the secondary compound N-S-ZM, wherein N is a nucleophilic group such as an amine, an imine, pyridine, or thiol, S may include, without limitation, organic groups such as, substituted or unsubstituted, alkyls, aryls and polymer chains having from about 1 to greater than 100 carbons or having a molecular weight range from about 300 to about 8000, and in the case of stabilization by negative charge, ZM is an acidic tail group, wherein Z may be, without limitation, carboxyl, sulfonyl, phenolic, and phosphoryl and M may be either a proton or a cation if it is present as a salt form. This substitution may impart charge and bulk to the surface of the pigment. The substitution step may take place in an aqueous media. The choice of functional groups at the acidic tail is dictated by the final application while the functional groups at the basic head must have sufficient nucleophilicity to displace the leaving group Y. The secondary compound may comprise polymers, amines, amino acids, alcohols, thiols, and combinations thereof. Examples of secondary compounds and N2-S2-Z2M2 N-S-ZM include, without limitation, amino benzoic acids, amino benzene sulfonic acids, amino phenols, amino sulfonic acids, polyethoxylated amino acids, sodium sulfanilate, sulfanilic acid, sodium p-aminobenzoate, p-aminophenol, ethyl 4-aminobenzoate, taurine, oleic acid (amino), sodium aminooleate, tetramethylammonium 4-aminobenzoate, and sodium 4-aminophenolate. Additional secondary compounds include organic polymeric substrates. Examples of organic polymeric substrates may include, without limitation, linear alkyl and branched ethoxy and propoxy chain polymers with a known molecular weight range of 300-3000 MW, available from Huntsman Chemicals under the trade name "Surfonamines," linear polyethoxy polymeric amines, linear propoxy polymeric amines, styrene acrylic copolymers available from Johnson Polymers under the trade name "Joncryls," and polyethyleneimines sold under the trade name "Epomines".

In the case of stabilization by positive charge, ZM may be a positively charged quaternary ammonium type tail group, wherein Z may be, without limitation, ammonium, trimethylammonium, and tributylammonium, and M may be a halide or any negatively charged ion. Examples of secondary compounds N-S-ZM and N2-S2-Z2M2 include, without limitation, simple diamino aromatics or cationic polymers consisting of polyethyleneimines, polyguanidines, quaternary ammonium compounds etc.

The final self-dispersing pigment may be represented by the formula (P) -X-S-ZM for the first and second embodiments. In some instances, there may be multiple -S-ZMs attached to the pigment that comprise different secondary compounds. For the third embodiment, the final self-dispersing pigment may be represented by the formula Z2M2-S2-X-(P) -X-S-ZM. And finally, the use of "2" to modify N, Z, M and S is meant to denote that N2, Z2, M2 and S2 may be the same or different as N, Z, M and S. N2, Z2, M2 and S2 may be selected from the same options set forth above with respect to N, Z, M and S.

To help illustrate the invention, a specific example of the first embodiment is provided below, wherein P represents a pigment.

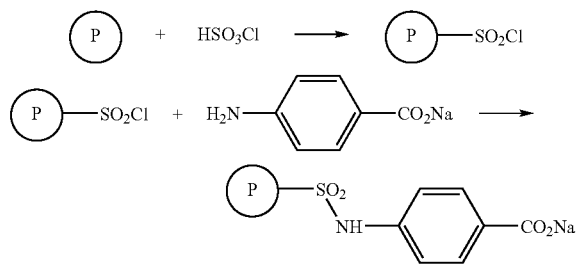

To help illustrate the invention, a specific example of the second embodiment is provided below, wherein P represents a pigment.

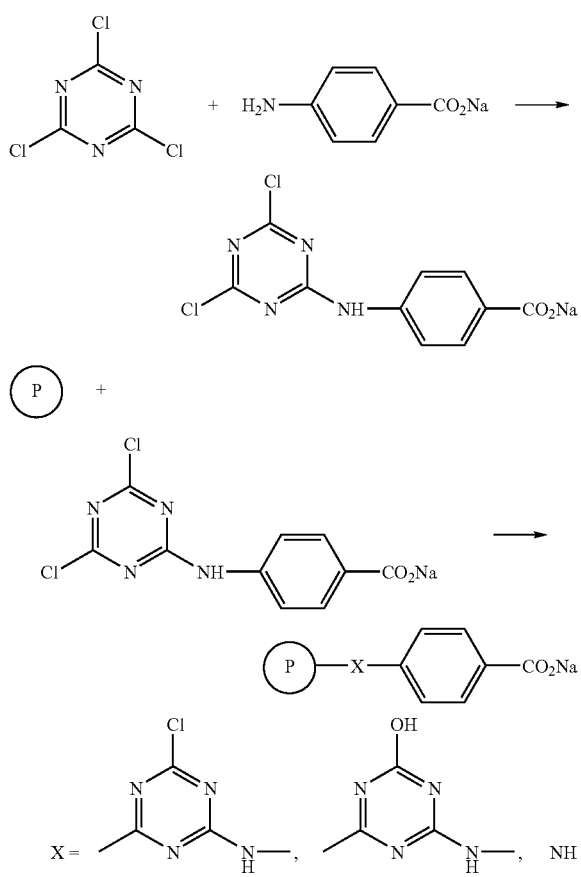

To help illustrate the invention, a specific example of the third embodiment is provided below, wherein P represents a pigment.

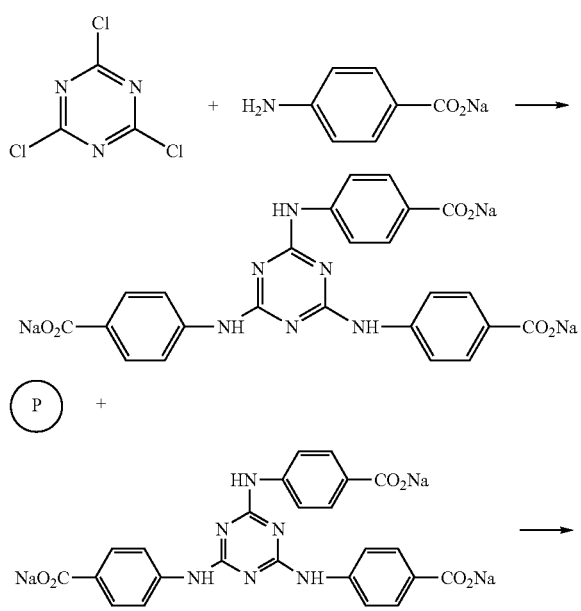

The embodiments of the invention are discussed in more detail below. Generally, the methods for making the self-dispersing pigment begin with selecting a source of pigment.

Pigments

Pigments that may be surface modified according to the present invention may include, but are not limited to, azo pigment, phthalocyanine pigment, anthraquinone pigment, quinacridone pigment, thioindigo pigment, triphenylmethane lake pigment, and oxazine lake pigment. Specifically, those having yellow colors include, for example, C. I. Pigment Yellow 1, 2, 3, 4, 5, 6, 10, 12, 13, 14, 16, 17, 65, 74, 83, 97, 138, 150, 151 and 155. Those having red colors include, for example, C. I. Pigment Red 1, 2, 3, 4, 5, 6, 7, 8, 9, 10, 11, 12, 13, 14, 15, 16, 17, 18, 21, 22, 23, 31,32,37,38,41,48,49,50, 51,52,57,58,60,64,83,88,89,90, 112, 114, 122, 123, 166, 188, 202, C. I. Pigment Violet 19 and 23. Those having blue colors include, for example, C. I. Pigment Blue 1, 2, 15, 15:3, 15:4, 16, 25, and 75. Those having green colors include, for example C.I. Pigment Green 7 and 36. Those having black colors include, for example, C. I. Pigment Black 1 and 7. Commercially available colored pigments include, for example, Pigment Red 122 and Pigment Violet 19 available from Lansco Colors, Montvale, N.J. or BASF Color, Charlotte, N.C. or Clariant Colors, Charlotte, N.C. or Sun Chemical, Cincinnati, Ohio, Pigment Blue 15:1 (available from Fanwood Chemical, Fanwood, N.J.), Pigment Blue 15:3, Pigment 15:4, Pigment Yellow 74 and Pigment Yellow 97 (available from BASF Color, Charlotte, N.C. or Clariant Colors, Charlotte, N.C. or Sun Chemical, Cincinnati, Ohio).

Suitable pigments also include carbon black. Carbon black is the generic name for carbon particles derived from the thermal decomposition or the incomplete combustion of natural gas and hydrocarbons, such as aromatic oils on coal tar basis, mineral oils, coal tar distillate, and acetylene. More than 100 individual grades of carbon black are available on the market today, each with its own distinctive set of characteristics and properties. Any acidic carbon black, neutral carbon black and alkaline carbon black may be beneficially subjected to the treatment disclosed in the present invention. This includes channel blacks, gas blacks, lamp blacks, thermal blacks, acetylene blacks and furnace blacks. More particularly, suitable carbon blacks include channel blacks. The quality of carbon black utilized will have an impact on the critical properties of the dispersion such as mean particle size, opacity, color shade, stability, etc. Examples of commercially available carbon blacks include, but are not limited to, those available from Cabot (Elftex 8, Black Pearls® 490, Black Pearls® 120, Monarch® 120, Monarch® 700, Monarch® 880, Monarch® 1000, Monarch® 1100, Monarch® 1300, Monarch® 1400, Mogul® L, Regal® 99R, Regal® 250R, Regal® 300R, Regal® 330R, Regal® 400R, Regal® 500R, Regal® 660R), Degussa (NIPex® 150 IQ, NIPex® 150, Printex® 55, Printex® 80, Printex® 90, Printex® A, Printex® G, Printex® U, Printex® V, Printex® 140U, Printex® 140V, Purex® LS 35, Corax® HP 160, Thermal Black N 990, NIPex® 160 IQ, NIPex® 90, Special black 4, Special black 4A, Special black 5, Special black 6, Special black 100, Special black 250, Color black FW1, Color black FW2, Color black FW2V, Color black FW18, Color black FW200, Color black S150, Color black S160 and Color black S170), Columbian (Raven® 780, Raven® 5000 UII, Raven® 1255, Raven® 2500 U, Raven® 3600 U, Raven® 3500, Raven® 7000, Raven® 1220 and Raven® 1225) and Mitsubishi Kagaku K.K. (MA8, MA11, MA77, MA100, MA220, MA230, MA600, MCF88, #10B, #20B, #30, #33, #40, #44, #45, #45L, #50, #55, #95, #260, #900, 970#, #1000, #2200B, #2300, #2350, #2400B, #2650, #2700, #4000B and CF9).

Pigments are available in a variety of particle sizes. Generally, smaller particle sizes are associated with larger surface areas, and larger surface areas can accommodate a higher concentration of hydrophilic surface groups, which ultimately enhance the dispersibility of the carbon black in aqueous-based media. Therefore, particle size can influence the dispersibility of a surface-modified pigment. For example, the average primary particle size of carbon blacks in the present invention may be less than about 50 nm, particularly less than about 30 nm, particularly less than about 20 nm, and more particularly less than about 10 nm. Aggregates of carbon black particles may be less than about 200 nm, particularly less than about 150 nm, and more particularly less than about 100 nm. The surface area of carbon black particles may be greater than about 100 $m^2/g$, particularly greater than about 150 $m^2/g$, and more particularly greater than about 200 $m^2/g$. Pigment particles with larger dimensions may be comminuted to a desired size either before or during surface modification using any number of techniques known to those skilled in the art. Such techniques may include, but are not limited to, a ball mill, an attritor, a flow jet mixer, an impeller mill, a colloidal mill and a sand mill (e.g., one commercially sold under the trade name 'Super Mill', 'Agitator Mill', 'Dyno-mill' or 'Beads Mill'). Mill media may include, but are not limited to, glass beads, zirconia beads and stainless steal beads. Mill media may comprise particles ranging in size from about 0.1 mm to about 3 mm, more particularly from about 0.01 mm to about 5 mm. If the carbon black is easily crumbled, a rotary homogenizer or an ultrasonic homogenizer may be used to reduce particle size. In one embodiment, a surface-modified black pigment is made from a commercial grade carbon black pigment consisting of primary particle sizes less than about 30 nm and aggregates not more than about 200 nm with a surface area greater than about 100 $m^2/g$.

Prior to the creation of the self-dispersing pigments, the pigment may or may not be oxidized with an oxidant such as nitric acid, ozone, hydrogen peroxide, persulfate, hypohalite, or a combination thereof. Aqueous oxidation of carbon black using sodium hypochlorite is taught by U.S. Pat. No. 2,439,442 issued Apr. 13, 1948 and U.S. Pat. No. 3,347,632 issued Oct. 17, 1967, each of which is hereby incorporated by reference. Following the oxidation of the pigment, compounds of the formula X-S-ZM are then attached to the surface of the pigment using the methods of the current invention, complementing the newly introduced surface charge groups.

In some instances, prior to the creation of the self-dispersing pigments, the pigment may be wetted and milled to nano sized particles and dispersed using a grind-aid. The pigment may be in powder or wet cake form prior to milling with the aid of a grind aid. The milling may take place prior to, during, or after the reaction with the substituted intermediate. After the attachment reaction is complete, the grind-aid may be removed using purification methods that are known to those skilled in the art, forming a dispersion containing primarily the modified pigment and water. Examples of grind aids include, but are not limited to Triton X-100 (available from Ashland Inc., Dublin, Ohio), Igepal CA-630 (available from Rhodia, Cranbury, N.J.), and Surfynol CT 121, 131, and 141 (available from Air Products, Allentown, Pa.).

In one example of the first embodiment, reactive compounds comprising sulfonyl chloride are attached to a pigment such as carbon black by chlorosulfonation with chlorosulfonic acid. The combination of acid strength, reaction temperature, and duration determine how many sulfonyl groups are attached to the surface of the pigment. In one embodiment, chlorosulfonation is carried out with an amount of chlorosulfonic acid that is five times the weight of carbon black.

Chlorosulfonation may also be carried out with a mixture of chlorosulfonic acid and thionyl chloride to prevent in situ hydrolysis. The amount of thionyl chloride may be varied widely to control the degree of hydrolysis or even to prevent it completely. In one embodiment, chlorosulfonation is carried out with 348 g of chlorosulfonic acid and 30 g of thionyl chloride.

The ratio (by weight) of pigment to acid is largely determined as a function of operational efficiency which includes mixing, ease of transfer, and cost. Chlorosulfonation of the pigment can be achieved in the absence of added solvent by using chlorosulfonic acid in excess. A minimum acid to pigment ratio of about 5 is well-suited to provide good mixing throughout the reaction. A large excess, such as a ratio of about 20, does not result in significant benefit but increases the cost of both materials and handling. In one embodiment, chlorosulfonic acid is used in about five fold excess (w/w). In another embodiment, the ratio of pigment to chlorosulfonating agent is at least about 4:1 (w/w). In yet another embodiment, the ratio of pigment to chlorosulfonating agent is from about 1:20 to about 1:1 (w/w). In a further embodiment, the chlorosulfonating agent may be a mixture of chlorosulfonic acid and thionyl chloride in a ratio of about 3:1 to about 6:1 (w/w).

Chlorosulfonation of pigment may be carried out at elevated temperatures for a period of up to about 2 days. The reaction temperature during chlorosulfonation may be at least about 140° C., particularly at least about 130° C., and more particularly at least about 120° C. Furthermore, the reaction temperature during chlorosulfonation may be less than or equal to about 60° C., particularly less than or equal to about 90° C., and more particularly less than or equal to about 120° C. This includes embodiments where the reaction temperature during chlorosulfonation is about 120° C. to about 130° C., and more particularly no more than about 140° C. In another embodiment, the reaction temperature during chlorosulfonation is from about 25° C. to about 160° C. Generally, higher temperatures require shorter reaction times to achieve a desirable concentration of sulfonyl groups on the surface of the pigment. For example, the desired chlorosulfonation at a reaction temperature of 140° C. may take about 6 hours, whereas the same degree of chlorosulfonation at 80° C. would be expected to take more than 72 hours. In some embodiments, the reaction time may be at least about 2 hours, in others at least about 6 hours, and in yet others at least about 24 hours. In other embodiments, the reaction time may be less than or equal to about 48 hours, in others less than or equal to about 24 hours, and in yet others less than or equal to about 6 hours. This includes embodiments where the reaction time is from about 1 hour to about 48 hours. The contents of the reaction vessel are stirred during chlorosulfonation to insure adequate mixing.

After chlorosulfonation, the reaction mixture may be quenched in water. In some embodiments, the reaction mixture may be cooled to a temperature less than about 20° C. prior to quenching, in others to a temperature of less than about 60° C. prior to quenching, and in yet others to a temperature less than about 90° C. prior to quenching. This includes embodiments where the reaction mixture is cooled to a temperature of about 20° C. to about 90° C. prior to quenching. The water into which the reaction mixture is added may be at or below a temperature of about 10° C. using, for example, ice, a cooling device or combination thereof. In one embodiment, the quench temperature is maintained at about 0° C. to about 5° C. to preserve the reactive sulfonyl chloride intermediate. The chlorosulfonated product, referred to as a wet cake, may be isolated from the water by filtration and washed free of excess reactants and water soluble products. It may be washed with <5° C. water.

The pigment reactive intermediate is subsequently substituted with at least one secondary compound that comprises an organic group that prevents hydrolysis back to an acid.

In one embodiment, the pigment reactive intermediate may be immediately used for reaction with a secondary compound. For instance, a carbon black having reactive sulfonyl chloride groups may be immediately reacted with an organic compound containing amino and acidic end groups. The secondary compound that comprises an organic group may be selected by the desired end application for the pigment.

The pigment reactive intermediate may be reacted with the secondary compound in an acidic pH (about 2 to about 5) range. The acidic pH range increases the stability of the reactive compound and decreases the degree of undesirable reactions such as hydrolysis and self-condensation. The reactive compound reacts preferentially with a base such as a primary amine even when an amino phenol is used as the organic group. The reaction can be directed primarily to the amino end by the proper choice of the reaction conditions such as pH, temperature, and dilution which is well known to those skilled in the art. For example, the pH may be from about 2 to about 5 and the temperature may be from about 0° C. to about 5° C. In another embodiment, while reacting the pigment reactive intermediate with the secondary compound, the particle size of the pigment can be reduced by performing the reaction in a bead mill. Due to the corrosivity of the secondary compound, proper materials of construction resistant to strong acids and bases may be selected to prevent metal leaching into the product.

Reaction between the pigment reactive intermediate and the secondary compound may occur for a period of about 2 hours to about 4 hours with mixing. In one embodiment, the reaction may be forced to completion by heating the mixture to elevated temperatures of about 60° C. to about 90° C.

Another example of the first embodiment may include, without limitation, a method of modifying a pigment having a surface that may comprise attaching a reactive group X-Y to the surface of a pigment; and subsequently displacing Y with an organic substrate N-S-ZM to form a surface modified pigment having attached X-N-S-ZM; wherein X is a sulfonyl, phosphoryl, or 1,3,5-triazinyl group; Y is a halogen leaving group; N is a basic nucleophilic group; S is an organic group; and ZM is an ionizable end group. A majority of the pigment surface may be modified to form a liquid gel. The liquid gel may subsequently be milled with excess untreated pigment and water to form a stable aqueous pigment dispersion. One example of modifying a majority of the pigment surface includes, without limitation, chlorosulfonating a pigment at a temperature of at least about 90° C. for at least about one hour to form a chlorosulfonated pigment, or pigment sulfonyl chloride.

In one example of the second embodiment, reactive compounds comprising cyanuryl groups are substituted with a secondary compound that comprises organic groups. The substituted reactive intermediate -X-S-ZM is then attached to a pigment such as carbon black by using cyanuric chloride. The combination of pH, reaction temperature, and duration determine how many groups are attached to the surface of the pigment. In one embodiment, the reaction is carried out with 52 g of cyanuric chloride per 120 g of carbon. In another embodiment, the reaction is carried out with 15 g of cyanuric chloride per 40 g of carbon.

In some embodiments, a slurry of a secondary compound that comprises an organic group, cyanuric chloride, water, ice, and base is created. The secondary compound that comprises an organic group may be selected by the desired end application for the pigment.

In an example of the third embodiment, reactive compounds comprising cyanuryl groups are substituted with a secondary compound that comprises two organic groups, which may be the same or different. The two substituted reactive intermediates X-S-ZM and X-S2-Z2M2 are then attached to a pigment such as carbon black by using the cyanuric chloride. The combination of pH, reaction temperature, and duration determine how many groups are attached to the surface of the pigment. This process can be done sequentially by first reacting with a slurry of secondary compound that comprises an organic group, cyanuric chloride, water, ice, and base. A second slurry of a different secondary compound that comprises an organic group, cyanuric chloride, water, ice, acid, and base is used to complete the sequence.

The ratio of cyanuryl chloride to secondary compound is typically determined by stoichiometry and the concentration is controlled to allow for good mixing. Reaction between the cyanuric chloride and the secondary compound may occur for a period of about 2 hours to about 4 hours with mixing.

In an example of the fourth embodiment, all the reactive chlorines in cyanuryl chloride are displaced by the secondary compound or a mixture of secondary compounds by manipulating the stoichiometry (three equivalents to displace all three chlorines) and temperature (a higher temperature of about 90° C.) prior to the reaction with a pigment. This reaction forms a substituted triazine, which substituted triazine may be attached to the surface of the pigment. The mixture of secondary compounds may include one, two, or three different secondary compounds. In such instances, a radical initiator such as a persulfate moiety is used to disproportionate and facilitate the attachment process. In some embodiments, the reaction may be carried out at a temperature of about 25° C. to about 90° C. In another embodiment, the pigment may be milled to less than about 100 nm before, during, or after reacting the pigment with the substituted triazine.

The pigment is mixed with this "reagent" to create the dispersion. In embodiments where there are two slurries with different secondary compounds, the pigment is mixed with the slurries sequentially. The temperature of the dispersion may be maintained at about 0° C. to about 15° C. for a period of about 1 hour to about 2 hours. The mixture of the reactive compound (e.g., substituted triazine) dispersion and the pigment is then heated to elevated temperatures for a period of up to about 2 days. A free radical initiator such as potassium persulfate may be added to promote the reaction. The reaction temperature may be at least about 40° C., particularly at least about 50° C., and more particularly at least about 60° C.

Furthermore, the reaction temperature may be less than or equal to about 90° C., particularly less than or equal to about 80° C., and more particularly less than or equal to about 60° C. This includes embodiments where the reaction temperature is about 50° C. to about 60° C., more particularly no more than 90° C. Generally, temperatures above 50° C. are required for the free radical initiator to be effective. This includes embodiments where the reaction time is from about 16 hours to about 24 hours. The contents of the reaction vessel are stirred during the reaction to insure adequate mixing. The modified pigment may be filtered to remove excess reactants and impurities.

In one embodiment, the reactive compound (such as cyanuric chloride) is reacted with the secondary compound in an acidic pH (about 2 to about 5) range. The acidic pH range increases the stability of the reactive compound and decreases the degree of undesirable reactions such as hydrolysis and self-condensation. The reactive compound reacts preferentially with a base such as a primary amine even when an amino phenol is used as the organic group. The reaction can be directed primarily to the amino end by the proper choice of the reaction conditions such as pH, temperature, and dilution which is well known to those skilled in the art. For example, the pH may be from about 2 to about 5 and the temperature may be from about 0° C. to about 5° C.

Optionally, while reacting the pigment with the group -X-S-ZM, the particle size of the pigment can be reduced by performing the reaction in a bead mill. Due to the corrosivity of the secondary compound, proper materials of construction resistant to strong acids and bases may be selected to prevent metal leaching into the product.

Reaction of the pigments with reactive compounds or secondary groups that include acid derivatives may create acidic surface groups that can lower the pH of the reaction mixture. A decrease in pH may result in a destabilization of the modified pigment dispersion or slurry of reactive compound and secondary compound during the substitution and may also result in an increase in viscosity. Therefore, the pH may be adjusted, as needed, before and during the substitution with a basic reagent. The pH of the reaction mixture during substitution may be greater than or equal to about 7, particularly greater than or equal to about 8, and more particularly greater than or equal to about 9. The pH may be adjusted by any known method in the art including, for example, the addition of base. Suitable bases may include, but are not limited to, alkali hydroxides and calcium free alkali hydroxides (e.g., NaOH, KOH, LiOH, $NH_4OH$), alkali carbonates and bicarbonates (e.g., $NaHCO_3$, $KHCO_3$), and organic bases (e.g., dimethylethanol amine and triethanol amine). In particular, a suitable pH adjuster comprises calcium free sodium hydroxide.

Surface Modified Pigment

After the reactions described above are complete, the self-dispersing pigment may be isolated from the reaction mixture as a dry powder. The resultant modified pigment may be purified by using any number of techniques known to those skilled in the art to remove unreacted raw materials, byproduct salts and other reaction impurities. Purification techniques may include, but are not limited to, filtration, centrifugation, or a combination of the two. The modified pigment may also be isolated, for example, by evaporation or it may be recovered by filtration and drying using techniques known to those skilled in the art.

Alternatively, the self-dispersing pigment may be delivered as concentrated aqueous pigment dispersion. Dispersions of the self-dispersing pigments of the present invention may be purified to remove organic and inorganic impurities and other undesirable free species which can co-exist in the dispersion as a result of the manufacturing process. Purification techniques may include, but are not limited to, water washing, reverse osmosis, and ultrafiltration. In some embodiments, dissolved impurities may be removed by ultrafiltration until the chloride and sulfate content of the feed sample adjusted to 10% solids is less than about 150 ppm, particularly less than about 100 ppm, and more particularly less than about 25 ppm. If necessary, the pH of the dispersion may be adjusted prior to purification. A sufficient amount of acid or base may be added to adjust the pH of the dispersion to at least about 7, particularly to at least about 8, and more particularly to at least about 9. This includes embodiments where the pH of the dispersion is about 7 to about 9. The dispersion may be concentrated if desired by removal of some of the water. In some embodiments, the dispersion is concentrated to at least about 8% solids, in others to at least about 14% solids, and in yet others to at least about 20% solids. This includes embodiments where the dispersion is concentrated to about 8% to about 16% solids. In other embodiments, the dispersion is concentrated to at least about 10% solids, in others to at least about 18% solids, and in yet others to at least about 20% solids. This includes embodiments where the dispersion is concentrated to about 14% to about 8% solids.

A biocide may also be added to the dispersion to inhibit the growth of microorganisms. Examples of suitable biocides include, but are not limited to, sodium benzoate, pentachlorophenol sodium, 2-pyridinethiol-1-oxide sodium, sodium sorbate, sodium dehydroacetate, benzisothiazolinone, 1,2-dibenzothiazolin-3-one, methylisothiazolinone and chloromethylisothiazolinone. Commercially available biocides include Proxel® CRL, Proxel® BDN, Proxel® GXL, Proxel® XL-2, and Proxel® TN (available from Arch Chemicals, Smyrna, Ga.) and XBINX® (available from PMC Specialties Group, Inc., Cincinnati, Ohio). Typically, a small amount, such as 0.05 to 5%, particularly 0.1 to 1%, and more particularly 0.2 to 0.4% by weight of biocide, is used in the dispersion. This includes 0.3% by weight biocide.

Agents may also be added to impart fluidity and stability to the dispersion. Examples of such agents may be found in U.S. Pat. No. 5,059,248 issued Oct. 22, 1991, U.S. Pat. No. 5,591,455 issued Jan. 7, 1997 and U.S. Pat. No. 5,595,592 issued Jan. 21, 1997, each of which is hereby incorporated by reference. Examples include, but are not limited to, linear aliphatic substituted glycine compounds and salts thereof. As used herein, the term "linear aliphatic substituted glycine" designates glycine compounds in which the amino group of glycine has been substituted with linear aliphatic groups. Illustrative of agents of this type which may be used in the practice of the invention are ethylene diamine tetraacetic acid, nitrilo triacetic acid, diethylene triamine pentaacetic acid, hydroxyethylene diamine triacetic acid, dihydroxyethyl glycine, iminodiacetic acid and ethanol diglycine and the alkali metal (e.g., sodium), alkaline earth metal (e.g., calcium) and ammonium salts thereof. Other similar linear aliphatic substituted glycine compounds and salts thereof known to those skilled in the art may also be used. In some embodiments, the forementioned salts of ethylene diamine tetraacetic acid are used because of their availability, cost effectiveness and nontoxicity. In some embodiments, these agents may constitute approximately 0.5 to 3.5 wt. %, preferably about 1.5 to 2.5 wt. %, of the pigment in the dispersion compositions.

The dispersion may be filtered through filter cartridges as required for the designated end use of the dispersion. In some embodiments, the nominal pore size of the filter cartridge is less than or equal to about 5 microns, particularly less than or equal to about 1 micron, particularly less than or equal to about 0.5 micron, and more particularly less than or equal to about 0.2 micron.

In addition to powders and dispersions, the self-dispersing pigment may also be isolated as a water wet presscake. In presscake form, the self-dispersing pigment is not agglomerated to the extent that it is in dry form and thus the self-dispersing pigment does not require as much deagglomeration when used, for example, in the preparation of inks.

If desired, the charge-balancing counterions associated with the surface-modifying groups as a result of the attachment/substitution process may be at least partially substituted or changed with the use of suitable base or salt form or exchanged or substituted with other suitable cations using known ion-exchange techniques such as ultrafiltration, reverse osmosis, conversion to acid form as an intermediate and the like. Examples of counterions include, but are not limited to, alkali metal ions (e.g., $Na^+$, $K^+$ and $Li^+$), $NR_1R_2R_3H^+$, and combinations thereof, wherein $R_1$, $R_2$ and $R_3$ may independently be H or $C_1$-$C_5$ alkyl groups that may be unsubstituted or substituted (e.g., tetraethylammonium ion (TEA), tetramethylammonium ion (TMA), ethanolammonium ion, triethanolammonium ion, tetrabutylammonium ion, etc).

Properties of Modified Pigments

The self-dispersing pigments may exhibit at least one of long-term and high temperature stability, higher water and highlighter fastness than expected of a pigment particle with attached sulfonic or carboxylic acid groups, and have a particle size distribution suitable for use in high speed jetting applications.

The self-dispersing pigments may possess the following properties. The % of solids in the modified pigments may be from about 8-16.

The pH of the modified pigment dispersion may be from about 5 to about 10.

The viscosity of the modified pigment dispersion may be from about 1 to about 10 cps, particularly about 1.3 to about 7.6 cps.

The surface tension of the modified pigment dispersion may be from about 39 to about 72 dynes/cm.

The amount of Na and K in the modified pigment dispersion may be a measure of a newly attached anionic substrate (sulfanilic or 4-aminophenol or 4-aminobenzoic acid as Na/K forms). The amount of Na may be from about 100 to about 6500 ppm and the amount of K may be from about 30 to about 1200 ppm.

The increase in the S content in the modified pigment dispersion may be due to the introduction of a sulfonyl group and/or attachment of a sulfonated substrate such as, without limitation, sulfanilic acid. The amount of S in the modified pigments may be a about 50 ppm to about 2600 ppm. In one embodiment, the amount of S in the modified pigments may be about 50 ppm for 4-aminobenzoic and 4-aminophenol attachments. In another embodiment, the amount of S in the modified pigments may be about 1700 ppm when a sulfanilic acid is attached through a sulfone bond to the pigment.

Applications of Modified Pigments

The self-dispersing pigment according to the present invention may be used in a number of end use applications. These uses include, but are not limited to, coatings, paints, papers, adhesives, latexes, toners, textiles, fibers, plastics, and inks. Specific examples include, without limitation, printing ink for paper, textiles, fibers, metal deco and plastics, wood stains, writing instruments, and color filters. The self-dispersing pigments produced by the process of the invention are particularly well-suited for use in printing applications and wood stains. In one example, an inkjet ink incorporating a pigment of the present invention may be useful in high quality prints in an inkjet photo printer One aspect of the present invention relates to inkjet ink formulations using the self-dispersing pigment described above. Inkjet formulations containing such pigments may do at least one of the following: 1) provide uniform, bleed-free images with high resolution and high density on print media; 2) not cause nozzle clogging which typically occurs due to drying of the ink at a distal end of a nozzle; 3) rapidly dry on paper; 4) exhibit good lightfastness and waterfastness; 5) demonstrate good long-term storage stability; and 6) demonstrate print characteristics which are independent of the paper quality.

The ink compositions of the present invention may be prepared by combining the above modified pigments with an aqueous vehicle and any suitable additives. The amount of modified pigment (by weight) in the ink composition is at least about 0.1%, particularly at least about 10%, and more particularly at least about 20%. Furthermore, the amount of modified pigment (by weight) in the ink composition is less than or equal to about 12%, particularly less than or equal to about 8%, and more particularly less than or equal to about 5%. This includes embodiments where the amount of modified pigment (by weight) in the ink composition is present in an amount ranging from about 2% to about 12%.

The aqueous vehicle may comprise water or water in combination with one or more water-soluble organic solvents. Water-soluble organic solvents may be combined with water to make up the aqueous vehicle. Water-soluble organic solvents may include alcohols, polyhydric alcohols such as ethylene glycol, ketones and ketone alcohols such as acetone and diacetone alcohol, ethers such as tetrahydrofuran and dioxane, lower alkyl ethers of polyhydric alcohols, such as ethylene glycol monomethyl (or monoethyl)ether, nitrogen-containing solvents such as pyrrolidone, N-methyl-2-pyrrolidone, sulfur-containing solvents such as thiodiethanol, sugars and derivatives thereof such as glucose, an oxyethylene adduct of glycerin; and an oxyethylene adduct of diglycerin. The water-soluble organic solvents may be used alone or in combination. If a mixture of water and a water-soluble organic solvent is used, the amount of water-soluble organic solvent (by weight) in the ink composition is at least about 5%, particularly at least about 15%, and more particularly at least about 25%. Furthermore, the amount of water-soluble organic solvent (by weight) in the ink composition is less than or equal to about 50%, particularly less than or equal to about 30%, and more particularly less than or equal to about 15%. This includes embodiments where the amount of water-soluble organic solvent (by weight) in the ink composition is about 5% to about 30%. The amount of water in the ink composition is at least about 40%, particularly at least about 50%, and more particularly at least about 60%. Furthermore, the amount of water (by weight) in the ink composition is less than or equal to about 90%, particularly less than or equal to about 80%, and more particularly less than or equal to about 70%. This includes embodiments where the amount of water (by weight) in the ink composition is about 40% to about 80%.

Additives may be incorporated into the aqueous vehicle to impart any number of desired properties, such as might be needed to adapt the ink to the requirements of a particular inkjet printer or to provide a balance of light stability, smear resistance, viscosity, surface tension, coating penetration, optical density, adhesion, highlighter resistance or crust resistance. Penetrants, for example, may be added to reduce bleed, improve wetting of the print media, and otherwise improve overall performance of the print image. Examples of penetrants may include, but are not limited to, alkyl alcohols having 1 to 4 carbon atoms, such as ethanol, glycol ethers, such as ethylene glycol monomethyl ether, diols such as 1,2-alkyl diols, formamide, acetamide, dimethylsulfoxide, sorbitol and sulfolane. The penetrants may be used alone or in combination. The amount of penetrant (by weight) in the ink composition ranges from 0% to about 60%, particularly from about 2% to about 40%, and more particularly from about 5% to about 20%. This includes embodiments where the amount of penetrant (by weight) in the ink composition is present in an amount ranging from about 10% to about 15%.

Surfactants may be added to the aqueous medium to reduce the surface tension of the ink composition. The surfactants may be anionic surfactants, non-ionic surfactants and/or cationic surfactants. Suitable surfactants may include those listed below and in U.S. Pat. Nos. 5,116,409 issued May 26, 1992, 5,861,447 issued Jan. 19, 1999, and 6,849,111 issued Feb. 1, 2005, each of which is hereby incorporated by reference.

Surfactants are commercially available under various well-known trade names, such as the PLURONIC® series (BASF Corporation, Parsippany, N.J.), the TETRONIC® series (BASF Corporation, Parsippany, N.J.), the ARQUAD® series (Akzo Chemical Inc., Chicago, Ill.), the TRITON®series (Union Carbide Corp., Danbury, Conn.), the SURFONIC® series (Texaco Chemical Company, Houston, Tex.), the ETHOQUAD® series (Akzo Chemical Inc., Chicago, Ill.), the ARMEEN® series (Akzo Chemical Inc., Chicago, Ill.), the ICONOL® series (BASF Corporation, Parsippany, N.J.), the SURFYNOL® series (Air Products and Chemicals, Inc. Allentown, Pa.), and the ETHOMEEN® series (Akzo Chemical Inc., Chicago, Ill.), to name a few.

The surfactants may be used alone or in combination. The amount of surfactant (by weight) in the ink composition may range from 0% to about 10%, particularly from about 0.1% to about 10%, and more particularly from about 0.3% to about 5%. This includes embodiments where the amount of surfactant (by weight) in the ink composition may range from about 0.1% to about 8%.

One or more humectants may be added to the aqueous vehicle to prevent clogging, caused by drying out during periods of latency, of inkjet nozzles. Humectants may be selected from materials having high hygroscopicity and water-solubility. Examples of humectants include, but are not limited to, polyols such as glycerol, lactams such as 2-pyrrolidone, urea compounds such as urea, 1,3-dimethylimidazolidinone, saccharides such as sorbitol, 1,4-cyclohexanedimethanol, 1-methyl-2-piperidone, N-ethylacetamide, 3-amino-1,2-propanediol, ethylene carbonate; butyrolactone and Liponic EG-1. There are no particular limitations on the amount used of the humectant, but in general the amount of humectant (by weight) in the ink composition may range from 0% to about 30%, particularly from about 1% to about 15%, and more particularly from about 5% to about 10%.

Polymers may be added to the ink composition to improve the water-fastness, rub and highlightfastness of the images on print media. Suitable polymers may include, but are not limited to, polyvinyl alcohol, polyester, polyestermelamine, styrene-acrylic acid copolymers, styrene-maleic acid copolymers, styrene-maleic acid-alkyl acrylate copolymers, styrene-metacrylic acid copolymers, styrene-metacrylic acid-alkyl acrylate copolymers, styrene-maleic half ester copolymers, vinyl-naphthalene-acrylic acid copolymers, vinyl naphthalene-maleic acid copolymers and salts thereof. The amount of polymer (by weight) in the ink composition may range from 0% to about 5%, particularly from about 0.1% to about 3%, and more particularly from about 0.2% to about 2.5%. This includes embodiments where the amount of polymer (by weight) in the ink composition may range from about 0.1% to about 3.0%.

Ink compositions of the present invention may be buffered to a desired pH using any number of pH modifiers. Suitable pH modifiers may include alkali hydroxides, alkali carbonates and bicarbonates, triethylamine, dimethylethanolamine, triethanolamine, mineral acids, hydrochloric acid, and sulfuric acid. The pH modifiers may be used alone or in combination. The amount of pH modifier (by weight) in the ink composition may range from 0% to about 3.0%, particularly from about 0.1% to about 2.0%, and more particularly from about 0.5% to about 1.5%. This includes embodiments where the amount of pH modifier (by weight) in the ink composition ranges from about 0.2% to about 2.5%.

Preservatives, such as biocides and fungicides, may also be added to the ink composition. Examples of suitable preservatives include sodium benzoate, pentachlorophenol sodium, 2-pyridinethiol-1-oxide sodium, sodium sorbate, sodium dehydroacetate, benzisothiazolinone, 1,2-dibenzothiazolin-3-one, methylisothiazolinone and chloromethylisothiazolinone. Commercially available biocides include UCAR-CIDE® 250 (available from Union Carbide Company), Proxel® CRL, Proxel® BDN, Proxel® GXL, Proxel® XL-2, Proxel® TN (available from Arch Chemicals, Smyrna, Ga.), Dowicides® (Dow Chemical, Midland, Mich.), Nuosept® (Huls America, Inc., Piscataway, N.J.), Omidines® (Olin Corp., Cheshire, Conn.), Nopcocides® (Henkel Corp., Ambler, Pa.), Troysans® (Troy Chemical Corp., Newark, N.J.), and XBINX® (PMC Specialties Group, Inc., Cincinnati, Ohio). The preservatives may be used alone or in combination. The amount of preservatives (by weight) in the ink composition may range from 0% to about 1.5%, particularly from about 0.05% to about 1.0%, and more particularly from about 0.1% to about 0.3%. This includes embodiments where the amount of preservative (by weight) in the ink composition may range from about 0.05% to about 0.5%.

The ink composition may contain one or more viscosity modifiers. Viscosity modifiers may include rosin compounds, alginic acid compounds, polyvinyl alcohol, hydroxypropyl cellulose, carboxymethyl cellulose, hydroxyethyl cellulose, methyl cellulose, salts of polyacrylic acid, polyvinyl pyrrolidone, gum arabic and starch. The amount of viscosity modifier (by weight) in the ink composition may range from 0% to about 10%, particularly from about 0.5% to about 8%, and more particularly from about 1% to about 5%. This includes embodiments where the amount of viscosity modifier (by weight) in the ink composition may range from about 1% to about 7%.

Other additives which may be incorporated into the aqueous vehicle may also include antioxidants, ultraviolet absorbers, chelating agents, electric conductivity adjusters, viscosity modifiers, oxygen absorbers, anti-kogation agents, anti-curling agents, anti-bleed agents, defoamers, and buffers. The ink compositions of the present invention may contain one or more colorants in addition to the pigment dispersion of the present invention.

The ink compositions of the present invention are particularly suited for use as an ink composition for inkjet printing wherein droplets of the ink composition are ejected from a printing apparatus and deposited onto a substrate to generate an image. Suitable printing apparatus include, but are not limited to, Continuous Ink Jet (CIJ), prop-on-Demand Valve (DoD Valve), prop-on-Demand Piezo-Electric (DoD Piezo) and Thermal Ink Jet (TIJ). Similarly, any suitable substrate may be employed including plain papers, bonded papers, coated papers, transparency materials, textile materials, plastics, polymeric films and inorganic substrates. However, it should be recognized by those skilled in the art that the above ink compositions may also have use in other applications including, but not limited to, general writing utensil applications and stamp applications.

The ink compositions of the present invention may be used alone, or with a color underlay, to produce a black image or in combination with other ink compositions to produce a color image. In some embodiments, the ink composition of the present invention is used in combination with other ink composition(s), such as a cyan ink, a magenta ink and/or a yellow ink. In other embodiments, a cyan ink, a magenta ink and a yellow ink are overprinted to form a black image and this printing is used in combination with the printing of the black ink of the present invention.

Wood Stains

Another aspect of the present invention relates to aqueous formulations using the self-dispersing pigment described above as wood stains and coatings. Wood stain formulations containing such pigments may exhibit at least one of the following properties: 1) good wood absorption and adhesion; 2) good transparency; and 3) excellent water and light resistance.

Water resistance is measured by difference in measured DE* values of wood stain in dipped areas versus control. Lower DE* values may indicate higher water resistance. If DE* is small it may mean that there is minimal to no color change due to degradation or loss. For example, lower DE* values may indicate higher water resistance as seen with carboxy modified pigment dispersions. The DE* value of the modified pigment dispersion may be from about 0 to about 3. One specific example is a pigment modified with 4-aminobenzoic acid. In another example, carboxy modified Pigment Blue 15 and Pigment Yellow No. 74 dispersions had low DE* values of about 0.19 and 0.43, respectively. Delta E is the difference between two colors. L, a, and b values are measurements based on spherical color. +L=white, −L=black, +a=red, −a=green, +b=yellow, −b=blue. C is chroma (saturation) and H=Hue. Readings are measured using a spectrophotometer. Delta $E=\sqrt{(L_1-L_2)^2+(a_1-a_2)^2+(b_1-b_2)^2}$.

Coatings

Coating formulations containing such pigments may exhibit at least one of the following properties: 1) good adhesion to substrates such as metal, paper, glass, plastic, and wood; 2) ease of application and drying; 3) good weather fastness, water and light resistance; 4) good gloss retention; and 5) good chemical and flocculation resistance.

As with water resistance, resistance to strong acids and bases of coatings are measured as the difference in DE* value of spotted versus control. The DE* value of the modified pigment dispersion may be from about 0 to about 3. In one example, coatings containing modified carbon black had a low DE* value for acid resistance of about 0.08. In another example, coatings containing modified Pigment Blue No. 15 had a low DE* value for resistance to strong bases of about 1.56.

Color Filters

Another aspect of the present invention relates to aqueous formulations using the self-dispersing pigment described above in color filters. Color filters find application in display imaging areas including, without limitation, desktop monitor/laptop screens, LCD TV screens, cell phone display panels, digital camera screens, and GPS panels. Color filter formulations containing pigments of the present invention may exhibit at least one of the following properties: 1) good adhesion to glass and plastic film substrates; 2) good transparency; 3) ease of application and drying; and 4) good heat and light resistance.

The transmission values of a specific color filter is measured to determine its usefulness. The color filters may have maximum transmittance in a narrow band to provide the most utility.

In one embodiment, carbon black may have no transmission bands, magenta pigment dispersions may have a lowest transmission in the about 520 to about 560 nm range, yellow pigment dispersions may have a lowest transmission in the about 400 to about 480 nm range, and cyan pigment dispersions may have the lowest transmission in the about 600 to about 680 nm range.

Textile Printing

Another aspect of the present invention relates to aqueous formulations using the self-dispersing pigment described above in textile printing applications. Textile printing formulations containing pigments of the present invention may exhibit at least one of the following properties: 1) good adhesion to textile fabrics such as cotton, nylon, polyester, wool, polyacrylic, or blends of the same; 2) ease of application and drying; 3) good water and light resistance; and 4) good washfastness.

The wash and water fastness properties of dyed textile may be measured by the difference in DE* value of a control versus a washed fabric.

The DE* value of the modified pigment dispersion may be from about 0 to about 3. In one example, modified carbon black may have a low DE* value of about 0.23. In another example, modified Pigment Yellow No. 74 may have a high DE* value of about 6.72.

EXAMPLES

Exemplary embodiments of the present invention are provided in the following examples. The following examples are presented to illustrate the present invention and to assist one of ordinary skill in making and using the same. The examples are not intended in any way to otherwise limit the scope of the invention.

Example 1

Pigment Dispersion (example of chlorosulfonation in chlorosulfonic acid and thionyl chloride followed by attachment of small molecules).

Commercial gas carbon black (65 g) available from Degussa (Burr Ridge, Ill.), with a primary particle size of 20 nm and B.E.T surface area of 160 $m^2$/g was chlorosulfonated with 332 g of lab grade chlorosulfonic acid at 120-4° C. for 20 hours. The reaction mixture was cooled to 56° C. and 68.5 g of thionyl chloride was introduced dropwise. After all the thionyl chloride was added, the reaction mass was heated back to 103-5° C. and held at that temperature for 4 hours. The reaction mixture was then cooled to RT and quenched in water and ice, controlling the quench temperature below −5° C. The precipitated product was isolated by filtration and washed free of dissolved material with ice cold (<5° C.) water. The product cake (253 g) was then reacted with a solution of ethyl 4-aminobenzoate (lab grade from Aldrich, 21.7 g) in 140 g DI water containing 15.5 g concentrated hydrochloric acid (37%) at 2-5° C. After mixing at 2000 rpm for 30 minutes, it was then milled in a Hockmeyer media mill (available from Hockmeyer Equipment Corp., Elizabeth City, N.C.) at 5000 rpm using 0.4 mm YTZ media (available from Quackenbush Co., Inc., Crystal Lake, Ill.) allowing the temperature to rise to 10° C. and pH to 4.7 by the addition of 20% sodium acetate solution. Milling was continued for another five hours. After one hour into the milling, the pH was raised to 12.6 with the addition of calcium free sodium hydroxide (23 g). The reaction mixture was removed from the mill and heated to 85° C. for 2 hours to hydrolyze the methyl ester. The dissolved impurities were removed by ultrafiltration until the chloride and sulfate content of the feed sample were less than 50 ppm. The product was then concentrated to 18% solids and mixed with (0.3%, wt/wt) Proxel GXL (available from Arch Chemicals, Smyrna, Ga.). Finally, the product was filtered through a 0.7 micron GF filter.

Examples 2-9

Examples 2-9 were prepared following the same process as set forth above for Example 1.

TABLE 1

Examples of attachment through reactive sulfonyl chloride intermediate

| Example | Pigment | | $HClSO_3$ | $SOCl_2$ | Attachment Group | |
|---|---|---|---|---|---|---|
| [#] | Type | (g) | (g) | (g) | | (g) |
| 2 | Carbon[1] | 40 | 169 | 59 | 4-ABA | 7.5 |
| 3 | Carbon[1] | 40 | 150 | 27 | SA | 9.6 |
| 4 | Carbon[1] | 80 | 431 | 0 | 4-ABA | 21.5 |
| 5 | Carbon[1] | 91.5 | 452 | 90 | 4-AP | 20 |
| 6 | PB15[2] | 40 | 225 | 0 | 4-ABA | 14 |
| 7 | PB15[3] | 40 | 205 | 0 | SA | 20 |
| 8 | PB15[4] | 40 | 187 | 0 | SA | 20 |
| 9 | PB15[3] | 40 | 160 | 0 | 4-ABA | 14 |

| Example | Step 1 | | Step 2 | | Mill | | Step 3 | |
|---|---|---|---|---|---|---|---|---|
| [#] | ° C. | h | ° C. | h | ° C. | h | ° C. | h |
| 2 | 110-30 | 20 | 80 | 2 | — | — | 90 | 0.5 |
| 3 | 110-25 | 22 | 82 | 2 | — | — | 90 | <0.1 |
| 4 | 117-8 | 19 | — | — | 4-24 | 2 | 60 | 3 |
| 5 | 124-30 | 21 | 78 | 2 | 4-24 | 10 | — | — |
| 6 | 90 | 0.1 | — | — | 12-33 | 5 | 65 | 1 |
| 7 | 90 | 1 | — | — | 16-68 | 8 | — | — |
| 8 | 90 | 1.5 | — | — | 19-48 | 3 | — | — |
| 9 | 90 | 0.1 | — | — | 4-49 | 3 | 65 | 16 |

[1]Degussa (Burr Ridge, IL)
[2]PB15:4 from CIBA (Newport, DE)
[3]PB 15:3 from BASF (Mount Olive, NJ), large particles were separated by centrifuge at 10,000 rpm for 5 min prior to filtration with 0.7 micron TCLP
[4]PB15:3 from Clariant Colors (Charlotte, NC)

Throughout the examples, abbreviations are used for the sake of brevity. "H" stands for hours, "AP" stands for aminophenol, "SA" stands for sulfanilic acid, and "4ABA" stands for 4-aminobenzoic acid.

Example 10

Pigment Dispersion (example of formation of a different salt form via attachment—example tetramethyl ammonium salt).

Commercial gas carbon black (66 g) available from Degussa, with a primary particle size of 20 nm and B.E.T surface area of 160 m$^2$/g was chlorosulfonated with 348 g of lab grade chlorosulfonic acid at 122-7° C. for 19 hours. The reaction mixture was cooled to 74° C. and 30.0 g of thionyl chloride was introduced dropwise. After all the thionyl chloride was added the reaction mass was heated back to 134° C. and held at that temperature for one hour. The reaction mixture was then cooled to RT and quenched in water and ice, controlling the quench temperature below −5° C. The precipitated product was isolated by filtration and washed free of dissolved material with ice cold (<5° C.) water. The product cake (326 g) was then mixed in ice cold DI water to get a slurry at pH=1.5. The pH was initially raised to 4.5 with tetramethyl ammonium hydroxide solution (25%). The pH was further raised to 6.5 with a solution of 4-aminobenzoic acid (lab grade from Aldrich, 18 g) in 90 g DI water containing 40.3 g tetramethyl ammonium hydroxide solution (25%) at 25° C. and 8 g of Surfynol CT-141 (available from Air Products & Chemicals, Inc., Allentown, Pa.). It was then briefly mixed with additional tetramethyl ammonium hydroxide solution (25%) to a final pH of 9.6. The mixture was cooled to 4° C. and then milled in a Hockmeyer media mill (available from Hockmeyer Equipment Corp., Elizabeth City, N.C.) at 4800 rpm using 0.4 mm YTZ media (available from Quackenbush Co., Inc., Crystal Lake, Ill.) allowing the temperature to rise to 37° C. and controlling the pH to above 8.8 by the addition of tetramethyl ammonium hydroxide solution. Milling was continued for a total of four hours. The reaction mixture was removed from the mill and heated to 60-76° C. for 15 hours. Additional tetramethyl ammonium hydroxide was added to raise the pH to 9.2. The dissolved impurities were removed by ultrafiltration until the chloride and sulfate content of the feed sample were less than 50 ppm. The product was then concentrated to 17% solids and mixed with (0.3%, wt/wt) Proxel GXL (available from Arch Chemicals, Smyrna, Ga.). Finally, part of the product (112 g) was filtered through a 0.7 micron GF filter.

Example 11

Pigment Dispersion (example of chlorosulfonation of PB15 in chlorosulfonic acid; attachment with sulfanilic acid and dispersing PB15).

Commercial Pigment Blue no.15:1 (60 g) available from Newchemic (Montvale, N.J.) was chlorosulfonated with 320 g of lab grade chlorosulfonic acid at 110-118° C. for one hour. The reaction mixture was cooled to 25° C. and quenched in water and ice, controlling the quench temperature below 0° C. The precipitated product was isolated by filtration and washed free of dissolved material with ice cold (<5° C.) water at a pH <4. The product cake (365 g) was then added to a solution of sulfanilic acid (20 g, available from Nation Ford Chemical, Fort Mill, S.C.), Ca free sodium hydroxide granules (6.4 g) and sodium bicarbonate (21.7 g)c in DI water (200 g) with good mixing (1100 rpm). The pH was controlled above 8.0 with additional 37 g sodium bicarbonate and 21 g sodium carbonate. The mixture was then milled in a Hockmeyer media mill (available from Hockmeyer Equipment Corp., Elizabeth City, N.C.) at 4000 rpm using 0.2 mm YTZ media (available from Quackenbush Co., Inc., Crystal Lake, Ill.). The temperature was allowed to rise to 80° C. and the mixture was milled for three hours. The reaction mixture was removed from the mill and heated to 83° C. The dissolved impurities were removed by ultrafiltration until the chloride and sulfate content of the feed sample were less than 50 ppm. The product was then concentrated to about 5% solids to get 1446 g of liquid. A part (220 g) of the liquid product was used to disperse 40 g of Pigment Blue 15:3 available from Clariant Colors, Charlotte, N.C. and milled at 7000 rpm for three hours. The pH was constantly adjusted to above 8 with dropwise addition of calcium free sodium hydroxide solution (1.4 g, 25%). The product was removed from the mill and heated to 86° C. and once again the dissolved impurities were removed by ultrafiltration until the chloride and sulfate content of the feed sample were less than 50 ppm. The product was then concentrated to about 12% solids, mixed with (0.3%, wt/wt) Proxel GXL (available from Arch Chemicals, Smyrna, Ga.). Larger particles were removed by centrifugation at 3,200 rpm for 15 minutes and the product (210 g) was filtered through a 0.7 micron GF filter.

Example 12

Pigment Dispersion (example of cyanuryl group addition and attachment of sodium 4-aminobenzoate).

A solution of 4-aminobenzoic acid (40 g) in DI water (600 g), calcium free sodium hydroxide (14 g) and sodium bicarbonate (52 g) was added to a stirred mixture of cyanuric chloride (52 g, available from Lonza Walkersville, Inc., Walkersville, Md.), ice (880 g) and DI water (200 g). The pH climbed to 3.1 as the reaction mixture turned into a milky white dispersion.

A prior art method, described in U.S. Pat. No. 3,347,632, of oxidizing carbon black with sodium hypochlorite was used to oxidize commercial gas carbon black (Degussa) with a primary particle size of 20 nm and B.E.T surface area of 160 $m^2/g$. A carbon black slurry (908 g at 11%) was slowly added to the milky white dispersion described above while holding the temperature at 1-6° C. After one hour, the reaction mixture was heated to 19° C. and the pH was maintained at 7.3 with the addition of calcium free sodium hydroxide (2 g) and sodium bicarbonate (10 g) [Step 1]. After an addition of potassium persulfate (63.6 g lab grade, available from Fisher Scientific), the reaction mixture was heated to 57-70° C. for 20 hours [Step 2]. The pH was raised from 5.3 to 10.3 with calcium free sodium hydroxide (32.3 g) after diluting to 3 L. The dissolved impurities were removed by ultrafiltration until the chloride and sulfate content of the feed sample were less than 50 ppm. The product was then concentrated to 11% solids and mixed with (0.3%, wt/wt) Proxel GXL (available from Arch Chemicals, Smyrna, Ga.). Finally, the product (832 g) was filtered through a 0.7 micron GF filter.

Examples 13-21

Examples 13-21 were prepared following the same process as set forth above for Example 12. The additional step of footnote 5 is unique to Example 13.

TABLE 2

Examples of attaching small molecules to a pigment via a Cyanuric adduct.

| Example [#] | Pigment Type | $C_3N_3Cl_3$ (g) | $NaHCO_3$ (g) | $K_2S_2O_8$ (g) | Attachment Group | (g) |
|---|---|---|---|---|---|---|
| 13 | Carbon[5] | 120 | 52 | 60 | 50 | 4-ABA | 35 |
| 14 | PR122[6] | 80 | 10 | 30.6 | 30 | SA | 20.4 |
| 15 | PY74[7] | 80 | 10 | 30.6 | 30 | SA | 20.4 |
| 16 | PB15[3] | 50 | 10.5 | 20.4 | 12.1 | SA | 10 |
| 17 | PB15[3] | 50 | 14 | 19.4 | 8.5 | SA | 28 |
| 18 | PB15[8] | 50 | 15 | 12.9 | 34.6 | SA | 28 |
| 19 | PB15[8] | 75 | 14.25 | 58.6 | 26.5 | SA | 26.8 |
| 20 | Carbon[1] | 40 | 5 | 25.4 | 15 | SA | 10.3 |
| 21 | PR122[9] | 80 | 10 | 30.6 | 30 | SA | 20.4 |

| Example [#] | Step 1 °C. | h | Step 2 °C. | h | Mill °C. | h |
|---|---|---|---|---|---|---|
| 13 | 62 | 1 | 65 | 15 | — | — |
| 14 | 39 | 0.2 | 80 | 6 | 75-80 | 5.5 |
| 15 | 40 | 0.2 | 80 | 5 | 80 | 5 |

TABLE 2-continued

Examples of attaching small molecules to a pigment via a Cyanuric adduct.

| | | | | | | |
|---|---|---|---|---|---|---|
| 16 | 24 | 0.2 | 50 | 20 | 26-50 | 5.5 |
| 17 | 24 | 0.2 | 90 | 1 | 40-70 | 4 |
| 18 | 50 | 0.5 | 50 | 1 | 50-85 | 5 |
| 19 | 40 | 0.5 | 40 | 0.5 | 35-75 | 7.5 |
| 20 | 24 | 0.2 | — | — | 24-71 | 5.5 |
| 21 | 39 | 0.2 | 80 | 6 | 75-80 | 5.5 |

[5]Degussa, with a primary particle size of 13 nm and B.E.T surface area of 320 $m^2/g$. The pH was raised from 5.7 to 9.0 with 50% sodium hydroxide (20.3 g) after diluting to 3.6 L. This slurry was filtered hot (90° C. through 300 micron bag filter). 30 g of potassium persulfate was added to the carbon slurry that had been pre-cooled to room temperature. A solution of 4-aminobenzoic acid (15 g) in DI water (300 g), calcium free sodium hydroxide (5 g) along with cyanuric chloride (15.3 g, available from Lonza Walkersville, Inc.), and sodium bicarbonate (20 g) was added to this stirred mixture. The foam was controlled by the addition of drops of Surfynol CT-121 (available from Air Products & Chemicals, Inc., Allentown, PA). The pH was adjusted to 7.7 with 50% sodium hydroxide solution (5.4 g) and mixed with a high shear mixer for an additional 15 minutes. The temperature was raised to above 50° C. and held for 20 hours. The dissolved impurities were removed by ultrafiltration until the chloride and sulfate content of the feed sample were less than 50 ppm. The product was then concentrated to 11% solids and mixed with (0.3%, wt/wt) Proxel GXL (available from Arch Chemicals, Smyrna, GA). Finally, the product (736 g) was filtered through a 1.0 micron Whatman POLYCAP 36 AS filter capsule
[6]PR 122 from CIBA (Newport, DE)
[7]PY 74 from SUN (Parsippany, NJ)
[8]PB 15:3 from CIBA
[9]PR 122 from SUN Example 22

Pigment Dispersion (example of cyanuryl group addition and attachment of sodium 4-aminobenzoate and an alkylpolymeric amine with an approximate MW of 300).

A solution of 4-aminobenzoic acid (7.4 g) in DI water (200 g), calcium free sodium hydroxide (2.3 g) and sodium bicarbonate (30 g) was added to a stirred mixture of cyanuric chloride (10 g, available from Lonza Walkersville, Inc.), ice (130 g) and DI water (40 g). The pH climbed to 5.5 as the reaction mixture turned into a milky white dispersion.

A solution of Surfonamine B 30 (8.6 g, available from Huntsman Chemicals, Austin, Tex.) in DI water (60 g) containing concentrated hydrochloric acid (3.75 g) at a pH of 1.5 was added to a stirred mixture of cyanuric chloride (5 g, available from Lonza Walkersville, Inc.), ice (100 g) and DI water (30 g). The pH climbed to 2.1 as the reaction mixture turned into a milky white dispersion. While holding the temperature cold (5.7° C.), the pH was raised gradually to 7.1 with 20 g of sodium bicarbonate.

A self-dispersed carbon black dispersion (Sensijet® Black SDP 2000, 500 g at 14%, available from Sensient Colors Inc, St. Louis, Mo.), formed by sulfonating and oxidizing carbon black with sulfuric acid and sodium hypochlorite, was pre-cooled in an ice box. To the cold carbon black dispersion was added the cold milky white dispersion described above while holding the temperature at 6-13.7° C. After one hour, the 4-aminobenzoic acid adduct with cyanuryl chloride, prepared above (10.7° C.) was added with good mixing. The reaction mixture was allowed to warm up to 18.8° C. (pH of 7.4) and then 34 g of potassium persulfate was added. Immediately following this step, the reaction mixture was heated to 51-57° C. for 20 hours [Step 1]. The pH was raised from 7.2 to 10.9 with calcium free sodium hydroxide (22 g) after diluting to 2 L. The dissolved impurities were removed by ultrafiltration until the chloride and sulfate content of the feed sample were less than 50 ppm. The product was then concentrated to 14.4% solids and mixed with (0.3%, wt/wt) Proxel GXL (available from Arch Chemicals, Smyrna, Ga.). Finally, the product (538 g) was filtered through a 0.7 micron GF filter.

Examples 23-25

Examples 23-25 were prepared following the same process as set forth above for Example 22.

TABLE 3

Attachment of linear propoxy polymers via cyanuryl intermediate.

| Example | Pigment | | $C_3N_3Cl_3$ | NaHCO$_3$ | $K_2S_2O_8$ | Attachment Groups | | Step 1 | |
|---|---|---|---|---|---|---|---|---|---|
| [#] | Type | (g) | (g) | (g) | (g) | | (g) | °C. | h |
| 23 | Carbon[10] | 500 | 105 | 60 | 22 | 4-ABA, L100 | 7.4 13 | 58 | 16 |
| 24 | Carbon[11] | 500 | 132 | 20 | 40 | 4-ABA L300 | 13 13 | 58-60 | 60 |
| 25 | Carbon[11] | 500 | 123 | 20 | 32 | 4-ABA B60 | 8.9 10 | 58-62 | 16 |

[10]Sensijet ® Black SDP 2000 available from Sensient Colors Inc, St. Louis, MO
[11]Sensijet ® Black SDP 1000 available from Sensient Colors Inc, St. Louis, MO Example 26

Pigment Dispersion (example of preparation of a cyanuryl tris adduct (S) with sulfanilic acid and use in the surface modification of a pigment).

A solution of sulfanilic acid (114 g) in DI water (310 g), calcium free sodium hydroxide (32 g) and sodium bicarbonate (55 g) at a pH=8.5 was added to a stirred mixture of cyanuric chloride (40.2 g, available from Lonza Walkersville, Inc., Walkersville, Md.), ice (570 g) and DI water (480 g) in three stages controlling the temperature <0° C., <3° C. and <10° C. respectively. After the addition, pH=7.1, the reaction mixture was heated to 90° C. over 4.5 hours to get 1000 g of a clear liquid.

Carbon Black[12] (40 g, available from Cabot Corporation, Billerica, Mass.), with a primary particle size of 16 nm and a CTAB surface area of 255 m$^2$/g, was slowly added to a stirred mixture of the reagent described above (an equivalent of 10.55 g of sulfanilic acid was used) and 250 g of DI water. This mixture was milled with a Hockmeyer media mill (available from Hockmeyer Equipment Corp., Elizabeth City, N.C.) with 0.2 mm YTZ media (available from Quackenbush Co., Inc., Crystal Lake, Ill.). A solution of 15 g of potassium persulfate and sodium bicarbonate in DI water was added to the mill and milling was continued for a total of 5 hours. The dissolved impurities were removed by ultrafiltration until each of the chloride content and the sulfate content of the feed sample are less than 50 ppm. The product was then concentrated to 11.6% solids and mixed with 0.3%, wt/wt Proxel GXL (available from Arch Chemicals, Smyrna, Ga.). Finally, the product was filtered through 0.7 micron GF filter.

Examples 27-38

Examples 27-38 were prepared following the same process as set forth above for Example 26.

TABLE 4

Examples of attaching small molecules to a pigment via a Tris Sulfanilic-Cyanuric adduct.

| Example | Pigment | | Tris Adduct | NaHCO$_3$ | $K_2S_2O_8$ | Sulfanilic Acid equivalent | Mill | |
|---|---|---|---|---|---|---|---|---|
| [#] | Type | (g) | (g) | (g) | (g) | (g) | °C. | h |
| 27 | PB15:3[4] | 40 | 197.5 | 11.2 | 6.38 | 11.4 | 65 | 5 |
| 28 | PY74[7] | 40 | 130 | 9.9 | 8 | 5.3 | 75 | 8 |
| 29 | PY74[7] | 40 | 195 | 12.4 | 10.5 | 7.5 | 75 | 6 |
| 30 | PY74[7] | 40 | 260 | 14.8 | 14 | 10.6 | 70 | 6 |
| 31 | Carbon[1] | 40 | 159.4 | 14.3 | 9.2 | 12.6 | 74 | 4 |
| 32 | Carbon[1] | 40 | 244.4 | 25.1 | 24.9 | 15.5 | 69 | 6 |
| 33 | Carbon[13] | 40 | 333.2 | 28.4 | 33 | 21.1 | 75 | 2.5 |
| 34 | PB15:3[4] | 40 | 573 | 54 | 42.3 | 33.1 | 95 | 7 |
| 35 | PB15:3[3] | 40 | 205 | 7.01 | 13.3 | 14.1 | 60 | 5.5 |
| 36 | Carbon[1] | 40 | 86.5 | 4.8 | 15.4 | 9.8 | 45 | 2 |
| 37 | PR122[6] | 40 | 332 | 39.1 | 30 | 20 | 55 | 3 |
| 38 | PR122[6] | 40 | 200 | 13.8 | 11 | 8.1 | 55 | 2 |

[12]Cabot (Leominster, MA) Monarch ® 880
[13]Cabot (Leominster, MA) Monarch ® 700

Example 39

Pigment Dispersion (example of preparation of a cyanuryl tris adduct with 4-aminobenzoic acid and use in the surface modification of a pigment).

A solution of 4-aminobenzoic acid (90.1 g) in DI water (300 g), calcium free sodium hydroxide (30 g) and sodium bicarbonate (55 g) at a pH=7.2 was added to a stirred mixture of cyanuric chloride (40.2 g, available from Lonza Walkersville, Inc., Walkersville, Md.), ice (550 g) and DI water (500 g) in three stages controlling the temperature <0° C., <3° C. and <10° C. respectively. After the addition, pH=7.1, the reaction mixture was heated to 92° C. over 3 hours to get 901 g of a clear liquid.

Carbon Black (40 g, available from Degussa, Burr Ridge, Ill.), with a primary particle size of 20 nm and a B.E.T. surface area of 160 m$^2$/g, was slowly added to a stirred mixture of the reagent described above (an equivalent of 10.22 g of 4-aminobenzoic acid was used) and 250 g of DI water. This mixture was milled with a Hockmeyer media mill (available from Hockmeyer Equipment Corp., Elizabeth City, N.C.) with 0.2 mm YTZ media (available from Quackenbush Co., Inc., Crystal Lake, Ill.). A solution of 8.5 g of potassium persulfate and sodium bicarbonate in DI water was added to the mill and milling was continued for a total of 6 hours. The dissolved impurities were removed by ultrafiltration until each of the chloride content and the sulfate content of the feed sample are less than 50 ppm. The product was then concentrated to 10.3% solids and mixed with 0.3%, wt/wt Proxel GXL (available from Arch Chemicals, Smyrna, Ga.). Finally, the product was filtered through 0.7 micron GF filter.

Examples 40-47

Examples 40-47 were prepared following the same process as set forth above for Examples 39.

TABLE 5

Examples of attaching small molecules to a pigment via a Tris 4-ABA-Cyanuric adduct.

| Example [#] | Pigment Type | Tris Adduct (g) | $NaHCO_3$ (g) | $K_2S_2O_8$ (g) | 4-ABA equivalent | Mill °C. | h |
|---|---|---|---|---|---|---|---|
| 40 | PB15[4] | 40 | 309.2 | 16.3 | 25.5 | 19.82 | 83 | 6 |
| 41 | Carbon[1] | 40 | 188.4 | 24.28 | 19.7 | 10 | 65 | 6 |
| 42 | PB15[4] | 40 | 175.2 | 13 | 7.3 | 10 | 70 | 7 |
| 43 | PB15[4] | 60 | 283.3 | 29.5 | 27.8 | 15.06 | 80 | 4 |
| 44 | Carbon[1] | 40 | 188.4 | 12.1 | 19.7 | 10 | 42 | 2 |
| 45 | PR122[6] | 40 | 305 | 42.2 | 30 | 20 | 55 | 5 |
| 46 | PY74[7] | 60 | 90 | 13.6 | 11 | 6 | 55 | 4 |
| 47 | PR122[6] | 40 | 95 | 13.8 | 11 | 6.33 | 55 | 2.5 |

Example 48

The physical properties of the modified pigments from the examples above are set forth in the following table.

TABLE 6

Analytical Results of Pigment Dispersions.

| Example [#] | Pigment Type | Solids (%) | pH | Cl ppm | $SO_4$ ppm | Viscosity cps | Conductivity µS | Surface tension Dynes/cm |
|---|---|---|---|---|---|---|---|---|
| 1 | Carbon[1] | 17.9 | 9.9 | 15 | 45 | — | — | — |
| 2 | Carbon[1] | 9.1 | 7.1 | 33 | 9 | — | — | — |
| 3 | Carbon[1] | 12.9 | 8.2 | 29 | 24 | — | — | — |
| 4 | Carbon[1] | 14.0 | 9.7 | 10 | 32 | 3.05 | 668 | 71 |
| 5 | Carbon[1] | 7.8 | 8.5 | 12 | 14 | — | — | — |
| 6 | PB15[2] | 7.5 | 8.5 | 6 | 4 | 1.62 | 1000 | 71 |
| 7 | PB15[3] | 8.2 | 8.8 | 3 | 4 | 1.82 | 521 | 67.2 |
| 8 | PB15[4] | 8.1 | 8.5 | 8 | 10 | 1.88 | 1400 | 66.3 |
| 9 | PB15[3] | 9.8 | 8.0 | 1 | 2 | 1.92 | 1037 | 70.1 |
| 10 | Carbon[1] | 17.4 | 8.0 | 10 | 45 | 7.5 | — | — |
| 11 | PB15[3] | 11.3 | 8.8 | 1 | 1 | 1.78 | 1610 | 64.5 |
| 12 | Carbon[1] | 11.2 | — | 5 | 8 | — | — | — |
| 13 | Carbon[5] | 9.6 | 7.9 | 10 | 53 | 1.94 | — | 61.5 |
| 14 | PR122[6] | 10.4 | 8.3 | 7 | 8 | 2.02 | 610 | 69.5 |
| 15 | PY74[7] | 9.6 | 7.8 | 10 | 34 | 1.7 | 770 | 68 |
| 16 | PB15[3] | 10.8 | 8.48 | 3 | 29 | 2.90 | 638 | 69.8 |
| 17 | PB15[3] | 5.69 | 8.79 | 4 | 6 | 1.34 | 1466 | 73.7 |
| 18 | PB15[2] | 9.4 | 8.7 | 2 | 16 | 1.45 | 375 | 70.3 |
| 19 | PB15[2] | 12.5 | 8.1 | 19 | 36 | 7.55 | 667 | 70.2 |
| 20 | Carbon[1] | 9.5 | 8.6 | 7 | 130 | 1.91 | 1190 | 70.2 |
| 21 | PR122[9] | 10.73 | 7.5 | 29 | 2 | 1.79 | 490 | 69.8 |
| 22 | Carbon[1] | 14.4 | 9.4 | 14 | 35 | 2.6 | 1346 | 47.2 |
| 23 | Carbon[1] | 18.9 | 9.2 | 9 | 77 | 3.34 | 1670 | 39.8 |
| 24 | Carbon[1] | 13.1 | 9.4 | 5 | 7 | 2.66 | 1596 | 58.1 |
| 25 | Carbon[1] | 12.3 | 7.3 | 8 | 47 | 2.7 | 1624 | 50.1 |
| 26 | Carbon[12] | 11.6 | 7.4 | 4 | 4 | 2.16 | 1180 | 70.3 |
| 27 | PB15[2] | 7.4 | 8.2 | 2 | 12 | 1.38 | 375 | 69.4 |
| 28 | PY74[7] | 6.3 | 8.5 | 15 | 37 | 1.42 | 1390 | 65.2 |
| 29 | PY74[7] | 9.5 | 7.9 | 1 | 8 | 1.61 | 1045 | 68.6 |
| 30 | PY74[7] | 9.9 | 8.2 | 5 | 3 | 1.62 | 1340 | 70.4 |
| 31 | Carbon[1] | 9.31 | 7.27 | 3 | 69 | 2.02 | 900 | 70.5 |
| 32 | Carbon[1] | 11.4 | 8.7 | 12 | 45 | 2.39 | 2530 | 69.2 |
| 33 | Carbon[13] | 10.2 | 8.07 | 3 | 8 | 1.77 | 2630 | 69.0 |
| 34 | PB15[4] | 7.65 | 8.3 | 2 | 6 | 1.5 | 1220 | 69.4 |
| 35 | PB15[2] | 7.71 | 8.7 | 4 | 9 | 1.39 | 1256 | 71.4 |

TABLE 6-continued

Analytical Results of Pigment Dispersions.

| | | | | | | | | |
|---|---|---|---|---|---|---|---|---|
| 36 | Carbon[1] | 10.61 | 7.8 | 18 | 19 | 2.23 | 1130 | 70.7 |
| 37 | PR122[6] | 11.88 | 7.9 | 1 | 88 | 2.12 | 1120 | 70.9 |
| 38 | PR122[6] | 9.9 | 8.0 | 1 | 20 | 2.01 | 515 | 70.6 |
| 39 | Carbon[1] | 10.3 | 8.8 | 1 | 18 | 3.53 | 1485 | 70.2 |
| 40 | PB15[4] | 7.9 | 8.3 | 3 | 25 | 1.49 | 1340 | 69.7 |
| 41 | Carbon[1] | 12.1 | 9 | 5 | 93 | 2.35 | 2520 | 69.4 |
| 42 | PB15[4] | 8.04 | 7.5 | 13 | 12 | 1.41 | 622 | 56.1 |
| 43 | PB15[4] | 8.01 | 8.16 | 17 | 12 | 1.46 | 568 | 69.5 |
| 44 | Carbon[1] | 9.8 | 7.8 | 15 | 15 | 1.81 | 1815 | 69.6 |
| 45 | PR122[6] | 8.0 | 7.8 | 14 | 107 | 1.77 | 560 | 71.4 |
| 46 | PY74[7] | 9.7 | 8.2 | 2 | 3 | 1.84 | 601 | 70.8 |
| 47 | PR122[6] | 9.8 | 7.7 | 1 | 5 | 2.11 | 430 | 68.5 |

| Example [#] | Pigment Type | Na ppm | K ppm | S ppm | Heavy metals[14] Ppm |
|---|---|---|---|---|---|
| 1 | Carbon[1] | 6500 | — | — | 34.7 |
| 2 | Carbon[1] | — | — | — | — |
| 3 | Carbon[1] | — | — | — | — |
| 4 | Carbon[1] | 3443 | — | — | 38.2 |
| 5 | Carbon[1] | 1451 | — | — | 176.7 |
| 6 | PB15[2] | 457 | 25 | 688 | 39.7 |
| 7 | PB15[3] | 384 | 1.6 | 767 | 33.8 |
| 8 | PB15[4] | 921 | 6.7 | 1632 | 18 |
| 9 | PB15[3] | 649 | 3.2 | 1133 | 37.5 |
| 10 | Carbon[1] | 148 | — | — | 13.3 |
| 11 | PB15[3] | 807 | 11.4 | — | 169.2 |
| 12 | Carbon[1] | 2562 | — | — | 45 |
| 13 | Carbon[5] | 426 | — | — | 94 |
| 14 | PR122[6] | 316 | 108 | 337 | 109 |
| 15 | PY74[7] | 291 | 230 | 371 | 83 |
| 16 | PB15[3] | 164 | 25.1 | 359 | 9.5 |
| 17 | PB15[3] | 34.9 | 7.4 | 53.8 | 27 |
| 18 | PB15[2] | 109 | 4.7 | 219 | 112 |
| 19 | PB15[2] | 125 | 49 | 406 | 75 |
| 20 | Carbon[1] | 539 | 558 | 1223 | 12.6 |
| 21 | PR122[9] | 147 | 73 | 242 | 63 |
| 22 | Carbon[1] | 4042 | — | — | 34 |
| 23 | Carbon[1] | 4110 | — | — | 20.2 |
| 24 | Carbon[1] | 3743 | — | — | 44 |
| 25 | Carbon[1] | 2185 | — | — | 79.6 |
| 26 | Carbon[12] | 678 | 786 | 2230 | 52.6 |
| 27 | PB15[2] | 142 | 26.5 | 198 | 35.8 |
| 28 | PY74[7] | 443 | 290 | 592 | 53 |
| 29 | PY74[7] | 436 | 331 | 632 | 62 |
| 30 | PY74[7] | 1180 | 786 | 708 | 48.5 |
| 31 | Carbon[1] | 355 | 422 | 1076 | 27.3 |
| 32 | Carbon[1] | 1141 | 1101 | 2262 | 44.5 |
| 33 | Carbon[13] | 892 | 944 | 2599 | 24.6 |
| 34 | PB15[4] | 306 | 143 | 594 | 41 |
| 35 | PB15[2] | 266 | 103 | 555 | 10.1 |
| 36 | Carbon[1] | 353 | 406 | 1564 | 33.1 |
| 37 | PR122[6] | 1718 | 675 | 684 | 15 |
| 38 | PR122[6] | 240 | 107 | 394 | 56 |
| 39 | Carbon[1] | 778 | 440 | 372 | 60 |
| 40 | PB15[4] | 377 | 280 | 260 | 116.7 |
| 41 | Carbon[1] | 346 | 365 | 505 | 77.2 |
| 42 | PB15[4] | 165 | 56 | 219 | 18.4 |
| 43 | PB15[4] | 236 | 66 | 235 | 18.9 |
| 44 | Carbon[1] | 571 | 560 | 389 | 17.3 |
| 45 | PR122[6] | 125 | 84 | 126 | 30 |
| 46 | PY74[7] | 308 | 233 | 457 | 92 |
| 47 | PR122[6] | 181 | 73 | 164 | 78 |

[14] Sum of Ca, Mg and Fe present as a contaminant in the raw materials and/or formed during the milling process.

Example 49

X-Ray Photoelectron Spectroscopy (XPS) Analyses

XPS data were collected and analyzed for Black Samples 1-5 (Table 7), Cyan samples (6-11), Magenta samples (12-16), and Yellow samples (17-21). Dried samples of purified "Tris" reagents were also analyzed for identifying the nature of the groups attached to the pigment surface.

TABLE 7

XPS of pigment samples.

| Sample | Example | Source |
|---|---|---|
| 1 | [—] | Carbon Black Gas carbon black, available from Degussa, Akron, OH. |

TABLE 7-continued

XPS of pigment samples.

| Sample | Example | Source |
|---|---|---|
| 2 | [20] [Carbon] S-49 | Dispersion from Example#20 with SA attachment |
| 3 | [31] [Carbon] S-47 | Dispersion from Example#31 with SA attachment |
| 4 | [1] [Carbon] A-79 | Dispersion from Example#1, Chlorosufonation and 4-ABA attachment |
| 5 | [41] [Carbon] A-71 | Dispersion from Example#41 with 4ABA attachment |
| 6 | [—] PB15 - untreated | Inkjet Grade Pigment Blue 15:3 from BASF |
| 7 | [11] [PB15] A-2B | Dispersion from Example#11, Chlorosulfonation and SA attachment |
| 8 | [9] [PB15] AS-7B | Dispersion from Example#9 Chlorosulfonation and 4-ABA attachment |
| 9 | [7] [PB15] S-35 | Dispersion from Example#7 with SA attachment |
| 10 | [42] [PB15] A-59 | Dispersion from Example#42 with 4ABA attachment |
| 11 | [16] [PB15] S-82 | Dispersion from Example#16 with SA attachment |
| 12 | [—] [PR122 - untreated] | Inkjet Grade Pigment Red 122 from CIBA |
| 13 | [14] [PR122] S-77 | Dispersion from Example#14 with SA attachment |
| 14 | [21] [PR122] S-80 | Dispersion from Example#21 with SA attachment |
| 15 | [37] [PR122] S-17 | Dispersion from Example#37 with SA attachment |
| 16 | [45] [PR122] A-20 | Dispersion from Example#45 with 4-ABA attachment |
| 17 | [—] [PY 74 - untreated] | Inkjet Grade Pigment Yellow 74 from SUN |
| 18 | [15] [PY 74] S-03 | Dispersion from Example#15 with SA attachment |
| 19 | [29] [PY 74] S-32 | Dispersion from Example#29 with SA attachment |
| 20 | [46] [PY 74] A-38 | Dispersion from Example#46 with 4ABA attachment |

Figure 2:
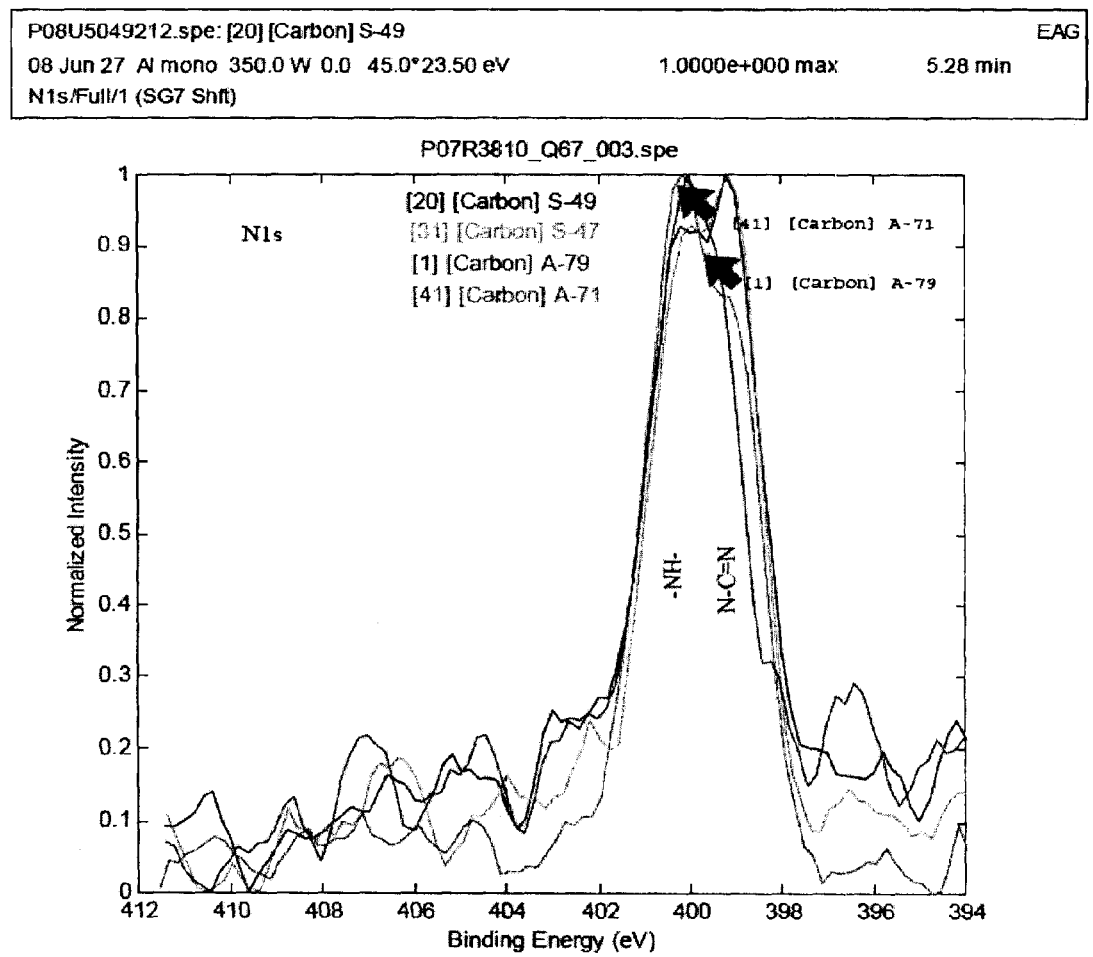
FIG. 2 displays high resolution N1s XPS spectra for untreated carbon black samples and carbon black samples from Examples 1, 20, 31, and 41.
Figure 3:
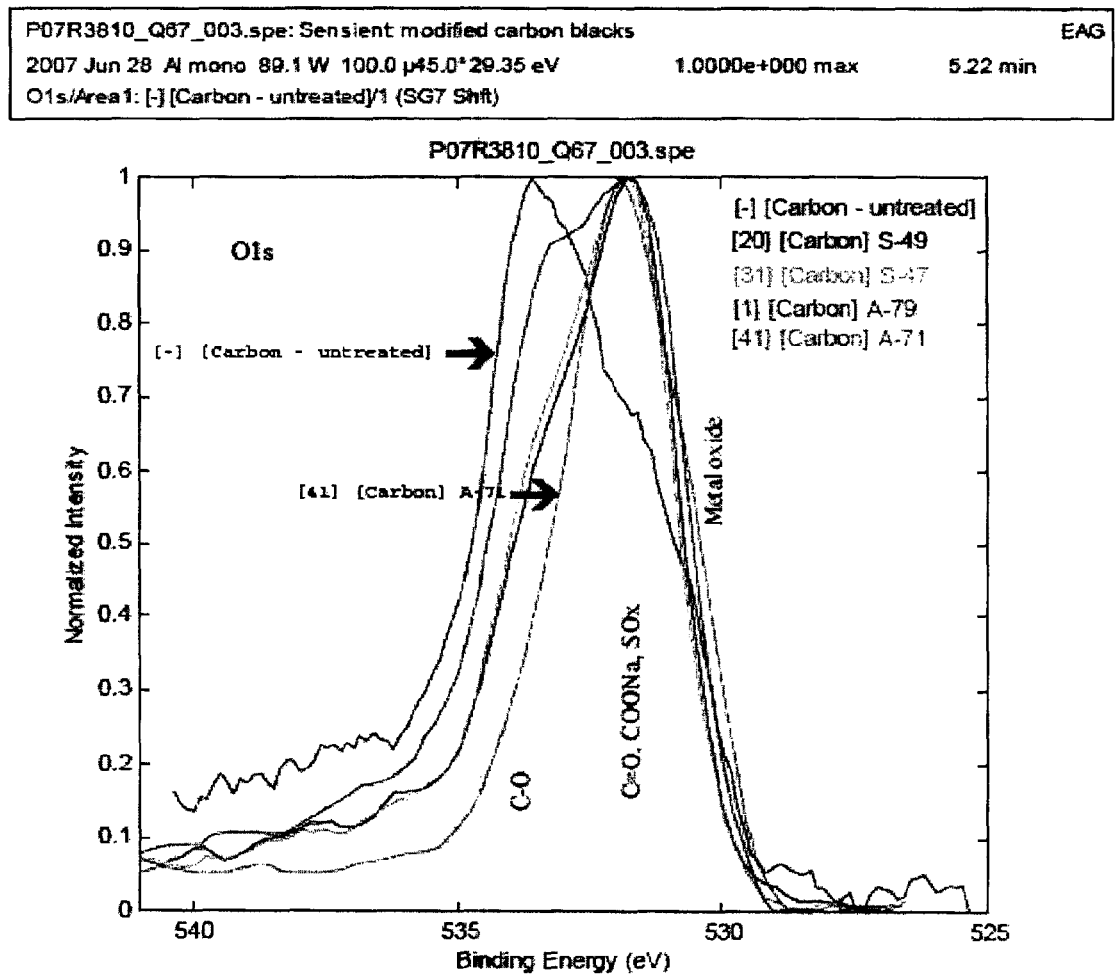
FIG. 3 displays high resolution O1s XPS spectra for untreated carbon black samples and carbon black samples from Examples 1, 20, 31, and 41.
Figure 4:
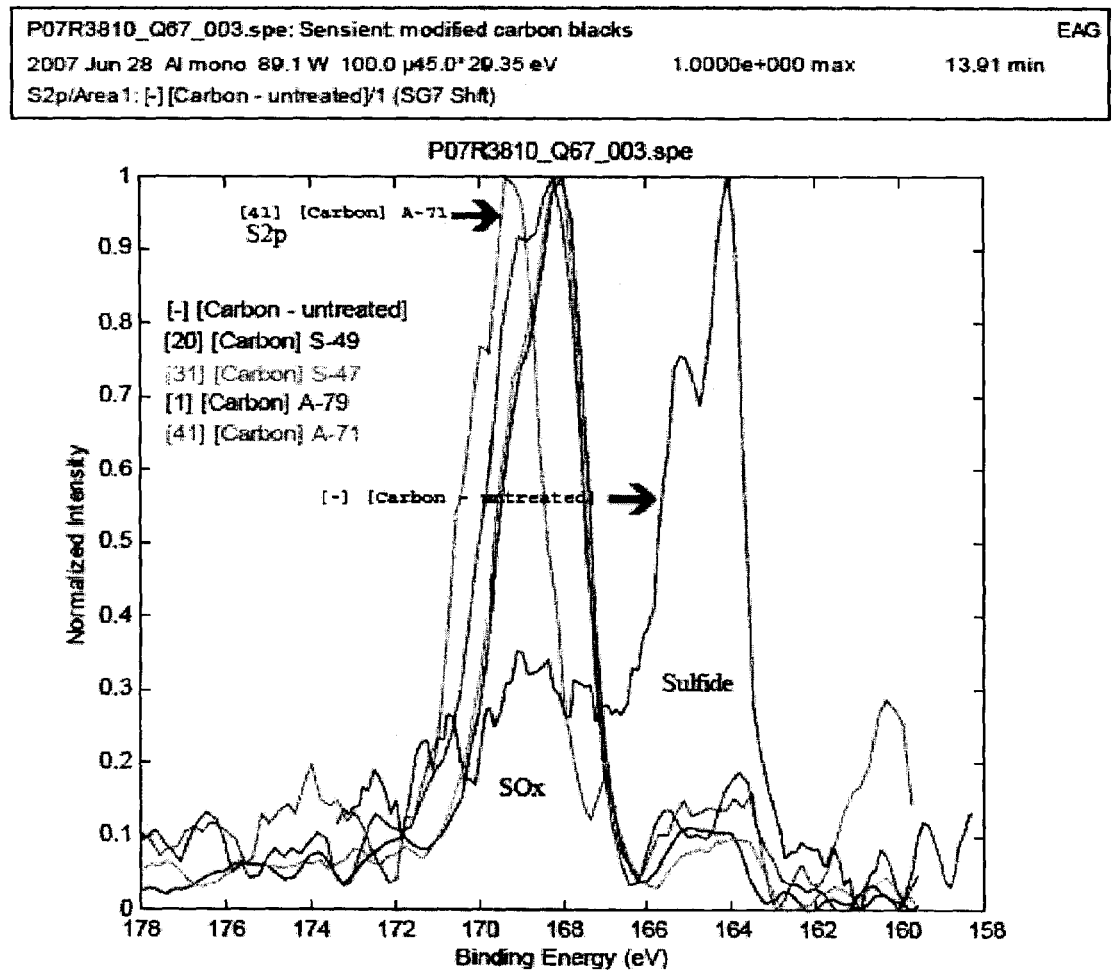
FIG. 4 displays high resolution S2p XPS spectra for untreated carbon black samples and carbon black samples from Examples 1, 20, 31, and 41.
Figure 5:
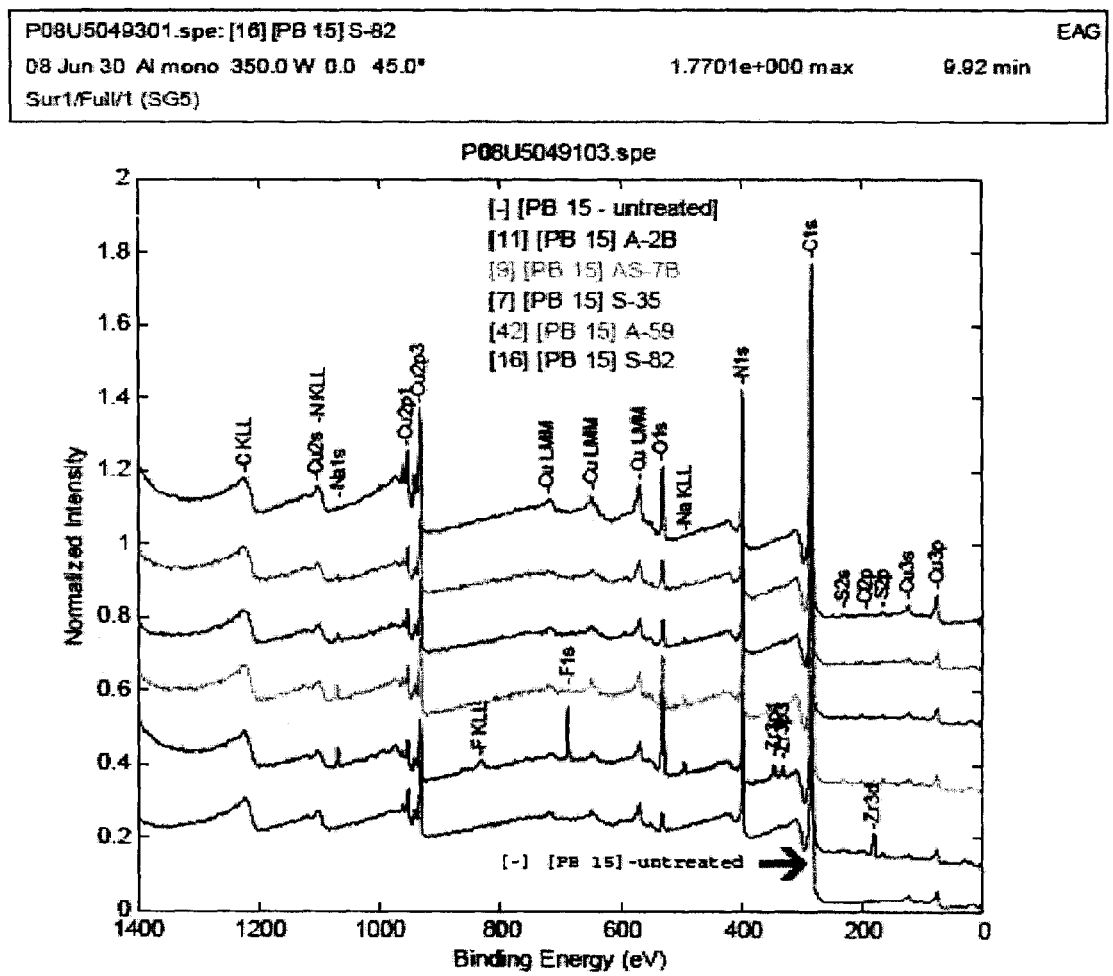
FIG. 5 displays low resolution XPS spectra for untreated Pigment Blue 15 samples and Pigment Blue 15 samples from Examples 7, 9, 11, 16, and 42.
Figure 6:
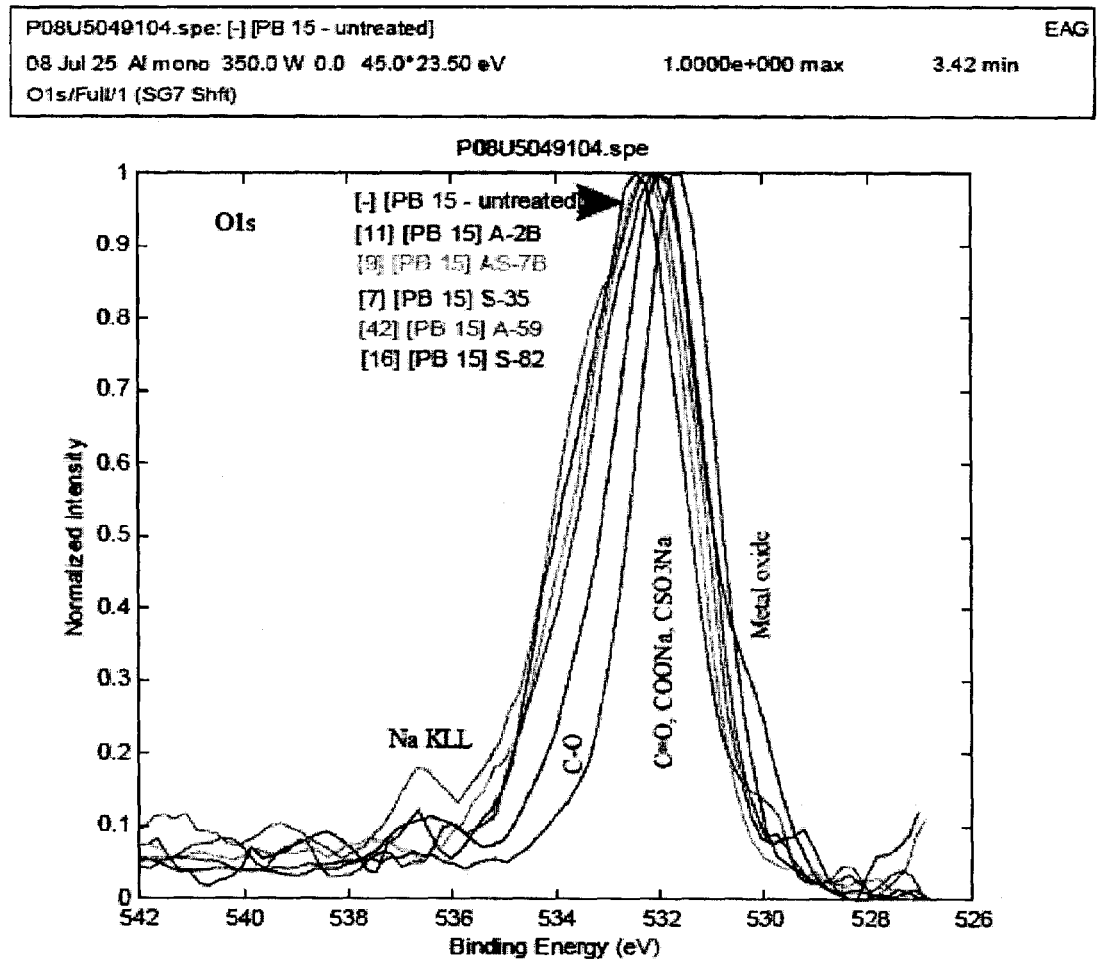
FIG. 6 displays high resolution O1s XPS spectra for untreated Pigment Blue 15 samples and Pigment Blue 15 samples from Examples 7, 9, 11, 16, and 42.
Figure 7:
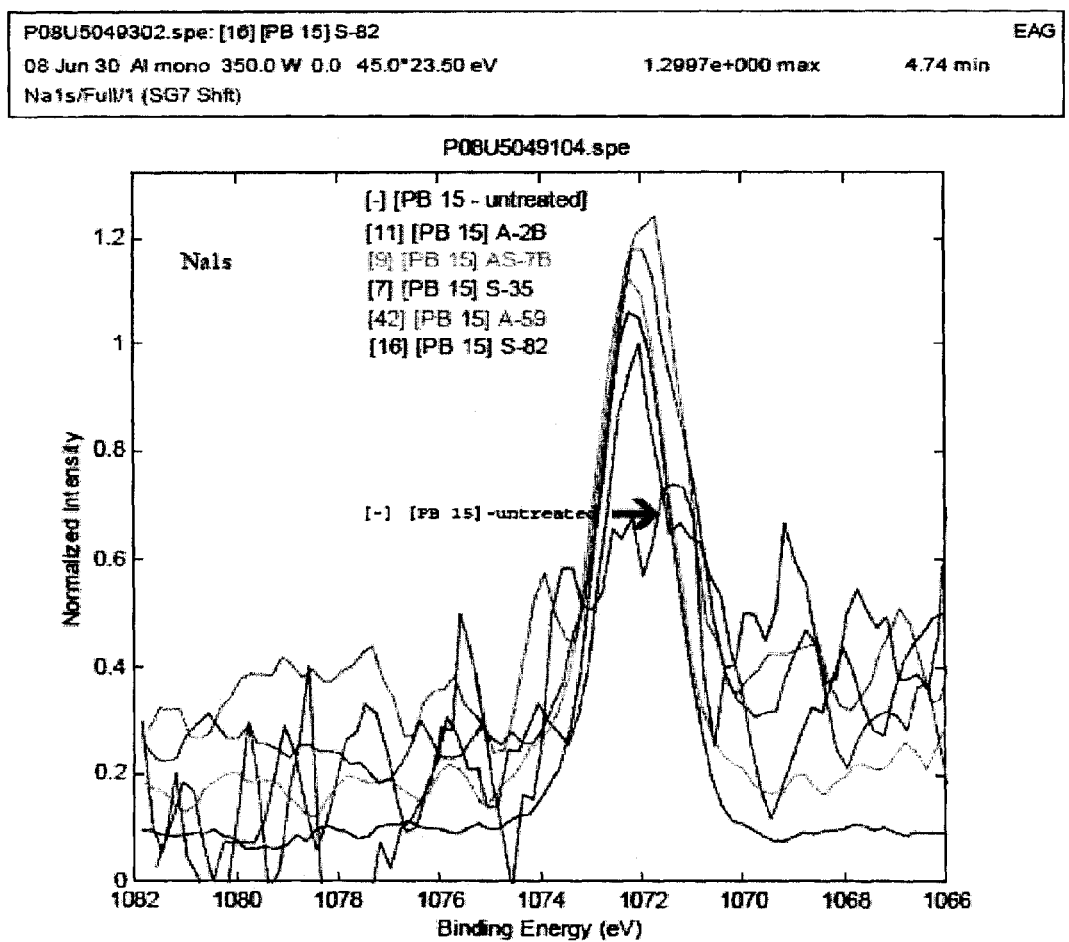
FIG. 7 displays high resolution Na1s XPS spectra for untreated Pigment Blue 15 samples and Pigment Blue 15 samples from Examples 7, 9, 11, 16, and 42.
Figure 8:
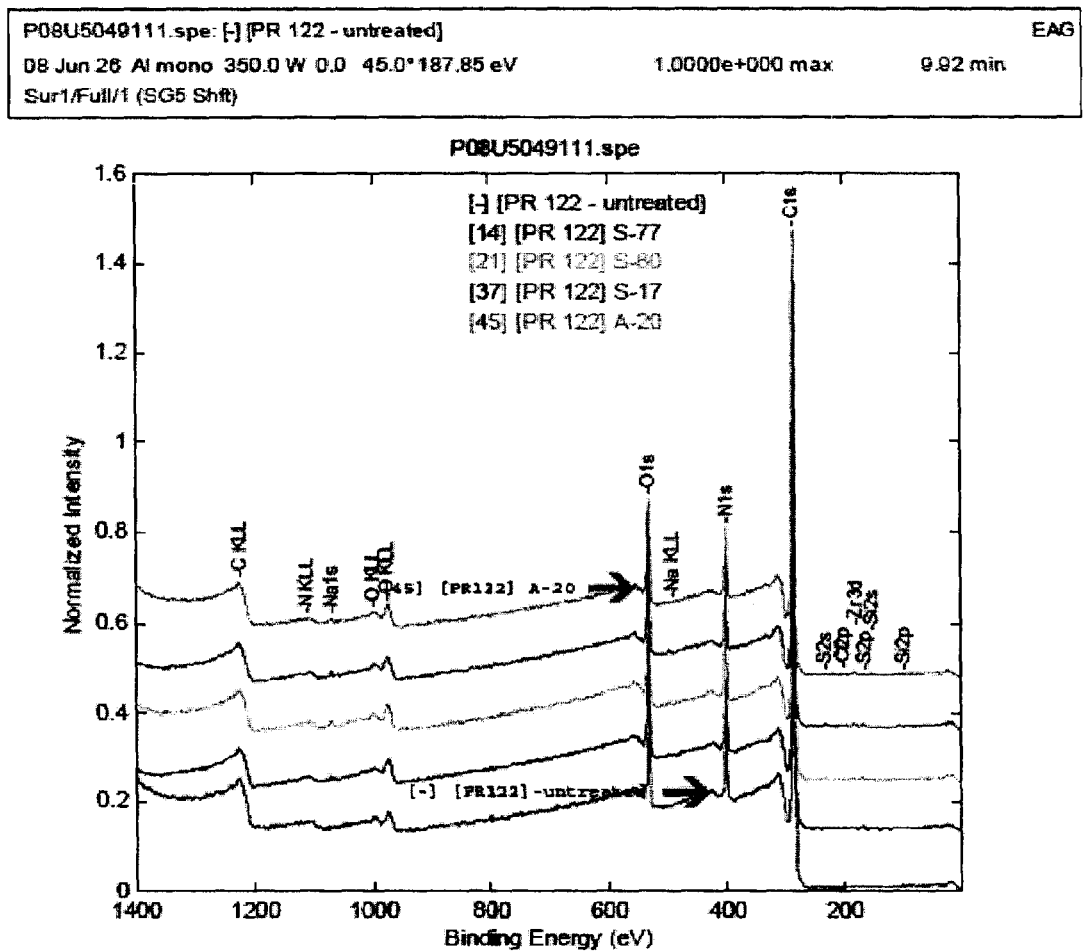
FIG. 8 displays low resolution XPS spectra for untreated Pigment Red No. 122 samples and Pigment Red No. 122 samples from Examples 14, 21, 37, and 45.
Figure 9:
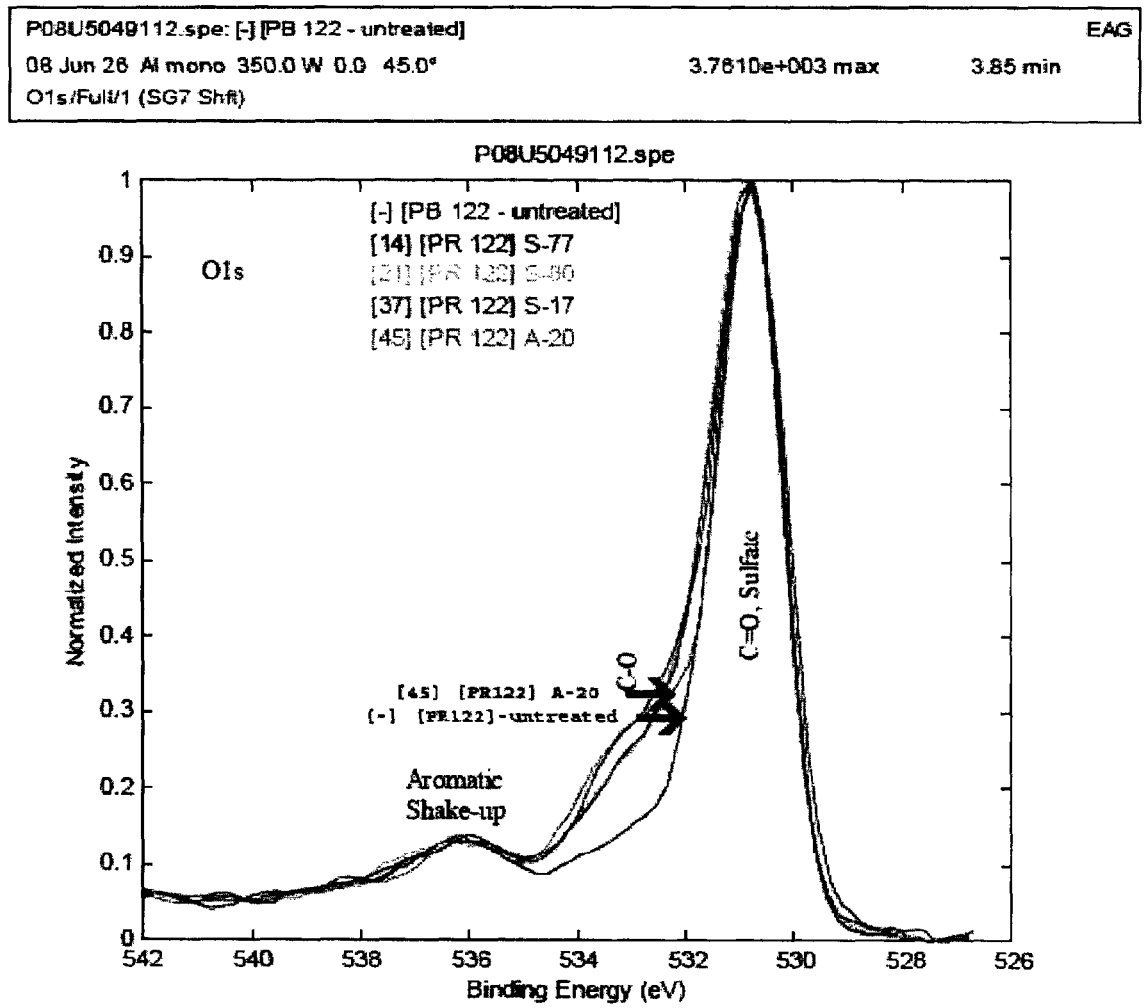
FIG. 9 displays high resolution O1s XPS spectra for untreated Pigment Red No. 122 samples and Pigment Red No. 122 samples from Examples 14, 21, 37, and 45.
Figure 10:
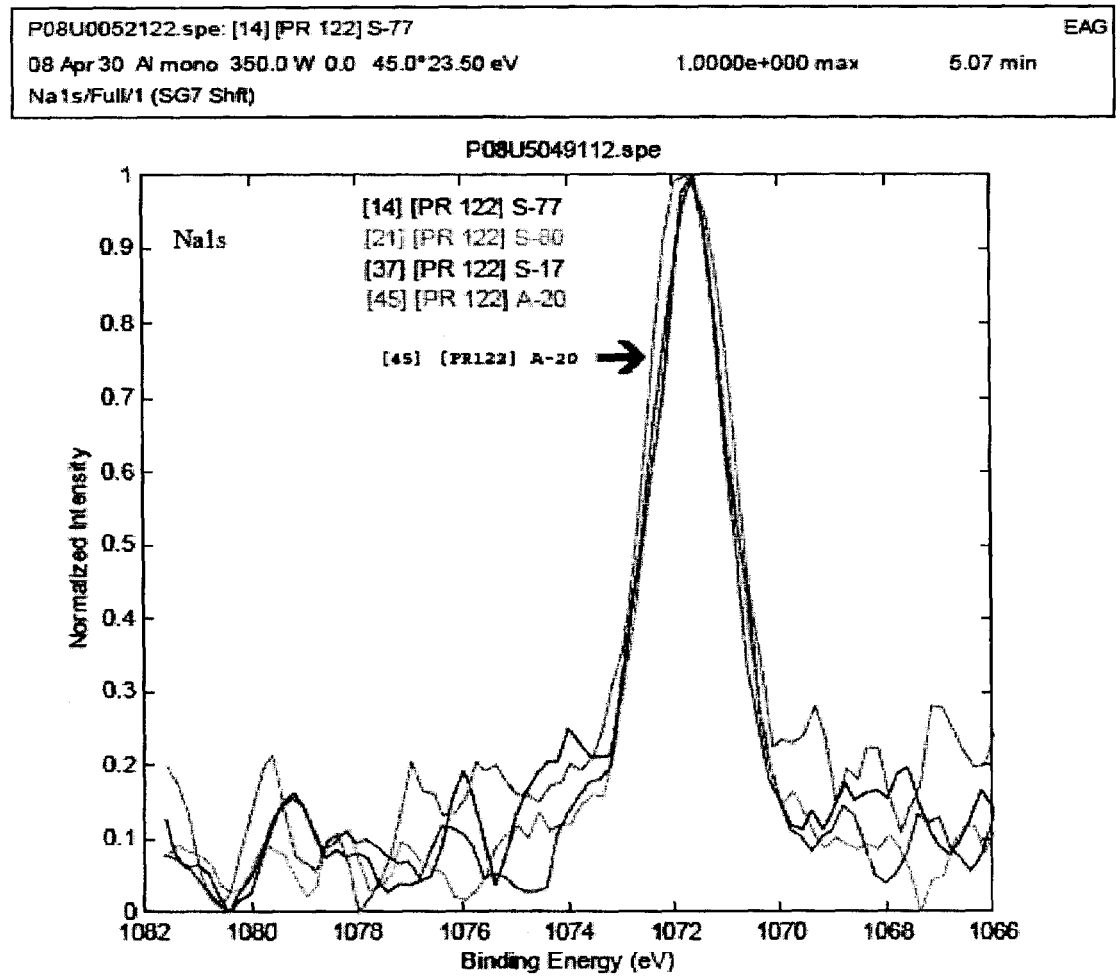
FIG. 10 displays high resolution Na1s XPS spectra for Pigment Red No. 122 samples from Examples 14, 21, 37, and 45.
Figure 11:
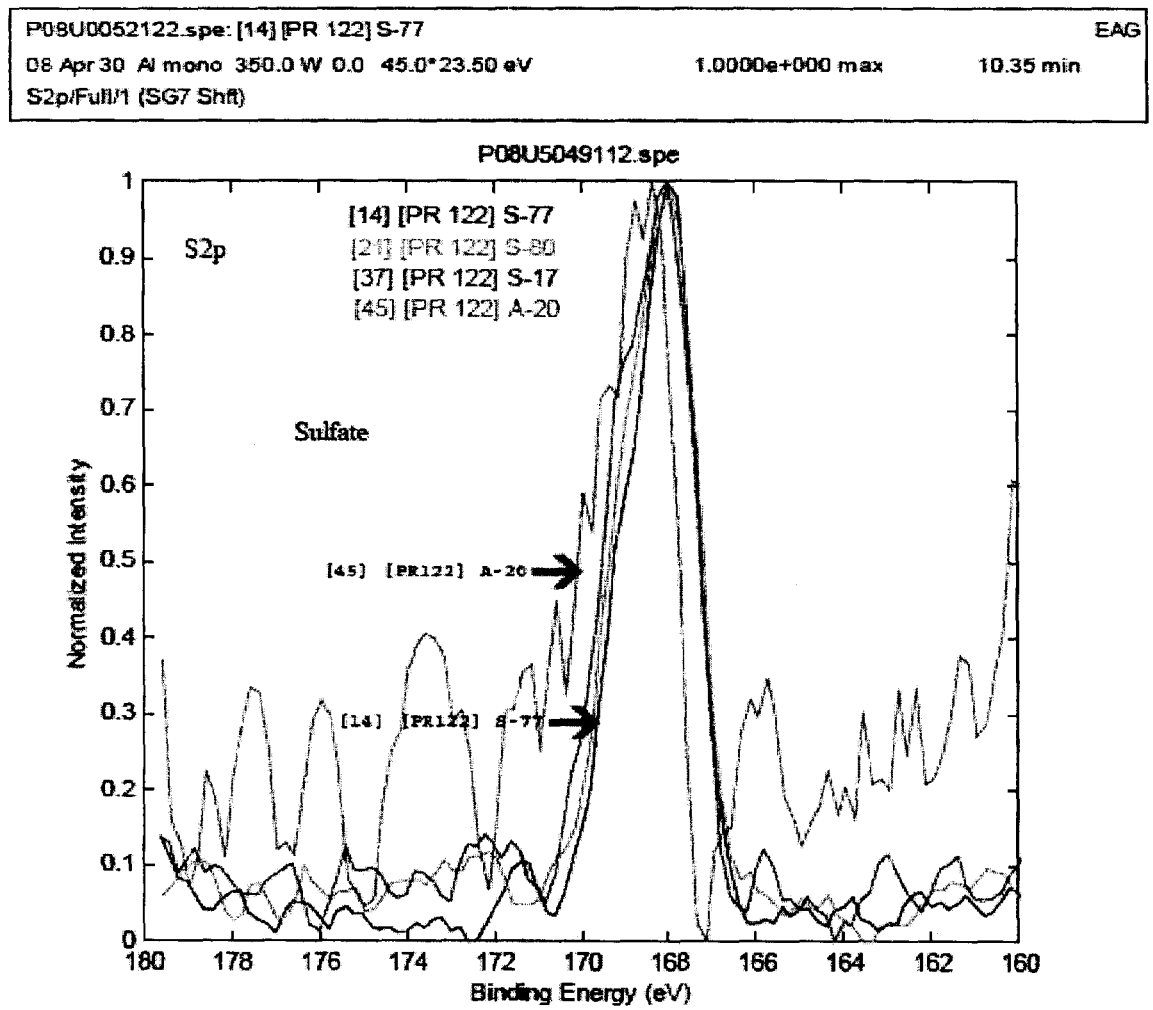
FIG. 11 displays high resolution S2p XPS spectra for Pigment Red No. 122 samples from Examples 14, 21, 37, and 45.
Figure 12:
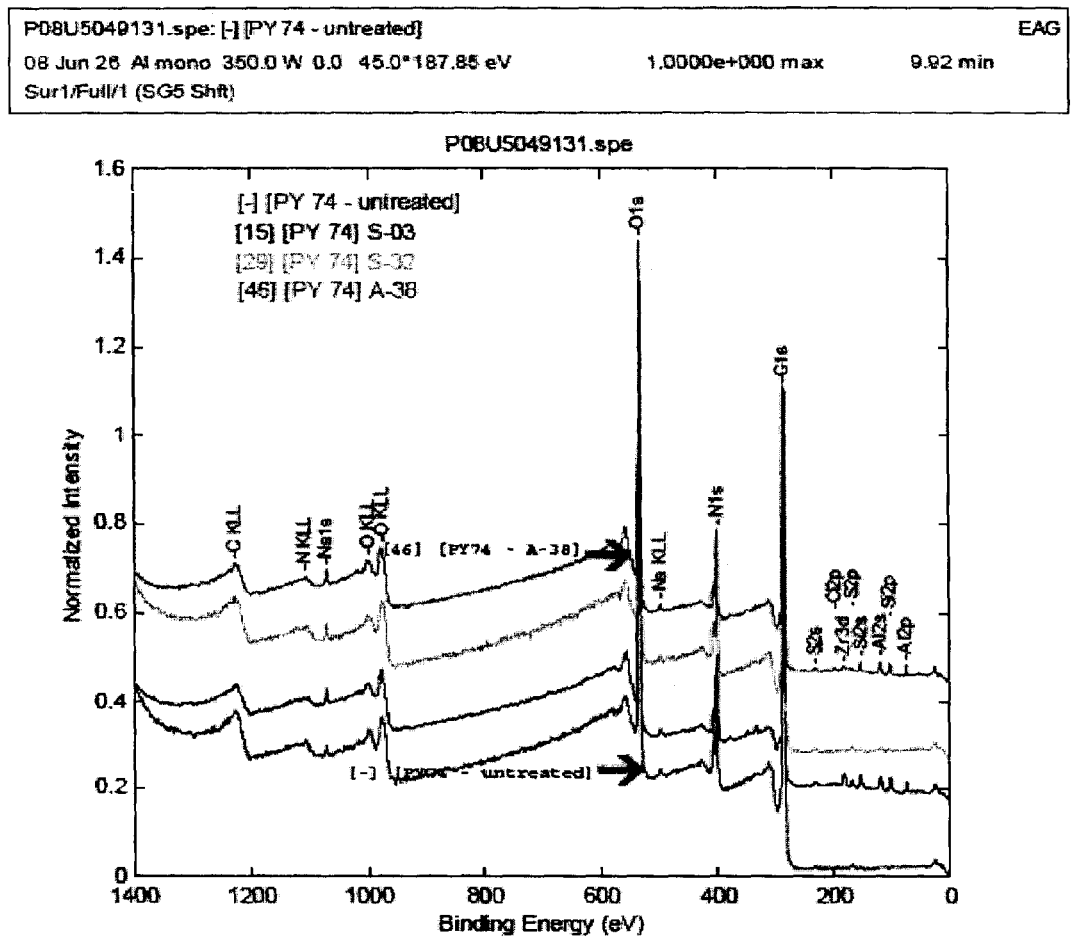
FIG. 12 displays low resolution XPS spectra for untreated Pigment Yellow No. 74 samples and for Pigment Yellow No. 74 samples from examples 15, 29, and 46.
Figure 13:
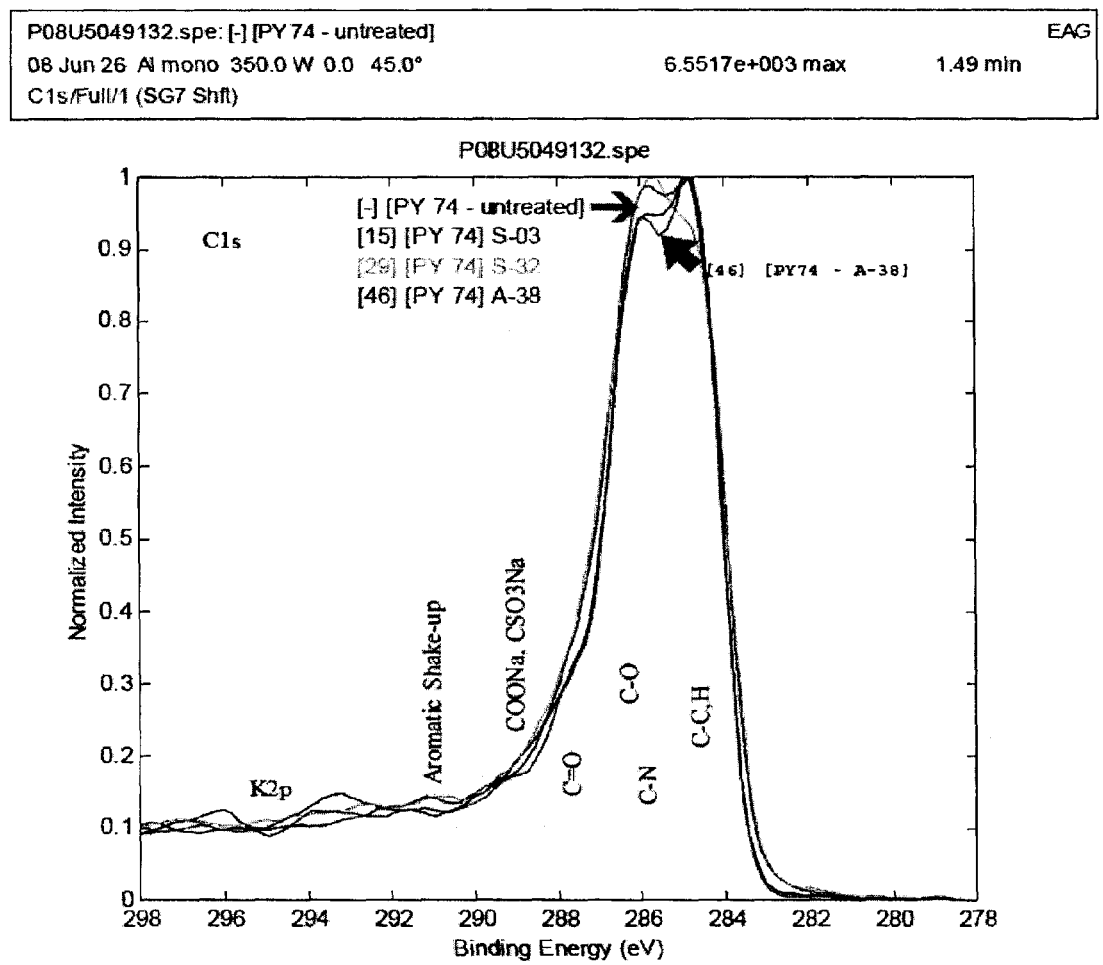
FIG. 13 displays high resolution C1s XPS spectra for untreated Pigment Yellow No. 74 samples and for Pigment Yellow No. 74 samples from examples 15, 29, and 46.
Figure 14:
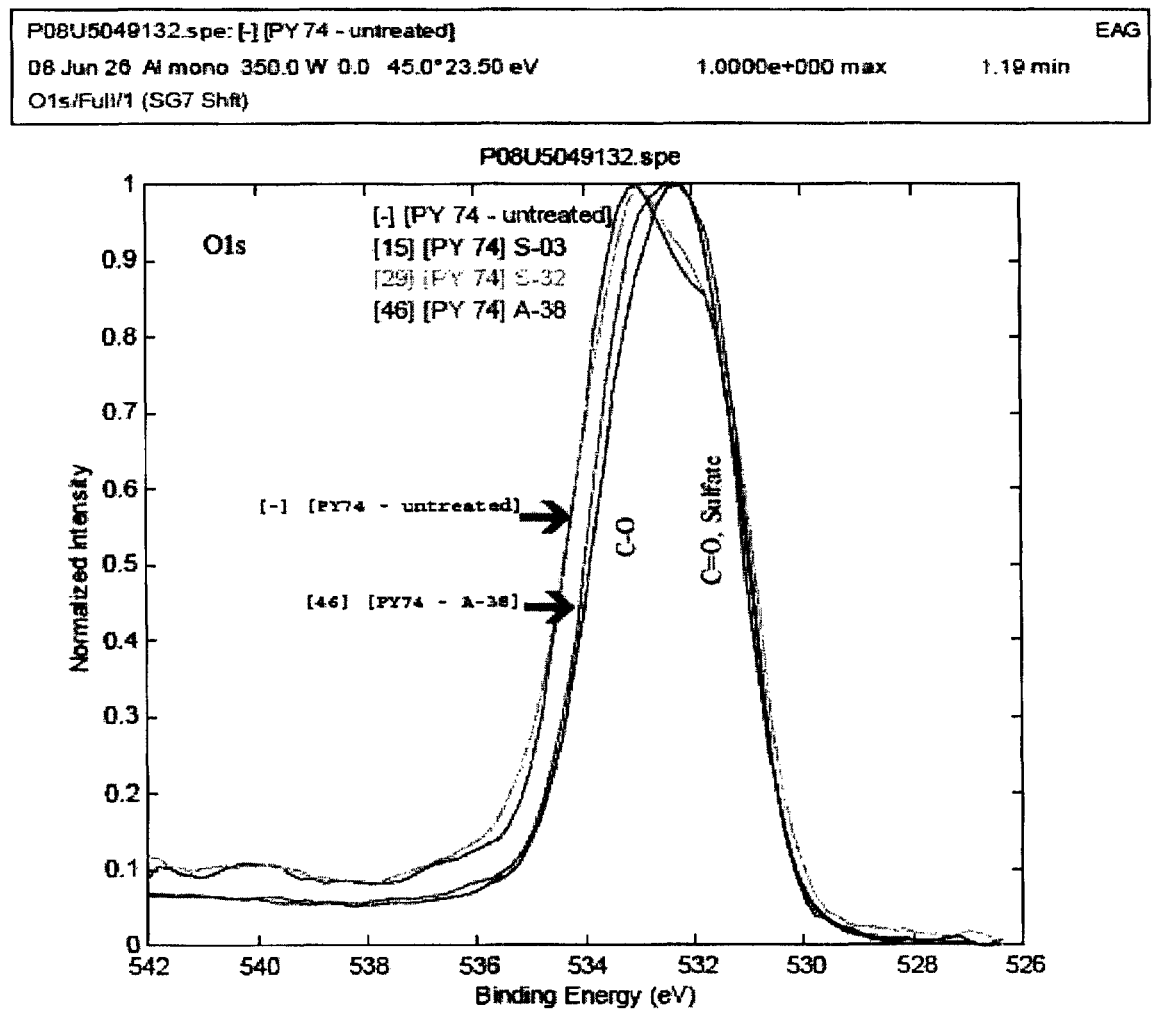
FIG. 14 displays high resolution O1s XPS spectra for untreated Pigment Yellow No. 74 samples and for Pigment Yellow No. 74 samples from examples 15, 29, and 46.

The XPS data were acquired by EAG Labs (in Chanhassen, Minn.) using a probe beam of focused, monochromatic Al $K_\alpha$ radiation. The x-rays generate photoelectrons that are energy analyzed and counted to reveal the atomic composition and chemistry of the sample surface. The escape depth of the photoelectrons limits the depth of analysis to the outer ~50 Å. The data presented includes low resolution survey scans, which give the full spectrum between 0 and 1400 eV binding energy. Also included in the data are high resolution spectra from selected elements, which provide chemical state information. The spectra are used to obtain surface composition by integrating the areas under the photoelectron peaks and applying empirical sensitivity factors. The XPS data is presented in FIGS. 1-14.

TABLE 8

Analytical Conditions.

| | |
|---|---|
| Instrument: | Physical Electronics 5802 Multitechnique, Quantum 2000 Scanning XPS |
| X-ray Source: | Monochromatic Al $K_\alpha$ 1486.6 eV |
| Analysis Area: | 1.5 mm × 0.6 mm - 5802, 1.2 mm × 0.2 mm - Quantum 2000 |
| Take-off Angle: | 45° |
| Charge Correction: | C-C, C—H in C1s spectra set to 284.8 eV |
| Charge Neutralization: | Low energy electron and ion floods |

Tables for Carbon Black Samples

The following tables were normalized to 100% of the elements detected. XPS does not detect H or He. Detection limits are typically between 0.05% and 1.0% for other elements. A dash "-" indicates the element was not detected. High S (0.6) for Example [1] [Carbon] A-79 is indicative of a surface $SO_2$ bond introduced by chlorosulfonation. High S content in SA attached Examples [20] and [31] are due to the $SO_3Na$ groups present on the surface due to the SA attachment. Both unreacted carbon and 4-ABA attached carbon from Example [41] have only a low level of S as expected. The levels of N and Na present in all samples, except the unreacted carbon, is a measure of charge groups present either as amino benzoic or benzene sulfonic acid groups as corresponding sodium salts.

TABLE 9-1

XPS Surface Concentrations of Carbon Black Samples (Atomic %).

| Example | C | N | O | Na | S | Cl |
|---|---|---|---|---|---|---|
| [—] [Carbon - untreated] | 97.5 | — | 2.4 | — | 0.11 | 0.03 |
| [20] [Carbon] S-49 | 90.1 | 1.4 | 6.8 | 0.8 | 0.7 | 0.2 |
| [31] [Carbon] S-47 | 88.6 | 1.5 | 7.9 | 0.7 | 0.9 | 0.2 |
| [1] [Carbon] A-79 | 80.8 | 0.7 | 13.4 | 2.6 | 0.6 | 1.6 |
| [41] [Carbon] A-71 | 70.3 | 2.7 | 20.9 | 2.2 | 0.2 | — |

TABLE 9-2

Carbon Chemistries of Carbon Black Samples (% of total C).

| Example | C—C, H | C—O/ C—N | C=O | COONa/ CSO3Na | Aromatic Shake-up |
|---|---|---|---|---|---|
| [—] [Carbon - untreated] | 86 | 3 | 0.7 | 0.2 | 10 |
| [20] [Carbon] S-49 | 90 | 3 | 0.5 | 1.4 | 6 |
| [31] [Carbon] S-47 | 89 | 3 | 1.3 | 1.4 | 6 |
| [1] [Carbon] A-79 | 86 | 6 | 0.9 | 4 | 3 |
| [41] [Carbon] A-71 | 88 | 4 | — | 6 | 2 |

TABLE 9-3

Nitrogen Chemistries of Carbon Black Samples (% of total N).

| Example | N—C=N | NH | $NO_3$ |
|---|---|---|---|
| [20] [Carbon] S-49 | 54 | 46 | — |
| [31] [Carbon] S-47 | 53 | 47 | — |
| [1] [Carbon] A-79 | 47 | 53 | — |
| [41] [Carbon] A-71 | 46 | 54 | — |

TABLE 9-4

Oxygen Chemistries of Carbon Black Samples (% of total O).

| Example | C=O, COONa, SO$x$ | C—O |
|---|---|---|
| [—] [Carbon - untreated] | 32 | 68 |
| [20] [Carbon] S-49 | 62 | 38 |
| [31] [Carbon] S-47 | 61 | 39 |
| [1] [Carbon] A-79 | 51 | 49 |
| [41] [Carbon] A-71 | 60 | 25 |

TABLE 9-5

Sulfur Chemistries of Carbon Black Samples (% of total S).

| Example | Sulfides | SO$x$ |
|---|---|---|
| [—] [Carbon - untreated] | 69 | 31 |
| [20] [Carbon] S-49 | 8 | 92 |
| [31] [Carbon] S-47 | 7 | 93 |

TABLE 9-5-continued

Sulfur Chemistries of Carbon Black Samples (% of total S).

| Example | Sulfides | SO$x$ |
|---|---|---|
| [1] [Carbon] A-79 | 8 | 92 |
| [41] [Carbon] A-71 | — | 100 |

The S present in untreated carbon as sulfides was largely oxidized to sulfate/sulfone in all treated samples, adding to the surface charge groups.

Tables for PB 15 Samples

TABLE 10-1

XPS Surface Concentrations of PB 15 Samples (Atomic %).

| Example | C | N | O | Na | S | Cl | Cu |
|---|---|---|---|---|---|---|---|
| [—] [PB 15 - untreated] | 78.7 | 17.3 | 1.6 | 0.1 | 0.09 | — | 2.3 |
| [11] [PB 15] A-2B | 73.2 | 14.1 | 6.5 | 0.8 | 0.7 | — | 1.6 |
| [9] [PB 15] AS-7B | 75.6 | 16.4 | 4.5 | 0.7 | 0.6 | 0.05 | 2.2 |
| [7] [PB 15] S-35 | 78.4 | 15.9 | 2.9 | 0.4 | 0.4 | 0.12 | 2.0 |
| [42] [PB 15] A-59 | 78.0 | 16.2 | 2.9 | 0.3 | 0.2 | — | 2.4 |
| [16] [PB 15] S-82 | 73.2 | 17.4 | 5.2 | — | 0.3 | — | 4.0 |

TABLE 10-2

Carbon Chemistries of PB 15 Samples (% of total C).

| Example | C—C,H | N—C=N* | CN—Cu? | COONa/CSO3Na | Aromatic Shake-up |
|---|---|---|---|---|---|
| [—] [PB 15 - untreated] | 67 | 22 | 4.7 | 1.1 | 5 |
| [11] [PB 15] A-2B | 73 | 21 | 2.7 | 1.1 | 2 |
| [9] [PB 15] AS-7B | 68 | 23 | 3.7 | 1.5 | 4 |
| [7] [PB 15] S-35 | 72 | 20 | 2.6 | 0.8 | 4 |
| [42] [PB 15] A-59 | 70 | 22 | 3.5 | 0.7 | 4 |
| [16] [PB 15] S-82 | 68 | 23 | 4.5 | 0.9 | 4 |

*C—O bonding may also contribute to the intensity of this band.

TABLE 10-3

Nitrogen Chemistries of PB 15 Samples (% of total N).

| Example | N—C=N | CN—Cu | Aromatic Shake-up |
|---|---|---|---|
| [—] [PB 15 - untreated] | 79 | 9 | 12 |
| [11] [PB 15] A-2B | 76 | 8 | 15 |
| [9] [PB 15] AS-7B | 76 | 9 | 15 |
| [7] [PB 15] S-35 | 78 | 7 | 15 |
| [42] [PB 15] A-59 | 81 | 8 | 11 |
| [16] [PB 15] S-82 | 77 | 9 | 14 |

TABLE 10-4

Oxygen Chemistries of PB 15 Samples (% of total O).

| Example | Metal Oxide | C=O, COONa, SO$x$ | C—O |
|---|---|---|---|
| [—] [PB 15 - untreated] | — | 69 | 31 |
| [11] [PB 15] A-2B | 10 | 75 | 15 |
| [9] [PB 15] AS-7B | — | 62 | 38 |

TABLE 10-4-continued

Oxygen Chemistries of PB 15 Samples (% of total O).

| Example | Metal Oxide | C=O, COONa, SO$x$ | C—O |
|---|---|---|---|
| [7] [PB 15] S-35 | — | 65 | 35 |
| [42] [PB 15] A-59 | — | 57 | 43 |
| [16] [PB 15] S-82 | — | 92 | 8 |

Tables for PR 122 Samples

TABLE 11-1

XPS Surface Concentrations of PR 122 Samples (Atomic %).

| Example | C | N | O | Na | S | Cl |
|---|---|---|---|---|---|---|
| [—] [PR 122 - untreated] | 85.3 | 7.9 | 6.8 | — | — | — |
| [14] [PR 122] S-77 | 83.4 | 7.9 | 8.3 | 0.2 | 0.2 | 0.03 |
| [21] [PR 122] S-80 | 83.1 | 7.9 | 8.4 | 0.2 | 0.3 | 0.04 |
| [37] [PR 122] S-17 | 81.8 | 7.7 | 9.8 | 0.3 | 0.3 | — |
| [45] [PR 122] A-20 | 83.1 | 7.6 | 8.8 | 0.15 | 0.05 | 0.03 |

TABLE 11-2

Carbon Chemistries of PR 122 Samples (% of total C).

| Example | C—C,H | C$_2$NH*,# | C=O | COONa/CSO$_3$Na | Aromatic Shake-up |
|---|---|---|---|---|---|
| [–] [PR 122 – untreated] | 70 | 21 | 2.6 | 1.4 | 5 |
| [14] [PR 122] S-77 | 66 | 21 | 5.8 | 1.8 | 6 |
| [21] [PR 122] S-80 | 68 | 20 | 5.6 | 2.0 | 5 |
| [37] [PR 122] S-17 | 68 | 21 | 4.3 | 2.0 | 5 |
| [45] [PR 122] A-20 | 66 | 22 | 3.5 | 2.1 | 6 |

*C—O bonding may also contribute to the intensity of this band.
C$_2$NH denotes each of the C atoms bonded in the following group:

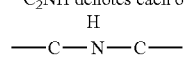

TABLE 11-3

Oxygen Chemistries of PR 122 Samples (% of total O).

| Example | C=O, COONa, SOx | C—O | Aromatic Shake-up |
|---|---|---|---|
| [—] [PR 122 - untreated] | 79 | 12 | 9 |
| [14] [PR 122] S-77 | 67 | 24 | 9 |
| [21] [PR 122] S-80 | 67 | 24 | 10 |
| [37] [PR 122] S-17 | 62 | 28 | 11 |
| [45] [PR 122] A-20 | 60 | 32 | 8 |

Tables for PY 74 Samples

TABLE 12-1

XPS Surface Concentrations of PY 74 Samples (Atomic %).

| Example | C | N | O | Na | S |
|---|---|---|---|---|---|
| [—] [PY 74 - untreated] | 64.6 | 13.8 | 20.8 | 0.3 | 0.3 |
| [15] [PY 74] S-03 | 52.6 | 10.6 | 29.3 | 0.6 | 0.6 |
| [29] [PY 74] S-32 | 63.2 | 13.8 | 21.6 | 0.4 | 0.4 |
| [46] [PY 74] A-38 | 56.4 | 11.2 | 27.1 | 0.5 | 0.3 |

TABLE 12-2

Carbon Chemistries of PY 74 Samples (% of total C).

| Example | C—C,H | C—NH* | C—O | C=O | COONa/CSO$_3$Na | Aromatic Shake-up |
|---|---|---|---|---|---|---|
| [—] [PY 74 - untreated] | 45 | 17 | 21 | 11 | 1.8 | 4 |
| [15] [PY 74] S-03 | 44 | 20 | 18 | 12 | 2.8 | 4 |
| [29] [PY 74] S-32 | 44 | 19 | 21 | 11 | 2.1 | 3 |
| [46] [PY 74] A-38 | 45 | 19 | 18 | 11 | 2.5 | 4 |

*C—O bonding may also contribute to the intensity of this band.

TABLE 12-3

Nitrogen Chemistries of PY 74 Samples (% of total N).

| Example | C—N | NO$_2$ | NO$_3$ |
|---|---|---|---|
| [—] [PY 74 - untreated] | 71 | 9 | 20 |
| [15] [PY 74] S-03 | 73 | 9 | 18 |
| [29] [PY 74] S-32 | 70 | 11 | 19 |
| [46] [PY 74] A-38 | 72 | 9 | 19 |

TABLE 12-4

Oxygen Chemistries of PY 74 Samples (% of total O).

| Example | C=O, COONa, SOx | C—O, NO$_x$ |
|---|---|---|
| [—] [PY 74 - untreated] | 41 | 59 |
| [15] [PY 74] S-03 | 48 | 52 |
| [29] [PY 74] S-32 | 42 | 58 |
| [46] [PY 74] A-38 | 45 | 55 |

The XPS results indicate that the surface modification as disclosed yields a modified carbon black with an increase in surface nitrogen, as an NH/N—C=N group distributed almost equally, in about 0.7 to 2.7 atomic %.

The XPS results indicate that the surface modification as disclosed yields a modified carbon black with a surface oxygen in the atomic ratio of 6.8 to 20.9% wherein >51 to 62% of the oxygen is present as C=O, COONa, or SOx group and the balance (49-38%) as a C—O group. In contrast, the surface oxygen in the untreated carbon black is only about 2.4% and is distributed as 32% as a C=O, COONa or SOx group and the balance (68%) as a C—O group. SOx may be an oxidized form of S and may include, without limitation, a sulfone, a sulfate, or a sulfonic acid.

The XPS results indicate that the surface modification as disclosed yields a modified carbon black with an increase in surface sodium, as COONa/SO3Na, in about 0.7 to 2.6 atomic %.

The XPS results indicate that the surface modification as disclosed yields a modified carbon black wherein at least 90% of the S present is oxidized S(SOx).

The XPS results for untreated carbon blacks and carbon blacks from Examples 1, 20, 31, and 41 are displayed in FIGS. 1-4.

The XPS results indicate that surface modification as disclosed yields a modified Pigment Blue No. 15 with significantly higher surface oxygen content (>2.5% atomic ratio) compared to a low 1.6% in the untreated pigment. The XPS results for untreated Pigment Blue No. 15 and Pigment Blue No. 15 from Examples 7, 9, 11, 16 and 42 are displayed in FIGS. 5-7.

The XPS results indicate that the surface modification as disclosed yields a modified Pigment Red No. 122 with a surface oxygen in the atomic ratio of 8.3-9.8% wherein 24-32% of the total O exists as a C—O bond compared to only 12% present as C—O in the untreated pigment. The XPS results for untreated Pigment Red No. 122 and Pigment Red No. 122 from Examples 14, 21, 37, and 45 are displayed in FIGS. 8-11.

The XPS indicate that the surface modification as disclosed yields a modified Pigment Yellow No. 74 with a surface oxygen in the atomic ratio of 21.6 to 29.3% of which 42-48% is present as C=O, COONa/CSO$_3$Na. In contrast, in the untreated pigment the surface oxygen is only about 20.8%, of which 41% is present as a C=O, COONa/CSO$_3$Na group. The XPS results for untreated Pigment Yellow No. 74 and Pigment Yellow No. 74 from Examples 15, 29, and 46 are displayed in FIGS. 12-14.

Example 50

TABLE 13

Elemental analysis (% C, H, N, & S).

| Sample [Ex#] [Pigment Type] | C | H | N | S |
|---|---|---|---|---|
| 1 [—] [PB 15$^4$ - untreated] | 66.78 | 3.09 | 18.42 | 0.25 |
| 2 [7] [PB 15$^3$] S-35 | 62.54 | 2.81 | 18.46 | 1.12 |
| 3 [9] [PB 15$^3$] AS-7B | 62.47 | 2.97 | 18.00 | 1.38 |
| 4 [11] [PB 15$^3$] A-2B | 61.67 | 3.02 | 17.26 | 1.17 |
| 5 [16] [PB 15$^3$] S-82 | 62.05 | 2.76 | 18.39 | 0.85 |
| 6 [42] [PB 15$^4$] A-59 | 65.95 | 3.15 | 18.82 | 0.54 |
| 7 [—] [PR122$^6$ - untreated] | 74.55 | 4.92 | 8.36 | 0.16 |

TABLE 13-continued

Elemental analysis (% C, H, N, & S).

| Sample [Ex#] [Pigment Type] | %C | %H | %N | %S |
|---|---|---|---|---|
| 8 [14] [PR 122³] S-77 | 74.86 | 4.61 | 7.90 | 0.44 |
| 9 [21] [PR 122³] S-80 | 74.93 | 4.70 | 8.00 | 0.36 |
| 10 [37] [PR 122³] S-17 | 74.20 | 4.88 | 8.04 | 0.60 |
| 11 [45] [PR122³] A-20 | 75.74 | 4.54 | 8.09 | 0.20 |
| 12 [—] [PY 74⁷ - untreated] | 52.98 | 4.47 | 13.53 | 0.31 |
| 13 [15] [PY 74⁷] S-03 | 52.40 | 4.77 | 13.48 | 0.42 |
| 14 [29] [PY 74⁷] S-32 | 52.75 | 4.63 | 13.49 | 0.57 |
| 15 [46] [PY 74⁷] A-38 | 52.56 | 4.66 | 13.40 | 0.53 |
| 16 [—] [Carbon¹ - untreated] | 91.35 | 1.15 | 0.10 | 0.32 |
| 17 [1] [Carbon¹] A-79 | 72.93 | 1.08 | 0.54 | 2.25 |
| 18 [20] [Carbon¹] S-49 | 85.25 | 0.88 | 0.91 | 1.13 |
| 19 [31] [Carbon¹] S-47 | 86.53 | 0.88 | 0.88 | 1.04 |
| 20 [41] [Carbon¹] A-71 | 80.87 | 1.36 | 1.61 | 0.33 |

| Sample [Ex#] [Pigment Type] | [S] mmol/g | Na¹⁵ | K¹⁵ | [H] mmol/g |
|---|---|---|---|---|
| 1 [—] [PB 15⁴ - untreated] | 0.078 | — | — | — |
| 2 [7] [PB 15³] S-35 | 0.349 | 0.47 | 0 | 0.204 |
| 3 [9] [PB 15³] AS-7B | 0.430 | 0.66 | 0 | 0.287 |
| 4 [11] [PB 15³] A-2B | 0.365 | 0.72 | 0 | 0.313 |
| 5 [16] [PB 15³] S-82 | 0.265 | 0.15 | 0.02 | 0.070 |
| 6 [42] [PB 15⁴] A-59 | 0.168 | 0.2 | 0.07 | 0.105 |

TABLE 14

Particle Size Measurements and Stability data of Pigment Dispersions.

| Example [#] | Pigment Type | Viscosity Initial | Viscosity Week 1 | Viscosity Week 3 | Particle Size Initial | Particle Size Week 1 | Particle Size Week 3 | pH Initial | pH Final |
|---|---|---|---|---|---|---|---|---|---|
| 7 | PB15³ | 1.82 | 2.06 | 2.02 | 203 | 206 | 198 | 8.8 | 7.9 |
| 11 | PB15³ | 1.78 | 1.78 | 1.81 | 157 | 156 | 156 | 8.0 | 8.0 |
| 15 | PY74⁷ | 1.7 | 1.7 | 1.6 | 173 | 153 | 155 | 7.8 | 7.3 |
| 24 | Carbon¹ | 2.66 | 2.67 | 3.22 | 110 | 115 | 113 | 9.4 | 9.1 |
| 25 | Carbon¹ | 2.7 | 3.27 | 3.60 | 125 | 134 | 129 | 7.3 | 7.2 |
| 27 | PB15² | 1.38 | 1.37 | 1.36 | 207 | 202 | 196 | 8.2 | 7.9 |
| 28 | PY74⁷ | 1.42 | 1.45 | 1.52 | 178 | 167 | 170 | 8.5 | 7.3 |
| 29 | PY74⁷ | 1.61 | 1.59 | 1.57 | 169 | 149 | 155 | 7.9 | 7.5 |
| 30 | PY74⁷ | 1.62 | 1.55 | 1.70 | 175 | 172 | 170 | 8.2 | 7.2 |
| 42 | PB15⁴ | 1.41 | 1.46 | 1.42 | 206 | 196 | 193 | 7.5 | 7.0 |
| 43 | PB15⁴ | 1.46 | 1.50 | 1.58 | 190 | 181 | 186 | 8.2 | 7.7 |
| 46 | PY74⁷ | 1.84 | 1.69 | 1.78 | 185 | 178 | 176 | 8.2 | 7.6 |

TABLE 13-continued

Elemental analysis (% C, H, N, & S).

| Sample [Ex#] [Pigment Type] | [S] | Na | K | [H] |
|---|---|---|---|---|
| 7 [—] [PR122⁶ - untreated] | 0.050 | — | — | — |
| 8 [14] [PR 122³] S-77 | 0.137 | 0.32 | 0.10 | 0.168 |
| 9 [21] [PR 122³] S-80 | 0.112 | 0.14 | 0.07 | 0.077 |
| 10 [37] [PR 122³] S-17 | 0.187 | 0.57 | 0.58 | 0.394 |
| 11 [45] [PR122³] A-20 | 0.062 | 0.11 | 0.16 | 0.086 |
| 12 [—] [PY 74⁷ - untreated] | 0.097 | — | — | — |
| 13 [15] [PY 74⁷] S-03 | 0.131 | 0.30 | 0.24 | 0.192 |
| 14 [29] [PY 74⁷] S-32 | 0.178 | 0.46 | 0.35 | 0.290 |
| 15 [46] [PY 74⁷] A-38 | 0.165 | 0.24 | 0.47 | 0.225 |
| 16 [—] [Carbon¹ - untreated] | 0.100 | — | — | — |
| 17 [1] [Carbon¹] A-79 | 0.702 | 3.63 | 0 | 1.579 |
| 18 [20] [Carbon¹] S-49 | 0.352 | 0.57 | 0.59 | 0.399 |
| 19 [31] [Carbon¹] S-47 | 0.324 | 0.38 | 0.45 | 0.280 |
| 20 [41] [Carbon¹] A-71 | 0.103 | 0.29 | 0.3 | 0.203 |

¹⁵The sodium and potassium were calculated @ 100% solids from ICP metal analysis of the original dispersion.

The results of the elemental analysis indicate that the surface modification as disclosed yields a modified Pigment Blue No. 15 with 0.168-0.430 mMoles of S and 0.070-0.313 mMoles of active hydrogen per gram of pigment.

The results of the elemental analysis indicate that the surface modification as disclosed yields a modified Pigment Red No. 122 with 0.062-0.187 mMoles of S and 0.077-0.394 mMoles of active hydrogen per gram of pigment.

The results of the elemental analysis indicate that the surface modification as disclosed yields a modified Pigment Yellow No. 74 with 0.131-0.178 mMoles of S and 0.192-0.290 mMoles of active hydrogen per gram of pigment The results of the elemental analysis indicate that the surface modification as disclosed yields a modified Carbon Black with 0.103-0.702 mMoles of S and 0.203-1.579 mMoles of active hydrogen per gram of pigment.

Example 51

Particle Size and Stability Measurement

Samples comprising 8-15% solids were prepared by diluting one drop of sample to 15 ml deionized water and loading into a 1 cm disposable cuvette, avoiding air bubbles. Malvern Zetasizer Nano series Model ZEN3600 was then used to measure mean particle size in the sample.

Examples 52-55

Print Performance—Print Testing with Epson C88+ Printer

A total of three ink sets were prepared. The first set (SA3) consisted of inks made, as detailed below, from dispersions made by sulfanilic acid (SA) attachment. The second and third ink sets (BA3 and BA) were prepared using the 4-aminobenzoic acid (4-ABA) attached pigments. Using an Epson C88+ printer Model B251A, known to use pigmented ink sets, test pages were printed with four different commonly used copy papers. The printed pages were analyzed by the Center for Integrated Manufacturing, Rochester Institute of Technology, Rochester, N.Y. The results are in Tables 17 and 20-22.

Example 52

The following ink base was made according to the procedure described below and used to make final inks with black dispersions.

TABLE 15

Ink Base I formulation.

| Ingredients | % by Weight |
|---|---|
| Water, deionized | 9.6 |
| 2-Pyrrolidone water blend | 10.0 |
| 1,5-pentanediol | 5.0 |
| PEG 600 Carb. Polyethylene Glycol | 4.0 |
| Nipacide BIT 20 | 0.3 |
| Surfynol 104E solution | 0.1 |
| 1,2-hexanediol | 1.0 |

First, 9.6% by weight of water was added to a clean vessel. A mixing device was then placed inside the vessel to agitate the water and provide mixing while the other ingredients are added. Mixing was achieved by using a magnetic stirring device. Next, 10% by weight of 2-pyrrolidone, 5% by weight of 1,5-pentanediol, 4% by weight of PEG 600, and 1% by weight of 1,2-hexanediol were added to the vessel. These were allowed to dissolve. Then, 0.1% by weight of Surfynol 104E solution and 0.3% by weight of Nipacide BIT 20 were added and allowed to dissolve.

Example 53

The following inks were made according to the procedure described below.

TABLE 16

Inks A-C.

| | Ink A | Ink B | Ink C |
|---|---|---|---|
| Pigment Dispersion from: | Example #33 (g) | Example #41 (g) | Example #39 (g) |
| Water, deionized | 39.12 | 43.97 | 39.40 |
| Dispersion | 30.88 | 26.03 | 30.60 |
| Inkbase | 30.00 | 30.00 | 30.00 |
| Surfynol 465 | 0.54 | 0.55 | 0.55 |
| Surfynol 440 | 0.38 | 0.36 | 0.36 |

A second vessel was prepared by adding calculated % by weight of DI water to the pigment dispersion to the vessel per Table 16. A magnetic stirring device was then placed into the vessel. Next the ink base followed by Surfynol surfactants (Air Products & Chemicals, Inc., Allentown, Pa.) were slowly added to the pigment dispersion in the second vessel. The dispersion was mixed during this process. After all of the diluent has been added, the ink was mixed for about 1 hour, or until it was completely homogenous. After mixing, the ink was filtered using a 1 micron glass filter (available from Whatman, Kent, England).

The print performance characteristics of the black inks are identified below.

Image Quality was measured with ImageXpert Full Motion System. Optical Density was measured with X-rite 939 Spectrodensitometer. Ozone Exposure was measured using RIT custom ozone chamber and Sutherland Rub test was done with Sutherland rub fixture. RIT was supplied with printed pages identified by ink set and media. Highlighter A is Sanford Yellow Major Accent® and Highlighter B is Avery Dennison Fluorescent Yellow Hi-Liter®

TABLE 17

Print Performance Characteristics.
Ink A with SA attachment and Inks B&C with 4ABA attachment.

| | HP MP-ColorLok | | | Xerox 4200 | | |
|---|---|---|---|---|---|---|
| | Ink A | Ink B | Ink C | Ink A | Ink B | Ink C |
| Optical Density | 1.039 | 1.073 | 1.076 | 1.032 | 1.038 | 0.969 |
| Rub Resistance (OD Diff) | 0.07 | 0.06 | 0.04 | 0.04 | 0.02 | 0.03 |
| Highlighter A Resistance (OD Diff) | 0.046 | 0.043 | 0.02 | 0.014 | 0.008 | 0.019 |
| Highlighter B Resistance (OD Diff) | 0.039 | 0.069 | 0.027 | 0.019 | 0.008 | 0.017 |
| Water resistance (OD Diff) | 0 | 0 | 0.003 | 0.003 | 0.002 | 0.001 |
| Ozone Fade | 0.616 | 0.587 | 0.780 | 0.678 | 0.633 | 0.918 |
| Line Width | 0.006 | 0.006 | 0.009 | 0.014 | 0.006 | 0.012 |
| Edge Acuity | 0.012 | 0.011 | 0.015 | 0.016 | 0.015 | 0.016 |
| Mottle | 1.925 | 2.171 | 1.84 | 1.596 | 1.508 | 1.686 |
| Black Yellow Bleed - Horizontal | 0.013 | 0.012 | 0.016 | 0.017 | 0.016 | 0.016 |
| Black Yellow Bleed - Vertical | 0.016 | 0.014 | 0.020 | 0.016 | 0.014 | 0.016 |

| | Office Depot 104 | | | Hammerill GW | | |
|---|---|---|---|---|---|---|
| | Ink A | Ink B | Ink C$ | Ink A | Ink B | Ink C |
| Optical Density | 1.012 | 1.04 | 1.259 | 0.941 | 0.966 | 0.95 |
| Rub Resistance (OD Diff) | 0.02 | 0.01 | — | 0.06 | 0.05 | 0.03 |
| Highlighter A Resistance (OD Diff) | 0.011 | 0.021 | 0 | 0.04 | 0.049 | 0.018 |
| Highlighter B Resistance (OD Diff) | 0.02 | 0.032 | 0.003 | 0.064 | 0.047 | 0.036 |
| Water resistance (OD Diff) | 0 | 0 | 0 | 0.002 | 0 | 0.001 |
| Ozone Fade | 0.699 | 0.737 | 0.885 | 0.909 | 0.674 | 0.826 |
| Line Width | 0.007 | 0.008 | 0.008 | 0.013 | 0.005 | 0.019 |
| Edge Acuity | 0.014 | 0.013 | 0.003 | 0.019 | 0.017 | 0.018 |
| Mottle | 2.287 | 1.98 | 0.918 | 3.75 | 3.018 | 2.737 |
| Black Yellow Bleed - Horizontal | 0.016 | 0.014 | 0.004 | 0.020 | 0.018 | 0.018 |
| Black Yellow Bleed - Vertical | 0.014 | 0.015 | 0.009 | 0.016 | 0.016 | 0.019 |

$Epson Photo Paper was used instead of Office Depot 104 for Ink Set 3.

Example 54

The following ink base was made according to the procedure described below and used to make final inks with color dispersions.

TABLE 18

Ink Base II formulation.

| Ingredients | % by Weight |
|---|---|
| Water | 12.3 |
| Glycerine | 14 |
| PEG 600 | 2 |
| Butyl Carbitol | 3 |
| TEA | 0.1 |
| Cobratec | 0.3 |
| Xbinx 19G | 0.3 |
| Ethanol | 2 |
| Butanol | 1 |

First, 12.3% by weight of water was added to a clean vessel. A mixing device was then placed inside the vessel to agitate the water and provide mixing while the other ingredients are added. Mixing was achieved by using a magnetic stirring device. Next, 14% by weight of glycerine, 2% by weight of PEG 600, 3% by weight of butyl carbitol, 2% by weight of ethanol, and 1% by weight of butanol were added to the vessel. These were allowed to dissolve. Then, 0.1% by weight of triethanolamine was added and allowed to dissolve. Finally, 0.3% by weight of Cobratec solution and 0.3% by weight of Xbinx 19G were added and allowed to dissolve.

Example 55

The following inks were made according to the procedure described below.

TABLE 19

Inks D-L.

|  | Ink D | Ink E | Ink F | Ink G |
|---|---|---|---|---|
| Pigment Dispersion from: | Example #27 | Example #37 | Example #30 | Example #42 |
| Water, deionized (g) | 10.54 | 31.08 | 24.29 | 14.88 |
| Dispersion (g) | 54.46 | 33.92 | 40.71 | 50.12 |
| Ink base (g) | 35.00 | 35.00 | 35.00 | 35.00 |
| Surfynol 465 (g) | 0.515 | 0.60 | 0.55 | 0.55 |
| Surfynol 440 (g) | 0.40 | 0.38 | 0.375 | 0.40 |

|  | Ink H | Ink I | Ink J | Ink K | Ink L |
|---|---|---|---|---|---|
| Pigment Dispersion from: | Example #45 | Example #46 | Example #11 | Example #47 | Example #46 |
| Water, deionized (g) | 14.62 | 28.45 | 28.00 | 29.20 | 29.00 |
| Dispersion (g) | 50.38 | 41.55 | 37.00 | 35.80 | 36.00 |
| Ink base (g) | 35.00 | 35.00 | 35.00 | 35.00 | 35.00 |
| Surfynol 465 (g) | 0.55 | 0.55 | 0.55 | 0.55 | 0.55 |
| Surfynol 440 (g) | 0.36 | 0.36 | 0.40 | 0.36 | 0.36 |

A second vessel was prepared by adding the calculated percentage by weight of DI water to the pigment dispersion to the vessel per Table 19. A magnetic stirring device was then placed into the vessel. Next the ink base followed by Surfynol surfactants (Air Products & Chemicals, Inc., Allentown, Pa.) were slowly added to the pigment dispersion in the second vessel. The dispersion was mixed during this process. After all of the diluent has been added, the ink was mixed for about 1 hour, or until it was completely homogenous. After mixing, the ink was filtered using a 1 micron glass filter (available from Whatman, Kent, England).

The print performance characteristics of the color inks are identified below.

TABLE 20

Ink Set 1, made with SA attached pigment dispersions

|  | Ink D | Ink E | Ink F | Ink D | Ink E | Ink F |
|---|---|---|---|---|---|---|
|  | HP MP-ColorLok | | | Xerox 4200 | | |
| Optical Density | 0.786 | 0.854 | 0.606 | 0.846 | 0.865 | 0.646 |
| Rub Resistance (OD Diff) | 0.03 | 0.02 | 0.04 | 0.06 | 0.01 | 0.04 |
| Highlighter A Resistance (OD Diff) | 0.026 | 0.015 | — | 0.006 | 0 | — |
| Highlighter B Resistance (OD Diff) | 0.023 | 0.016 | — | 0.015 | 0.014 | — |
| Water resistance (OD Diff) | 0 | 0 | 0 | 0.002 | 0.001 | 0.002 |
| Ozone Fade | 3.058 | 0.766 | 0.492 | 4.44 | 0.875 | 0.647 |
| Mottle | 1.618 | 1.818 | 1.608 | 1.913 | 2.193 | 1.921 |
|  | Office Depot 104 | | | Hammerill GW | | |
| Optical Density | 0.858 | 0.872 | 0.658 | 0.82 | 0.807 | 0.631 |
| Rub Resistance (OD Diff) | 0.03 | 0 | 0.01 | 0.04 | 0.02 | 0.06 |
| Highlighter A Resistance (OD Diff) | 0.022 | 0.009 | — | 0.043 | 0.031 | — |
| Highlighter B Resistance (OD Diff) | 0.024 | 0.02 | — | 0.039 | 0.054 | — |
| Water resistance (OD Diff) | 0 | 0 | 0 | 0.002 | 0.001 | 0.002 |

TABLE 20-continued

Ink Set 1, made with SA attached pigment dispersions

|  | Ink D | Ink E | Ink F | Ink D | Ink E | Ink F |
|---|---|---|---|---|---|---|
| Ozone Fade | 4.658 | 1.143 | 0.552 | 4.01 | 0.902 | 0.44 |
| Mottle | 1.954 | 2.17 | 1.731 | 2.031 | 2.797 | 2.018 |

TABLE 21

Ink Set 2, made with 4ABA attached pigment dispersions

|  | Ink G | Ink H | Ink I | Ink G | Ink H | Ink I |
|---|---|---|---|---|---|---|
|  | HP MP-ColorLok | | | Xerox 4200 | | |
| Optical Density | 0.779 | 0.849 | 0.592 | 0.822 | 0.865 | 0.675 |
| Rub Resistance (OD Diff) | 0.06 | 0.02 | 0.03 | 0.06 | 0.01 | 0.04 |
| Highlighter A Resistance (OD Diff) | 0.026 | 0.034 | — | 0.018 | 0 | — |
| Highlighter B Resistance (OD Diff) | 0.044 | 0.033 | — | 0.018 | 0 | — |
| Water resistance (OD Diff) | 0 | 0.001 | 0.001 | 0.001 | 0.002 | 0.003 |
| Ozone Fade | 2.345 | 0.789 | 0.351 | 3.204 | 1.194 | 0.606 |
| Mottle | 1.807 | 1.821 | 1.863 | 2.123 | 2.078 | 2.052 |
|  | Office Depot 104 | | | Hammerill GW | | |
| Optical Density | 0.837 | 0.877 | 0.674 | 0.8 | 0.808 | 0.649 |
| Rub Resistance (OD Diff) | 0.04 | 0 | 0.02 | 0.07 | 0.01 | 0.04 |
| Highlighter A Resistance (OD Diff) | 0.03 | 0.022 | — | 0.045 | 0.034 | — |
| Highlighter B Resistance (OD Diff) | 0.031 | 0.03 | — | 0.032 | 0.028 | — |
| Water resistance (OD Diff) | 0.003 | 0.001 | 0.001 | 0 | 0 | 0 |
| Ozone Fade | 3.302 | 1.249 | 0.55 | 2.912 | 1.021 | 0.474 |
| Mottle | 2.315 | 1.989 | 1.873 | 2.002 | 2.42 | 1.825 |

TABLE 22

Ink Set 3, made with 4ABA attached pigment dispersions

|  | Ink J | Ink K | Ink L | Ink J | Ink K | Ink L |
|---|---|---|---|---|---|---|
|  | HP Multi-Purpose ColorLok | | | Xerox 4200 | | |
| Optical Density | 0.829 | 0.89 | 0.674 | 0.809 | 0.828 | 0.652 |
| Rub Resistance (OD Diff) | 0.02 | 0.01 | 0.055 | 0.02 | 0 | 0.045 |
| Highlighter A Resistance (OD Diff) | 0.014 | 0.017 | — | 0.02 | 0.02 | — |
| Highlighter B Resistance (OD Diff) | 0.023 | 0.02 | — | 0.017 | 0.02 | — |
| Water resistance (OD Diff) | 0.003 | 0.004 | 0.004 | 0.004 | 0.001 | 0.003 |
| Ozone Fade | 2.246 | 0.725 | 0.341 | 2.242 | 0.777 | 0.388 |
| Mottle | 1.7 | 1.679 | 2.024 | 1.689 | 1.993 | 1.986 |
|  | Epson Photo Paper | | | Hammerill Great White | | |
| Optical Density | 0.775 | 0.879 | 0.845 | 0.806 | 0.823 | 0.67 |
| Rub Resistance (OD Diff) | — | — | — | 0.02 | 0.01 | 0.045 |
| Highlighter A Resistance (OD Diff) | 0 | 0 | — | 0.012 | 0.02 | — |
| Highlighter B Resistance (OD Diff) | 0.004 | 0.011 | — | 0.04 | 0.029 | — |
| Water resistance (OD Diff) | 0 | 0.001 | 0 | 0.003 | 0.003 | 0.003 |
| Ozone Fade | 1.739 | 1.298 | 0.481 | 2.07 | 0.538 | 0.323 |
| Mottle | 1.093 | 1.244 | 1.087 | 1.697 | 2.388 | 2.206 |

Example 56

Wood Stain Application Performance

The following wood stains were prepared and tested at 6% dry pigment loading with a resin solution consisting of 18% Joncryl 95 (available from Johnson Polymer, Sturtevant, Wis.) and the balance de-ionized water. Waterfastness comparison of drawdowns on Leneta Form 3NT-3 using a wire wound rod#7 (available from Paul N. Gardner Company, Pompano Beach, Fla.) was done with 1"×4" strips. Half of each strip was dipped in de-ionized water for one minute. The strips were allowed to dry at ambient temperature. The color difference (DE*) was read with a spectrophotometer. Lower DE* indicates better waterfastness.

TABLE 23

Wood stain comparison.

| Example | Pigment | Attachment | Dipped area vs. Control | | | | | |
|---|---|---|---|---|---|---|---|---|
| [#] | Type | Type | DL* | Da* | Db* | DC* | DH* | DE* |
| 32 | Carbon[1] | SA | 2.99 | 1.08 | 2.67 | 2.83 | 0.58 | 4.15 |
| 41 | Carbon[1] | 4-ABA | 1.23 | 0.34 | 0.38 | 0.50 | 0.02 | 1.33 |
| 37 | PR122[6] | SA | 3.03 | 1.96 | 2.06 | 1.60 | 2.34 | 4.15 |
| 47 | PR122[6] | 4-ABA | 2.24 | 2.22 | 1.32 | 1.93 | 1.73 | 3.42 |
| 30 | PY74[7] | SA | 0.55 | 1.60 | 1.96 | 1.94 | 1.63 | 2.59 |
| 46 | PY74[7] | 4-ABA | 0.25 | 0.26 | 0.22 | 0.22 | 0.27 | 0.43 |
| 27 | PB15[2] | SA | 1.38 | 1.55 | 0.50 | 0.31 | 1.60 | 2.14 |
| 43 | PB15[4] | 4-ABA | 0.18 | 0.02 | 0.05 | 0.04 | 0.04 | 0.19 |

Example 57

Coating Performance

The following coating formulations (Masstone) were prepared and tested at 6% dry pigment loading with a resin solution consisting of 25% acrylic vehicle (available from Valspar, Wheeling, Ill.) and the balance de-ionized water. The drawdown was prepared on Leneta form 2A using a 6.0 mil wire wound rod. Chemical resistance was measured separately by spotting 10 drops of 10% hydrochloric acid and 10 drops of 10% sodium hydroxide solution on a Masstone drawdown. The degree of chemical resistance is measured by taking the DE* value between the spotted area versus the control area.

TABLE 24

Coating resistance to strong acid (10% Hydrochloric acid).

| Example | Pigment | Attachment | Spotted area vs Control | | | | | |
|---|---|---|---|---|---|---|---|---|
| [#] | Type | Type | DL* | Da* | Db* | DC* | DH* | DE* |
| 32 | Carbon[1] | SA | 0.15 | 0.12 | 0.20 | 0.16 | 0.17 | 0.28 |
| 41 | Carbon[1] | 4-ABA | 0.03 | 0.02 | 0.07 | 0.07 | 0.00 | 0.08 |
| 37 | PR122[6] | SA | 1.55 | 4.01 | 3.09 | 4.16 | 2.89 | 5.30 |
| 47 | PR122[6] | 4-ABA | 1.27 | 3.87 | 2.85 | 4.33 | 2.09 | 4.97 |
| 30 | PY74[7] | SA | 0.03 | 0.45 | 0.06 | 0.00 | 0.46 | 0.46 |
| 46 | PY74[7] | 4-ABA | 0.19 | 0.32 | 0.18 | 0.22 | 0.30 | 0.41 |
| 27 | PB15[2] | SA | 0.12 | 0.34 | 1.07 | 1.10 | 0.21 | 1.13 |
| 43 | PB15[4] | 4-ABA | 0.44 | 0.32 | 0.79 | 0.57 | 0.64 | 0.96 |

TABLE 25

Coating resistance to strong base (10% Sodium hydroxide).

| Example | Pigment | Attachment | Spotted area vs Control | | | | | |
|---|---|---|---|---|---|---|---|---|
| [#] | Type | Type | DL* | Da* | Db* | DC* | DH* | DE* |
| 32 | Carbon[1] | SA | 8.79 | 0.03 | 0.27 | 0.26 | 0.09 | 8.80 |
| 41 | Carbon[1] | 4-ABA | 1.93 | 0.05 | 0.91 | 0.90 | 0.15 | 2.14 |
| 37 | PR122[6] | SA | 1.42 | 2.56 | 0.69 | 2.61 | 0.46 | 3.00 |
| 47 | PR122[6] | 4-ABA | 0.40 | 1.78 | 0.36 | 1.82 | 0.03 | 1.86 |
| 30 | PY74[7] | SA | 6.70 | 0.19 | 2.57 | 2.53 | 0.52 | 7.18 |
| 46 | PY74[7] | 4-ABA | 3.17 | 0.77 | 4.51 | 4.57 | 0.19 | 5.56 |
| 27 | PB15[2] | SA | 2.05 | 1.65 | 3.49 | 3.86 | 0.17 | 4.37 |
| 43 | PB15[4] | 4-ABA | 1.23 | 0.79 | 0.54 | 0.83 | 0.47 | 1.56 |

Example 58

Color Filter Application Performance

The following color filter formulations were prepared and tested at 6% dry pigment loading adjusted to 75% of the total with de-ionized water and then mixed with a vehicle (25%) consisting of 30% Valspar acrylic vehicle, 30% Joncryl 1972 (available from Johnson Polymer, Sturtevant, Wis.) and 40% 1-methoxy-2-propanol (Propylene Glycol Monomethyl Ether). Transmission values of the color filter coatings on a transparent olefin polymer substrate using a wire wound rod #7 (Paul N. Gardner Company, Pompano Beach, Fla.) were measured after drying at ambient temperature.

TABLE 26

Transmission Values of Color Filter Coatings.

| Example | Pigment | Attachment | % Transmittance (nm) | | | | | | | |
|---|---|---|---|---|---|---|---|---|---|---|
| [#] | Type | Type | 400 | 440 | 480 | 520 | 560 | 600 | 640 | 680 |
| 32 | Carbon[1] | SA | 2.75 | 3.95 | 5.17 | 6.50 | 7.91 | 9.37 | 10.81 | 12.26 |
| 41 | Carbon[1] | 4-ABA | 2.49 | 3.71 | 4.91 | 6.25 | 7.66 | 9.12 | 10.58 | 12.03 |
| 37 | PR122[6] | SA | 59.89 | 63.21 | 54.43 | 36.01 | 25.60 | 71.86 | 84.46 | 86.50 |
| 47 | PR122[6] | 4-ABA | 63.88 | 65.57 | 56.12 | 37.07 | 25.94 | 73.45 | 85.20 | 86.80 |
| 30 | PY74[7] | SA | 11.00 | 5.94 | 13.44 | 66.63 | 78.37 | 82.56 | 85.02 | 86.60 |
| 46 | PY74[7] | 4-ABA | 11.42 | 6.27 | 14.49 | 68.85 | 79.40 | 83.45 | 85.94 | 87.33 |
| 27 | PB15[2] | SA | 48.25 | 74.75 | 83.15 | 76.29 | 32.96 | 10.93 | 9.07 | 13.68 |
| 43 | PB15[4] | 4-ABA | 47.47 | 74.75 | 83.04 | 74.98 | 29.92 | 9.57 | 8.05 | 12.12 |

Example 59

Textile Printing Application Performance

The following printing pastes were prepared and tested at 6% dry pigment loading with Delta Ceramcoat Textile Medium[16] (33%), Valspar Acrylic Vehicle (5%) and the balance de-ionized water. The drawdowns of the print pastes on a white cotton fabric were prepared using a 6.0 mil wire wound rod. After drying at ambient temperature the prints were heat fixed at 140° C. for 10 minutes in an oven. The fabric was cut into 1"×4" strips and half of each strip (1"×2") was immersed in boiling de-ionized water for five minutes. Afterwards, the exposed strips were washed in cold tap water for one minute and allowed to dry at ambient temperature. The washfastness and waterfastness were assessed by measuring the total color difference (DE*) between control and treated fabric.

TABLE 27

Wash and Water Fastness Evaluation.

| Example | Pigment | Attachment | Washed Fabric vs Control | | | | | |
|---|---|---|---|---|---|---|---|---|
| [#] | Type | Type | DL* | Da* | Db* | DC* | DH* | DE* |
| 32 | Carbon[1] | SA | 0.23 | 0.03 | 0.11 | 0.09 | 0.06 | 0.25 |
| 41 | Carbon[1] | 4-ABA | 0.22 | 0.05 | 0.04 | 0.00 | 0.06 | 0.23 |
| 37 | PR122[6] | SA | 0.10 | 0.78 | 0.23 | 0.71 | 0.29 | 0.78 |
| 47 | PR122[6] | 4-ABA | 0.15 | 0.02 | 0.50 | 0.06 | 0.49 | 0.52 |
| 30 | PY74[7] | SA | 3.50 | 0.22 | 5.73 | 5.72 | 0.41 | 6.72 |
| 46 | PY74[7] | 4-ABA | 1.52 | 0.44 | 2.19 | 2.13 | 0.67 | 2.70 |
| 27 | PB15[2] | SA | 0.93 | 0.35 | 0.74 | 0.66 | 0.49 | 1.24 |
| 43 | PB15[4] | 4-ABA | 0.03 | 0.11 | 0.57 | 0.53 | 0.26 | 0.59 |

[16]The amount was adjusted to 23% DCTM and 2% VAV for the two PB 15 pigment dispersions.

What is claimed is:

1. A method of modifying a pigment, the method comprising:
   reacting a reactive compound having an X-[Y]$_n$ reactive group with a secondary compound N-S-ZM to form a substituted reactive intermediate [Y]$_a$-X-(N-S-ZM)$_b$; and
   reacting a pigment with the substituted reactive intermediate [Y]$_a$-X-(N-S-ZM)$_b$ to attach the substituted reactive intermediate to the surface of the pigment to form a surface modified pigment;
   wherein X is a sulfonyl, phosphoryl, or 1,3,5-triazinyl group;
   Y is a halogen leaving group;
   N is a nucleophilic group;
   S is an organic group;
   ZM is an ionizable end group;
   n is an integer between 1 and 3;
   b is an integer between 1 and 3; and
   a = n−b;
   wherein n is equal to or greater than b; and
   wherein if b is 2 or 3, each N-S-ZM can be the same or different.

2. The method of claim 1, wherein b is 2 or 3, and each N-S-ZM is different.

3. The method of claim 1, wherein the pigment is in powder or wet cake form and is milled with a grind aid prior to the reaction with the substituted intermediate.

4. The method of claim 1, wherein Y comprises at least one of fluorine, chlorine, bromine, or iodine.

5. The method of claim 1, wherein N comprises at least one of an amine, an imine, a pyridine, or a thiol group.

6. The method of claim 1, wherein S comprises at least one of substituted or unsubstituted alkyls, aryls and polymer chains having a molecular weight range from about 300 to about 8000.

7. The method of claim 1, wherein Z comprises at least one of a carboxyl, sulfonyl, phenolic, or phosphoryl group and M comprises at least one of a proton or cation in salt form.

8. The method of claim 1, wherein the secondary compound N-S-ZM comprises at least one of a polymer, an amine, an amino acid, an alcohol, a thiol, and a combination thereof.

9. The method of claim 8, wherein the secondary compound N-S-ZM comprises at least one of amino benzoic acids, amino benzene sulfonic acids, amino phenols, amino sulfonic acids, polyethoxylated amino acids, sodium sulfanilate, sulfanilic acid, sodium p-aminobenzoate, p-aminophenol, ethyl 4-aminobenzoate, taurine, oleic acid (amino), tetramethylammonium 4-aminobenzoate, sodium 4-aminophenolate, sodium aminooleate, organic polymeric substrates, and combinations thereof.

10. The method of claim 9, wherein the organic polymeric substrates comprises at least one of linear alkyl and branched ethoxy and propoxy chain polymers with a molecular weight of about 300 to about 3000, linear polyethoxy polymeric amines, linear propoxy polymeric amines, styrene acrylic copolymers, polyethyleneimines, and combinations thereof.

11. The method of claim 1, wherein Z comprises at least one of ammonium, trimethylammonium, or tributylammonium and M comprises at least one of a halide or a negatively charged ion.

12. The method of claim 11, wherein the secondary compound N-S-ZM comprises at least one of a diamino aromatic, a polyethyleneimine, a polyguanidine, a quaternary ammonium compound, or a combination thereof.

13. The method of claim 1, wherein the pigment comprises at least one of carbon black, pigment red 122, pigment violet 19, pigment violet 23, pigment red 202, pigment red 188, pigment yellow 155, pigment yellow 97, pigment green 7, pigment blue 15:3, pigment blue 15:4, and pigment yellow 74, and combinations thereof.

14. The method of claim 1, further comprising milling the pigment to less than about 100 nm before, during, or after reacting the pigment with the substituted reactive intermediate.

15. The method of claim 1, wherein the substituted reactive intermediate $[Y]_a$-X-(N-S-ZM)$_b$ is associated with charge-balancing counterions, further comprising at least partially substituting the counterions with at least one of alkali metals, alkaline earth metals, $NR_1R_2R_3H^+$, and combinations thereof, wherein $R_1$, $R_2$, and $R_3$ are independently H or substituted or unsubstituted $C_1$-$C_5$ alkyl groups.

16. The method of claim 15, wherein the counterions are at least partially substituted with at least one of K+, Li+, $NH_4$+, monoethanolammonium, tetraethylammonium, triethanolammonium, tetramethylammonim, tetrabutylammonium, and combinations thereof.

17. The method of claim 1, wherein the surface modified pigment comprises about 0.01 to about 1.0 mMoles of S and about 0.01 to about 2.0 mMoles of active hydrogen per gram of pigment.

18. The method of claim 1, wherein the surface modified pigment comprises about 0.06 to about 0.7 mMoles of S and about 0.07 to about 1.6 mMoles of active hydrogen per gram of pigment.

19. The method of claim 1, wherein the surface modified pigment comprises pigment blue 15 comprising about 0.168 to about 0.430 mMoles of S and about 0.07 to about 0.313 mMoles of active hydrogen per gram of pigment.

20. The method of claim 1, wherein the surface modified pigment comprises pigment red 122 comprising about 0.062 to about 0.187 mMoles of S and about 0.077 to about 0.394 mMoles of active hydrogen per gram of pigment.

21. The method of claim 1, wherein the surface modified pigment comprises pigment yellow 74 comprising about 0.131 to about 0.178 mMoles of S and about 0.192 to about 0.290 mMoles of active hydrogen per gram of pigment.

22. The method of claim 1, wherein the surface modified pigment comprises carbon black comprising about 0.103 to about 0.702 mMoles of S and about 0.203 to about 1.579 mMoles of active hydrogen per gram of pigment.

23. The method of claim 1, wherein the surface modified pigment comprises sodium in the amount of about 100 to about 6500 ppm and potassium in the amount of about 30 to about 1200 ppm.

24. The method of claim 1, wherein the surface modified pigment comprises sulfur in the amount of about 50 ppm to about 2600 ppm.

25. The method of claim 1, wherein the surface modified pigment is a surface modified carbon black comprising carbon black having attached thereto:
an NH/N=C=N group distributed almost equally, in about 0.7 to 2.7 atomic %;
an oxygen in an atomic ratio of about 6.8 to 20.9% wherein at least about 51 to 62% of the oxygen is present as C=O, COONa, or SOx group and the balance as a C—O group, wherein SOx is an oxidized form of S;
COONa/SO3Na, in about 0.7 to 2.6 atomic %; and
wherein at least 90% of S present on the surface modified carbon black is oxidized S (SOx).

26. The method of claim 25, wherein SOx comprises at least one of a sulfone, a sulfate, or a sulfonic acid.

27. The method of claim 1, wherein the surface modified pigment is a surface modified pigment blue 15 comprising a surface oxygen content of at least about 2.5 atomic %.

28. The method of claim 1, wherein the surface modified pigment is a surface modified pigment red 122 comprising a surface oxygen content of about 8.3 to about 9.8 atomic %, wherein about 24% to about 32% of the total O exists as a C—O bond.

29. The method of claim 1, wherein the surface modified pigment is a surface modified pigment yellow 74 comprising a surface oxygen content of about 21.6 to about 29.3 atomic %, wherein about 42% to about 48% is present as C=O, COONa/CSO$_3$Na.

30. The method of claim 1, further comprising incorporating the surface modified pigment into an aqueous pigment dispersion.

31. The method of claim 1, further comprising incorporating the surface modified pigment into at least one of wood stain, a coating, an inkjet ink, a color filter, or a textile printing ink, or a combination thereof.

32. The method of claim 1, wherein the X-$[Y]_n$ reactive group is cyanuric chloride and the secondary compound N-S-ZM is at least one of 4-aminobenzoic acid, sulfanilic acid, 4-aminophenol, taurine, oleic acid (amino), linear polyethoxy polymeric amines, propoxy polymeric amines, or combinations thereof.

33. The method of claim 2, wherein the X-$[Y]_n$ reactive group is cyanuric chloride, the secondary compounds are 4-aminobenzoic acid and a polymeric amine.

34. The method of claim 1, wherein the surface modified pigment is a self-dispersing pigment.

* * * * *